(12) United States Patent
Filas et al.

(10) Patent No.: US 12,553,548 B2
(45) Date of Patent: Feb. 17, 2026

(54) CONDUIT COUPLER AND METHODS OF USE THEREOF

(71) Applicant: Coupler Solutions, LLC, Minneapolis, MN (US)

(72) Inventors: Justin P. Filas, Minneapolis, MN (US); Gene Hodge, Mound, MN (US); Dan Stock, Union, IL (US)

(73) Assignee: Coupler Solutions, LLC, Minneapolis, MN (US)

( * ) Notice: Subject to any disclaimer, the term of this patent is extended or adjusted under 35 U.S.C. 154(b) by 0 days.

(21) Appl. No.: 18/665,462

(22) Filed: May 15, 2024

(65) Prior Publication Data

US 2025/0137562 A1     May 1, 2025

Related U.S. Application Data

(60) Provisional application No. 63/595,321, filed on Nov. 1, 2023.

(51) Int. Cl.
*F16L 21/02*     (2006.01)
*F16L 47/02*     (2006.01)

(52) U.S. Cl.
CPC ............. *F16L 21/022* (2013.01); *F16L 47/02* (2013.01)

(58) Field of Classification Search
CPC ....... F16L 21/03; F16L 21/022; F16L 37/091; F16L 25/14; F16L 47/02
See application file for complete search history.

(56) References Cited

U.S. PATENT DOCUMENTS

| | | |
|---|---|---|
| 320,683 A | 6/1885 | Phillis |
| 796,580 A | 8/1905 | Johnston |
| 1,926,197 A | 9/1933 | Durr |
| 2,201,372 A | 5/1940 | Miller et al. |
| 2,980,449 A | 4/1961 | Dunton |
| 3,156,490 A | 11/1964 | Myll |
| 3,245,701 A | 4/1966 | Leopold, Jr. |
| 3,592,481 A | 7/1971 | Jeffery |
| 3,637,239 A | 1/1972 | Daniel |

(Continued)

FOREIGN PATENT DOCUMENTS

| | | |
|---|---|---|
| AU | 2012244266 A1 | 3/2013 |
| BR | MU8903063 U2 | 6/2011 |

(Continued)

OTHER PUBLICATIONS

Stucchi Spa; Poppet Valve Quick Coupling Series I/IP; https://www.stucchigroup.com/en/quick-couplings/i-ip/; May 25, 2022; 3 pages.

(Continued)

*Primary Examiner* — David Bochna
(74) *Attorney, Agent, or Firm* — Merchant & Gould P.C.

(57) ABSTRACT

A conduit coupler is provided including a first annular portion extending along a longitudinal axis and a second annular portion extending long the longitudinal axis. The second annular portion is longitudinally offset from the first annular portion, and a shoulder is positioned longitudinally intermediate the first annular portion and the second annular portion. Further, a recessed portion is positioned within the first annular portion, and a resilient member is configured to sit within the recessed portion.

20 Claims, 60 Drawing Sheets

(56) References Cited

U.S. PATENT DOCUMENTS

| | | | |
|---|---|---|---|
| 3,682,503 A | 8/1972 | Bloom | |
| 3,915,460 A | 10/1975 | Kramer | |
| 3,924,877 A * | 12/1975 | Leopold, Jr. | F16L 37/091 285/369 |
| 4,054,306 A | 10/1977 | Sadoff, Jr. et al. | |
| 4,513,545 A | 4/1985 | Hopkins | |
| 4,613,172 A | 9/1986 | Schattmaier | |
| 4,756,784 A | 7/1988 | Jones | |
| 4,846,714 A | 7/1989 | Welsby et al. | |
| 4,919,164 A | 4/1990 | Barenburg | |
| 4,948,377 A | 8/1990 | Cairns | |
| 5,039,137 A * | 8/1991 | Cankovic | F16L 25/14 285/236 |
| 5,180,197 A | 1/1993 | Thompson | |
| 5,531,485 A | 7/1996 | House et al. | |
| 5,722,702 A * | 3/1998 | Washburn | F16L 37/091 285/369 |
| 5,833,276 A | 11/1998 | Thompson | |
| 6,595,559 B1 | 7/2003 | Readman | |
| 6,642,451 B1 | 11/2003 | Gretz | |
| 6,663,145 B1 | 12/2003 | Lyall, III et al. | |
| 6,676,166 B1 | 1/2004 | Wraith et al. | |
| 6,692,285 B2 | 2/2004 | Islam | |
| 7,131,868 B2 | 11/2006 | Montena | |
| 7,432,452 B2 | 10/2008 | Gardner | |
| 7,748,754 B2 | 7/2010 | Snijders | |
| 8,129,634 B2 | 3/2012 | Sheehan et al. | |
| 8,376,290 B2 | 2/2013 | Tollefson | |
| 8,844,981 B1 * | 9/2014 | Crompton | F16L 37/0915 285/315 |
| 9,810,358 B2 * | 11/2017 | Hennemann | F16L 37/091 |
| D840,515 S | 2/2019 | Copeland et al. | |
| 10,221,977 B2 * | 3/2019 | Hennemann | F16L 25/009 |
| 10,288,199 B2 | 5/2019 | Copeland | |
| 10,295,071 B2 | 5/2019 | Nguyen | |
| 10,436,359 B2 | 10/2019 | Copeland | |
| 10,619,779 B2 | 4/2020 | Copeland et al. | |
| 10,663,095 B2 | 5/2020 | Copeland et al. | |
| 10,895,338 B2 * | 1/2021 | Lawrence | F16L 21/03 |
| 10,941,887 B2 | 3/2021 | Furcoiu | |
| 10,962,157 B2 | 3/2021 | Jacobs | |
| 11,060,646 B2 | 7/2021 | Jacobs et al. | |
| 11,098,821 B1 | 8/2021 | Nguyen | |
| 11,098,829 B2 | 8/2021 | Nguyen | |
| 11,105,096 B2 | 8/2021 | Baggs et al. | |
| 11,105,450 B1 | 8/2021 | Nguyen | |
| 11,112,043 B2 | 9/2021 | Copeland et al. | |
| 11,560,972 B2 | 1/2023 | Jacobs et al. | |
| 11,628,613 B2 | 4/2023 | Ediger | |
| 11,668,422 B2 | 6/2023 | Jacobs | |
| 11,801,919 B2 | 10/2023 | Montague et al. | |
| 11,833,735 B2 | 12/2023 | Ediger | |
| 11,903,335 B2 * | 2/2024 | Thompson | F16L 27/107 |
| 12,113,317 B2 | 10/2024 | Van Swearingen et al. | |
| 12,203,581 B2 | 1/2025 | Wells | |
| 12,276,360 B2 | 4/2025 | Gibb | |
| 2004/0207201 A1 | 10/2004 | Starita | |
| 2006/0265852 A1 | 11/2006 | Snyder et al. | |
| 2007/0152440 A1 | 7/2007 | Keyes | |
| 2011/0254262 A1 | 10/2011 | Manning | |
| 2013/0149031 A1 | 6/2013 | Changsrivong | |
| 2013/0154260 A1 | 6/2013 | Jamison | |
| 2014/0145435 A1 | 5/2014 | Zhu et al. | |
| 2015/0102595 A1 | 4/2015 | Crompton et al. | |
| 2015/0276099 A1 | 10/2015 | Weissmann | |
| 2015/0276103 A1 | 10/2015 | Manning | |
| 2015/0285420 A1 | 10/2015 | Stout | |
| 2015/0292657 A1 * | 10/2015 | Whitmire | F16L 21/022 285/238 |
| 2015/0354737 A1 | 12/2015 | Stout | |
| 2016/0003475 A1 * | 1/2016 | Pestoor | F16L 25/14 126/317 |
| 2016/0076682 A1 | 3/2016 | Conrad | |
| 2016/0305583 A1 | 10/2016 | Conrad | |
| 2017/0328498 A1 | 11/2017 | Salehi-Bakhtiari | |
| 2018/0066776 A1 | 3/2018 | Roper | |
| 2018/0363815 A1 | 12/2018 | Jacobs | |
| 2019/0379190 A1 | 12/2019 | Morse et al. | |
| 2021/0364111 A1 | 11/2021 | Mller et al. | |
| 2022/0082188 A1 | 3/2022 | Yu et al. | |
| 2023/0151913 A1 | 5/2023 | Jacobs et al. | |

FOREIGN PATENT DOCUMENTS

| | | |
|---|---|---|
| BR | MU9001874 U2 | 1/2013 |
| CA | 2532119 | 1/2005 |
| CN | 2550616 Y | 5/2003 |
| CN | 2685691 | 3/2005 |
| CN | 101832436 | 9/2010 |
| CN | 201672186 | 12/2010 |
| CN | 202327484 | 7/2012 |
| CN | 103259228 | 8/2013 |
| CN | 206144019 | 5/2017 |
| CN | 206144022 | 5/2017 |
| CN | 109024663 | 12/2018 |
| CN | 111878637 | 11/2020 |
| CN | 114458830 | 5/2022 |
| DE | 102007054025 | 5/2009 |
| DE | 202011101106 | 8/2012 |
| EP | 241656 A1 | 10/1987 |
| EP | 0871834 | 10/1998 |
| EP | 3781853 | 2/2021 |
| JP | 54114821 | 9/1979 |
| JP | 09-046836 | 2/1997 |
| JP | 5438869 | 3/2014 |
| JP | 2017-534823 | 11/2017 |
| KR | 10-2012-0104849 | 9/2012 |
| KR | 10-2014-0070185 | 6/2014 |
| TW | I271466 | 1/2007 |
| WO | 2008/009344 | 1/2008 |
| WO | 2016080581 A1 | 5/2016 |
| WO | 2021/111130 | 6/2021 |

OTHER PUBLICATIONS

FERNCO; Proflex 1-1/2 in. Neoprene Shielded Coupling; https://www.homedepot.com/p/Fernco-Proflex-1-1-2-in-Neoprene-Shielded-Coupling-P3001-150/100372289; May 11, 2021; 7 pages.

Cantex Inc.; Horizontal Directional Drilling Conduit; https://web.archive.org/web/20200929204632/https://www.cantexinc.com/products/pvc-pipe-conduit/horizontal-directional-drilling-conduit; Sep. 29, 2020; 1 page.

PCT International Searching Authority; International Search Report and Written Opinion for International Application No. PCT//US2024/052142 mailed Feb. 13, 2025; 16 pages.

* cited by examiner

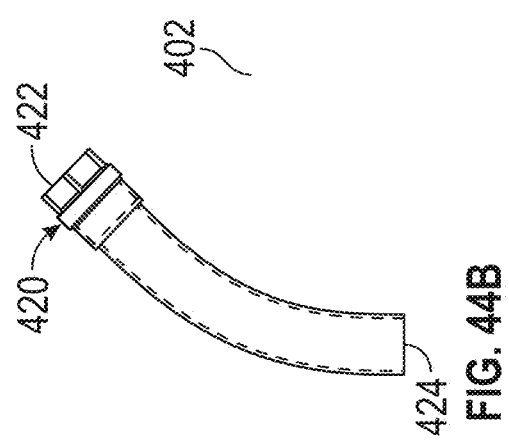
FIG. 44B
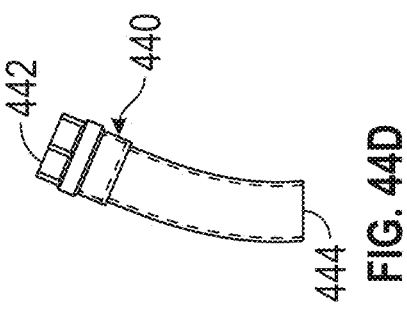
FIG. 44D
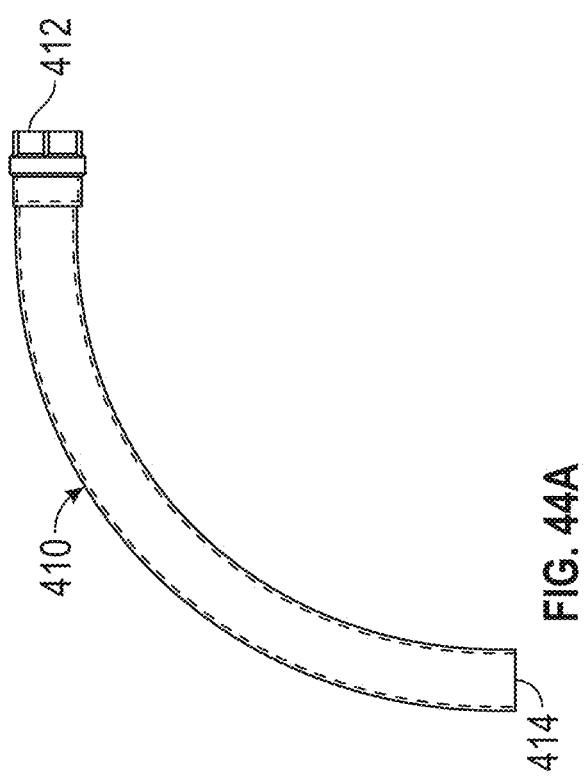
FIG. 44A
FIG. 44C

CONDUIT COUPLER AND METHODS OF USE THEREOF

FIELD OF THE DISCLOSURE

The present application claims priority to U.S. Provisional Patent Application Ser. No. 63/595,321, filed on Nov. 1, 2023, and entitled CONDUIT COUPLER AND METHODS OF USE THEREOF, the complete disclosure of which is expressly incorporated by reference herein.

FIELD OF THE DISCLOSURE

The present disclosure relates to conduit couplers for conduit raceway.

BACKGROUND OF THE DISCLOSURE

Conduit assemblies may require couplers to join conduits and extend the length of conduit assemblies. Couplers are often subject to harsh conditions and can assist in the assembly of conduit assemblies.

SUMMARY OF THE DISCLOSURE

In an embodiment of the present disclosure, a coupler is provided. The coupler comprises a first annular portion extending along a longitudinal axis and a second annular portion extending along the longitudinal axis. The second annular portion is longitudinally offset from the first annular portion. Further, a shoulder is positioned longitudinally intermediate the first annular portion and the second annular portion, and a resilient member is configured to sit within the recessed portion.

In embodiments, the recessed portion is a first recessed portion and the resilient member is a first resilient member, and the coupler further comprises a second recessed portion positioned within the second annular portion and a second resilient member is configured to sit within the second recessed portion.

In yet another embodiment, the first annular portion is configured to receive a conduit, and in response to the conduit being positioned within the first annular portion, the resilient member is deflected.

In yet another embodiment, the resilient member is a seal.

In embodiments, the first annular portion has a first diameter and the shoulder has a second diameter, and the second diameter is less than the first diameter.

In embodiments, the resilient member is configured to stand proud of an inner surface of the first annular portion.

In yet another embodiment of the present disclosure, a bank of conduits is provided. The bank of conduits comprises a first conduit assembly, a second conduit assembly, and an encasing material. The first conduit assembly comprises a first conduit and a first coupler coupled to the first conduit, and the first conduit assembly has a first end and a second end defining a first distance. The second conduit assembly comprises a second conduit and a second coupler coupled to the second conduit, and the second conduit assembly is positioned parallel and adjacent to the first conduit assembly. Further, the encasing material is configured to surround at least a portion of each of the first conduit assembly and the second conduit assembly. The encasing material is configured to be substantially flush with the first end and extend a second distance along the first conduit assembly and second conduit assembly. Further, the second distance is shorter than the first distance.

In embodiments, a support member is configured to sit between the first conduit assembly and the second conduit assembly.

In embodiments, the first coupler is coupled to the first end.

In embodiments, the first coupler comprises a first portion configured to receive the first conduit, and the first portion comprises a first annular recess configured to receive a resilient member.

In further embodiments, the resilient member is a seal.

In embodiments, a third conduit assembly comprises a third conduit and a third coupler coupled to the third conduit, and the third conduit assembly is coaxial and longitudinally offset from the first conduit assembly.

In embodiments, the first coupler has a first portion and a second portion, and the first conduit is positioned in the first portion and the third conduit is positioned in the second portion.

In yet another embodiment, a method of assembling a bank of conduits is provided. The method of assembling a bank of conduits comprises a first conduit assembly comprising a first conduit extending between a first end and a second end opposite the first end. A first coupler is coupled to the first conduit and overlaps one of the first end and the second end and the first conduit assembly defines a first length. The method further comprises providing a second conduit assembly comprising a second conduit extending between a first end and a second end opposite the first end and a second coupler coupled to the second conduit and the second coupler overlaps one of the first end and the second end. The method further comprises positioning the first conduit assembly adjacent the second conduit assembly. The method further comprises covering the first conduit assembly and the second conduit assembly with a material, and the material defines a second length. The material is configured to extend along the first conduit assembly and the second conduit assembly the second length, and the second length is less than the first length.

In embodiments, the first coupler is coupled to the first conduit first end and the material extends the second length starting at a position substantially flush with an end of the first coupler.

In embodiments, the first coupler comprises a first portion configured to receive the first conduit and a second portion opposite the first portion. The first portion comprises an annular recess configured to receive a resilient member.

In embodiments, the resilient member is a seal.

In embodiments, the method further comprises providing a third conduit assembly comprising a third conduit extending between a first end and a second end opposite the first end. Further, the method comprises positioning the third conduit within the second portion of the first coupler.

BRIEF DESCRIPTION OF THE DRAWINGS

FIG. 44A is a top view of a sweep formed of HDPE;

FIG. 44B is a top view of a sweep formed of HDPE;

FIG. 44C is a top view of a sweep formed of HDPE;

FIG. 44D is a top view of a sweep formed of HDPE;

DETAILED DESCRIPTION OF THE DRAWINGS

Figure 1:
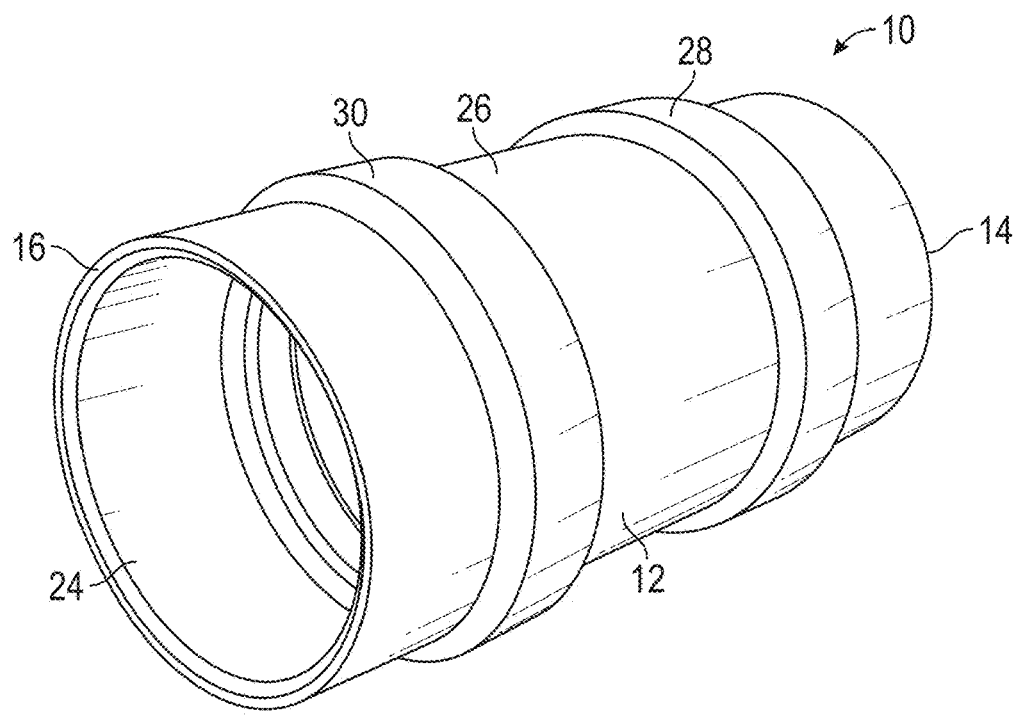
FIG. 1 is a perspective view of a conduit coupler of the present disclosure.
Figure 2:
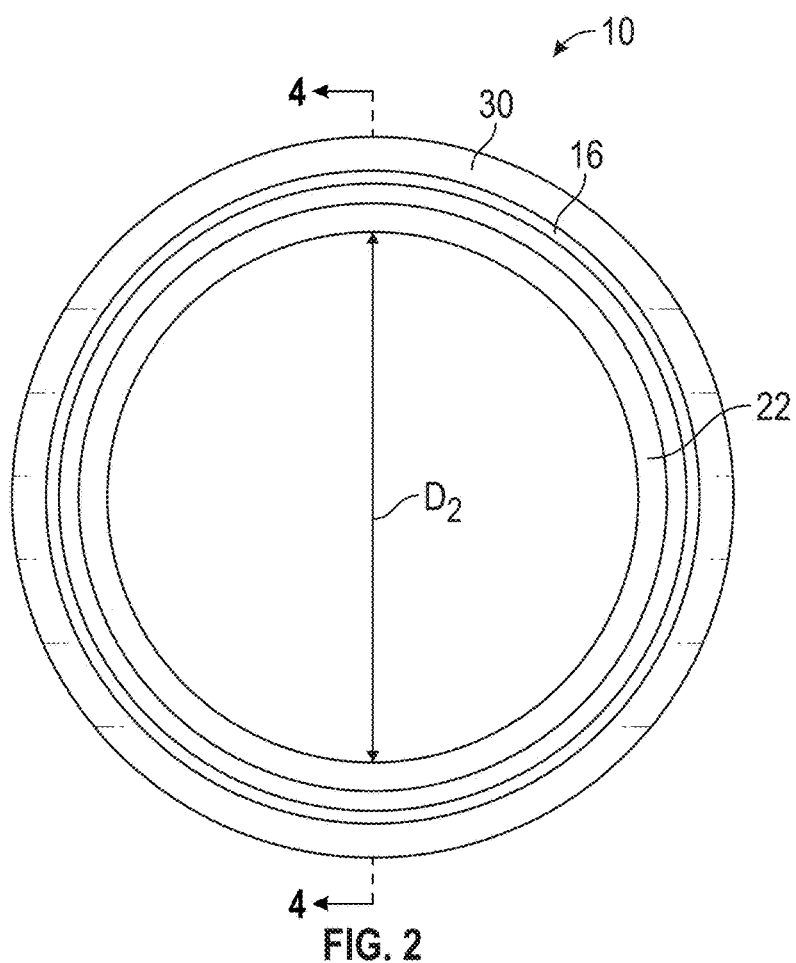
FIG. 2 is a front view of the conduit coupler of FIG. 1.
Figure 3:
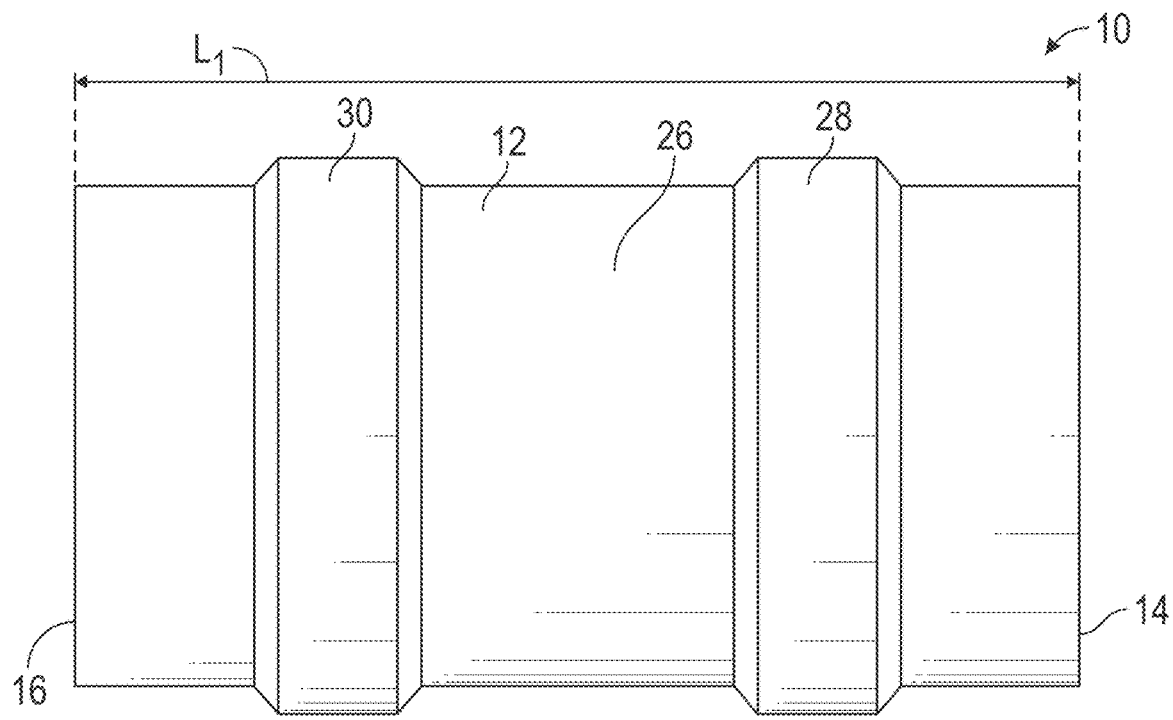
FIG. 3 is a side view of the conduit coupler of FIG. 1.
Figure 4:
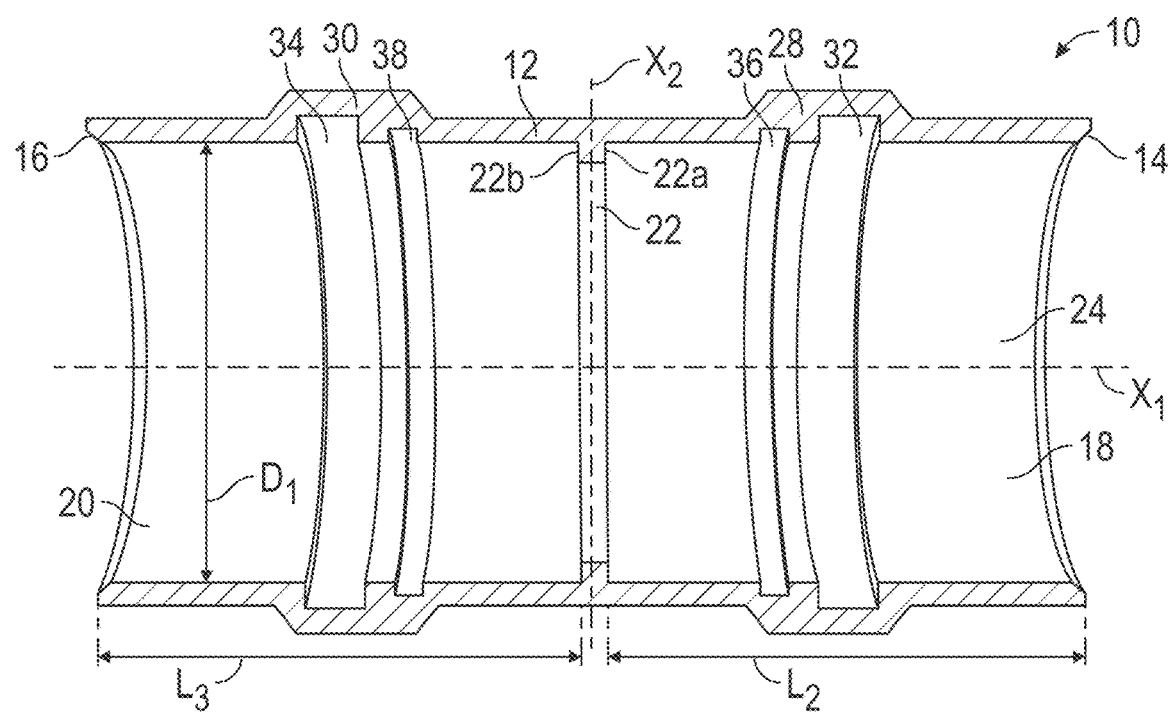
FIG. 4 is a section view of the conduit coupler of FIG. 1 taken along line 4-4 of FIG. 2.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", and variations thereof are used to include both arrangements wherein two or more components are in direct physical contact and arrangements wherein the two or more components are not in direct contact with each other (e.g., the components are "coupled" via at least a third component, but yet still cooperates or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

Conduit assemblies may be constructed to be placed underground and coupled in sequence to provide a continuous fluid path for various materials including electrical cables, telecommunications equipment or cables, water, waste, or other materials. In various situations, multiple sequential conduit assemblies are required to transport greater amounts of material, or different types of material to various locations or from various locations. Encasing conduit assemblies in an encasing material can ensure proper alignment of conduit assemblies and also protect conduit assemblies from outside factors such as debris, tree roots, water, animals, etc.

Referring to FIGS. 1-4, a coupler 10 is provided comprising a body portion 12 extending between a first end 14 and a second end 16. Body portion 12 extends longitudinally along axis X1 and defines an inner surface 24 and an outer surface 26. Body portion 12 generally defines a first portion 18 adjacent first end 14 and a second portion 20 adjacent second end 16. First portion 18 and second portion 20 are separated by an inner flange 22, or shoulder 22, and inner flange 22 extends inwardly from inner surface 24. In embodiments, inner flange 22 is integral with body portion 12. In embodiments, first end 14, first portion 18, second end 16, and second portion 20 are annularly shaped such that each substantially follow the shape of body portion 12. In embodiments, inner flange 22 is a separate component coupleable with body portion 12. Body portion 12 has a diameter D1 measured along the inner surface 24 and body portion 12 has a shoulder diameter D2 measured along the inner flange 22.

Figure 5A:
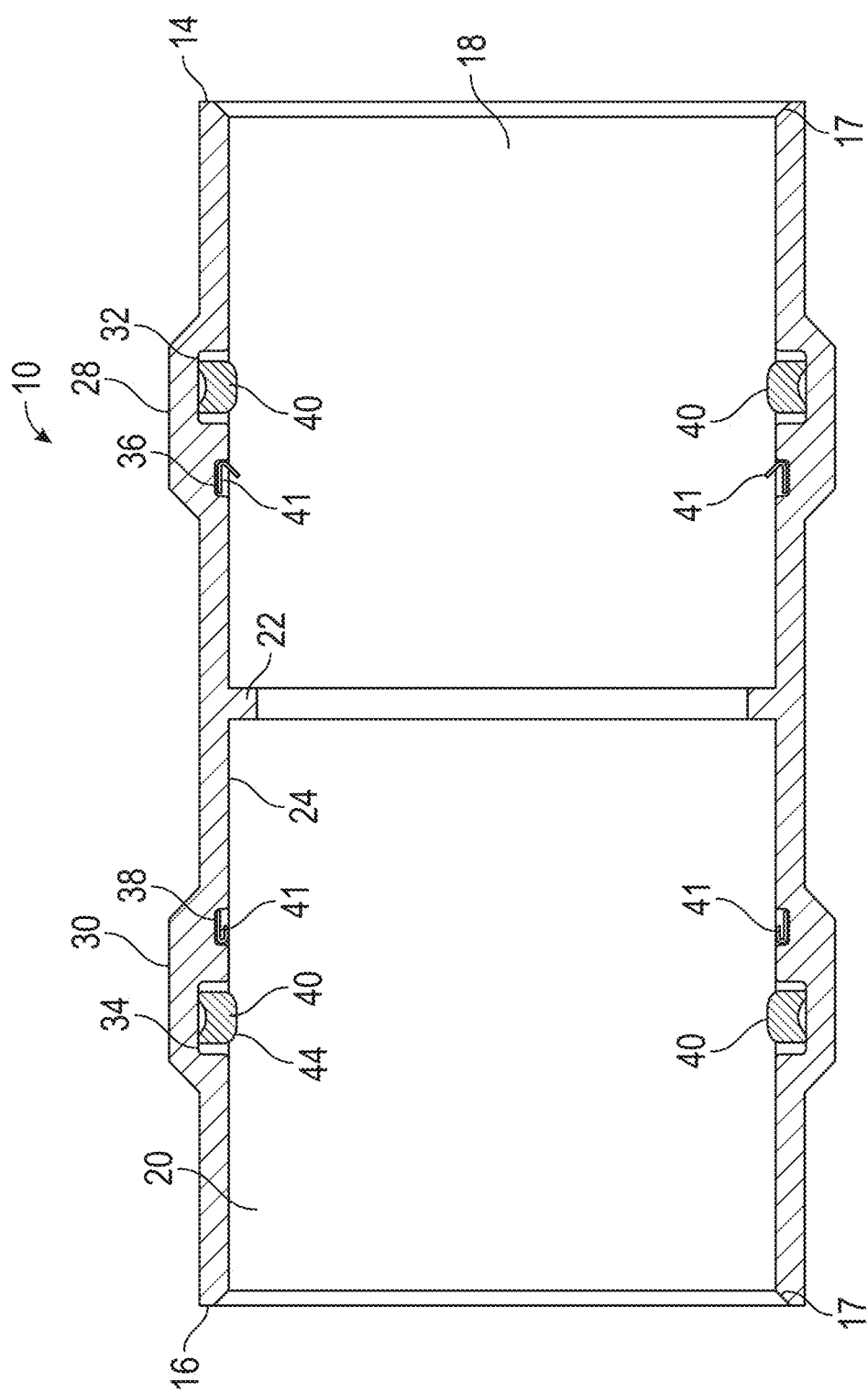
FIG. 5A is a section view of the conduit coupler of FIG. 1.
Figure 5B:
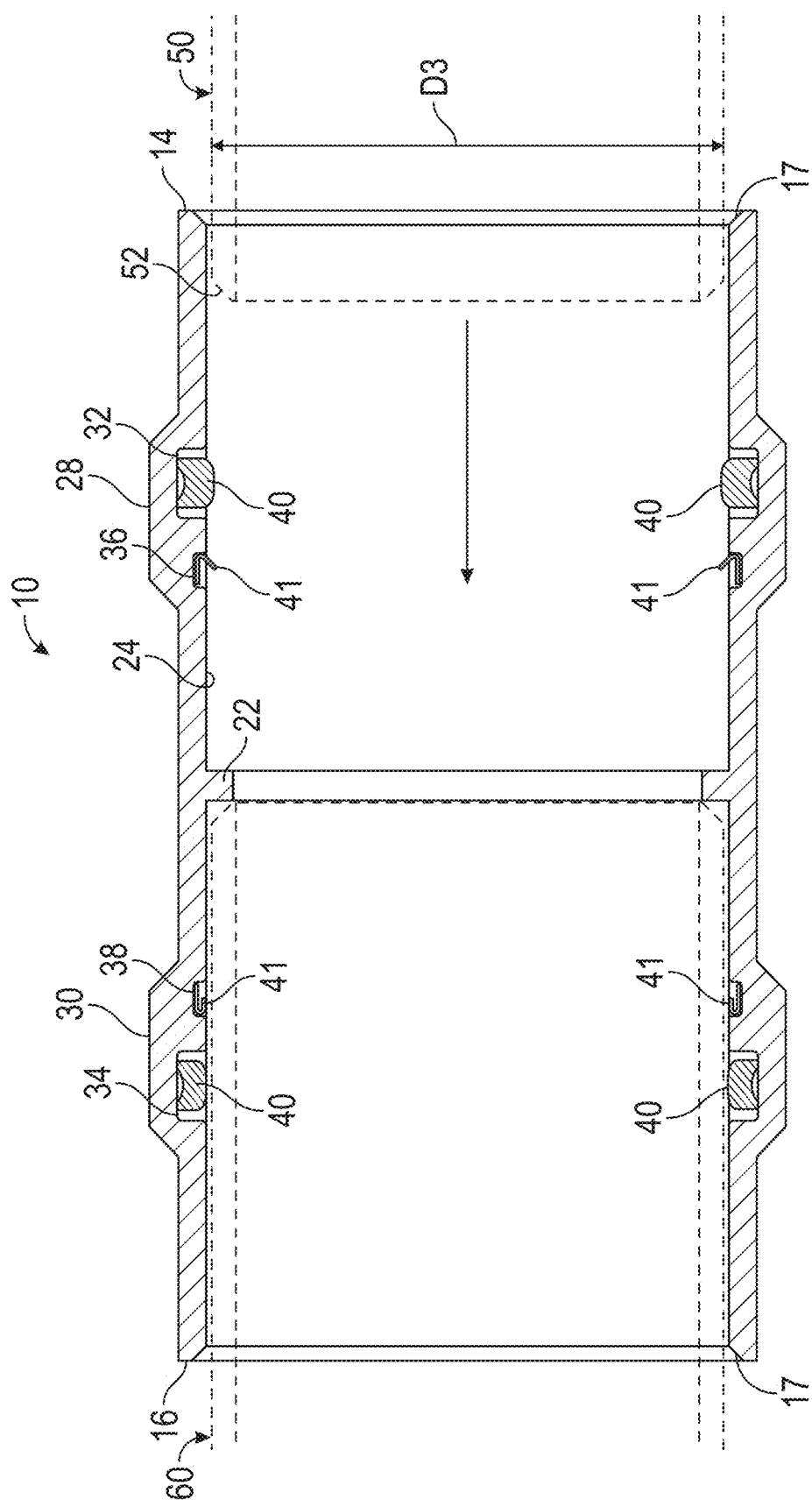
FIG. 5B is a section view of the conduit coupler of FIG. 1 with a first conduit positioned in the coupler and a second conduit positioned adjacent the coupler.

Coupler 10 includes a first shoulder 28 positioned along the outer surface 26 adjacent the first portion 18 and a second shoulder 30 positioned along the outer surface 26 adjacent the second portion 20. First shoulder 28 extends outwardly from outer surface 26 and defines a first annular recess 32 and a third annular recess 36 along the inner surface 24. Second shoulder 30 extends outwardly from outer surface 26 and defines a second annular recess 34 and a fourth annular recess 38 along the inner surface 24. In embodiments, each of first annular recess 32 and second annular recess 34 are configured to receive a gasket 40 (FIG. 5A), or seal 40, and each of third annular recess 36 and fourth annular recess 38 are configured to receive a biasing member 41 configured to assist in retention of conduits (FIGS. 5A-5B). In embodiments, biasing member 41 is a spring, a wire, or another resilient member. In embodiments, third annular recess 36 and fourth annular recess 38 are configured to receive a seal. In embodiments, each of the seal 40 positioned in the annular recesses 32, 34 and the biasing member 41 positioned in the annular recesses 36, 38 are resilient members configured to deform and/or deflect between an engaged position, or compressed position and a disengaged position, or uncompressed position. In embodiments, coupler 10 is symmetrical about a plane extending along an axis X2 substantially perpendicular to axis X1. Coupler has a length L1 defined between first end 14 and second end 16. Further, first portion 18 has a second length L2 defined between first end 14 and a first face 22a of inner flange 22 and second portion 20 has a third length L3 defined between second end 16 and a second face 22b of inner flange 22.

Figure 8:
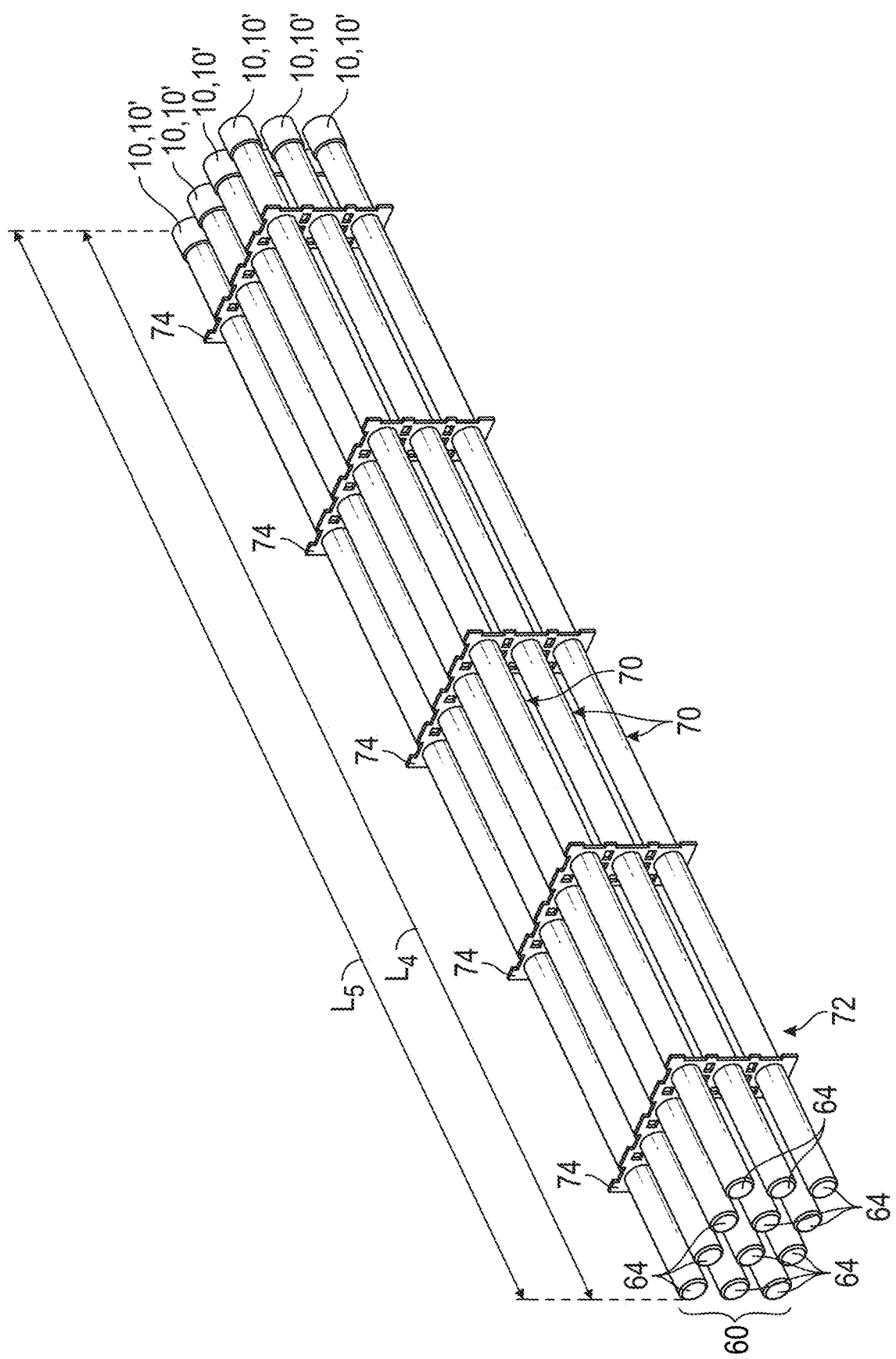
FIG. 8 is a perspective view of a bank of conduit assemblies of the present disclosure.

Referring now to FIGS. 5A-5D, coupler 10 is configured to receive a first conduit 50, or first pipe 50, within first portion 18 and a second conduit 60, or second pipe 60, within second portion 20. First conduit 50 generally has a first end 52 and a second end (not shown) which define a first length (not shown), and second conduit has a first end 62 and a second end 64 (FIG. 8) which define a fourth length L4 (FIG. 8). Each of first conduit 50 and second conduit 60 are substantially similar and have an outer diameter D3, which is greater than diameter D2 and less than diameter D1. That is, first conduit 50 and second conduit 60 are sized to fit within and extend into each of first portion 18 and second portion 20 and abut shoulder 22. As shown in FIG. 5B, first conduit 50 is positioned outside coupler 10 and second conduit 60 is positioned within second portion 20 of coupler 10. Seal 40 within first portion 18 is shown in a decompressed position when first conduit 50 is not positioned within first portion 18. Further, biasing member 41 is in the disengaged position and prepared to receive first conduit 50. Seal 40 within second portion 20 is shown in the compressed position and biasing member 41 within second portion 20 is shown in the engaged position when second conduit has been inserted into, and positioned in, second portion 20. When either of first conduit 50 or second conduit 60 are inserted into first portion 18 or second portion 20, respectively, seal 40 deforms and compresses from the uncompressed position to the compressed position. In the engaged position, seal 40 is configured to place a clamping force onto conduit 50, 60 and increase the force required to remove conduit 50, 60 from coupler 10. Similarly, seal 40 is configured to prevent intrusion from water, debris, or other materials.

Referring to FIG. 5B, conduit 60 is shown inserted into second portion 20' and seal 40 is in the compressed position. Further, biasing member 41 is in the engaged position to retain conduit 60 within second portion 20'. As conduit 60 is inserted into second portion 20, first end 62 is configured to approach inner flange 22. In embodiments, first end 62 is configured to contact inner flange 22. That is, inner flange 22 is a stopping member for conduit 60. In embodiments, first conduit 50 is configured to be inserted into first portion 18 and will be stopped by inner flange 22.

Figure 5C:
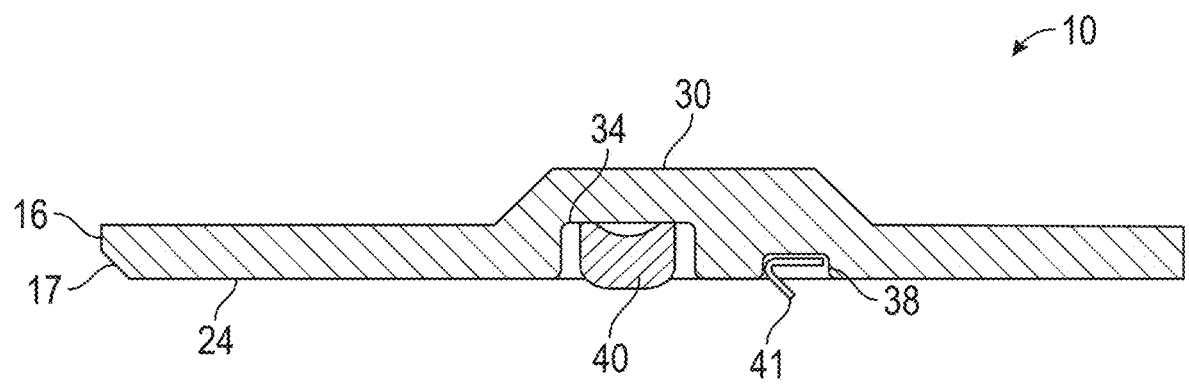
FIG. 5C is a section view of a portion of the conduit coupler of FIG. 1 showing a seal in an uncompressed position.
Figure 5D:
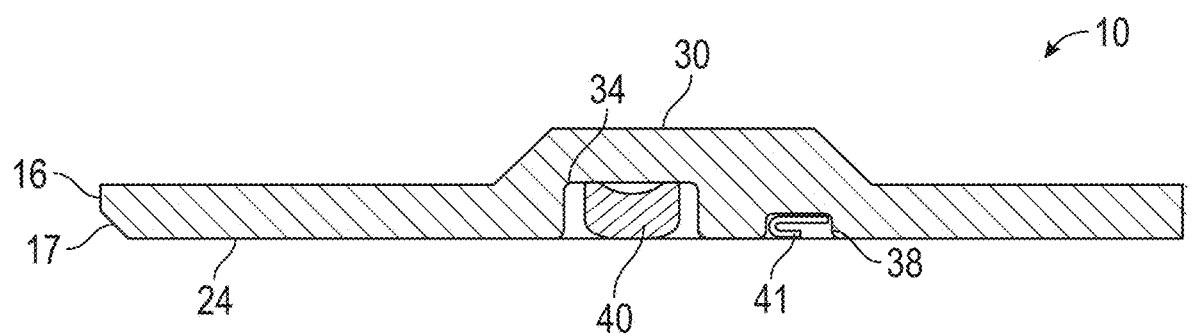
FIG. 5D is a section view of a portion of the conduit coupler of FIG. 1 showing a seal in a compressed position.

Referring now to FIGS. 5C-5D, seal 40 is shown in either of an uncompressed, or disengaged position (FIG. 5C) and a compressed, or engaged position (FIG. 5D). Seal 40 is configured to compress to a position recessed from inner surface 24 as conduit 50, 60 is inserted into coupler 10. In embodiments, seal 40 is in the uncompressed, or disengaged position, and seal 40 stands proud of the inner surface 24 of coupler 10.

Referring to FIGS. 5A-5D, in embodiments, one or more of first end 14 and second end 16 are bell-shaped (not shown) to facilitate easier installation of first conduit 50 and second conduit 60. In embodiments, each of first end 14 and second end 16 include a chamfered edge 17 to facilitate easier installation of first conduit 50 and second conduit 60.

Figure 6A:
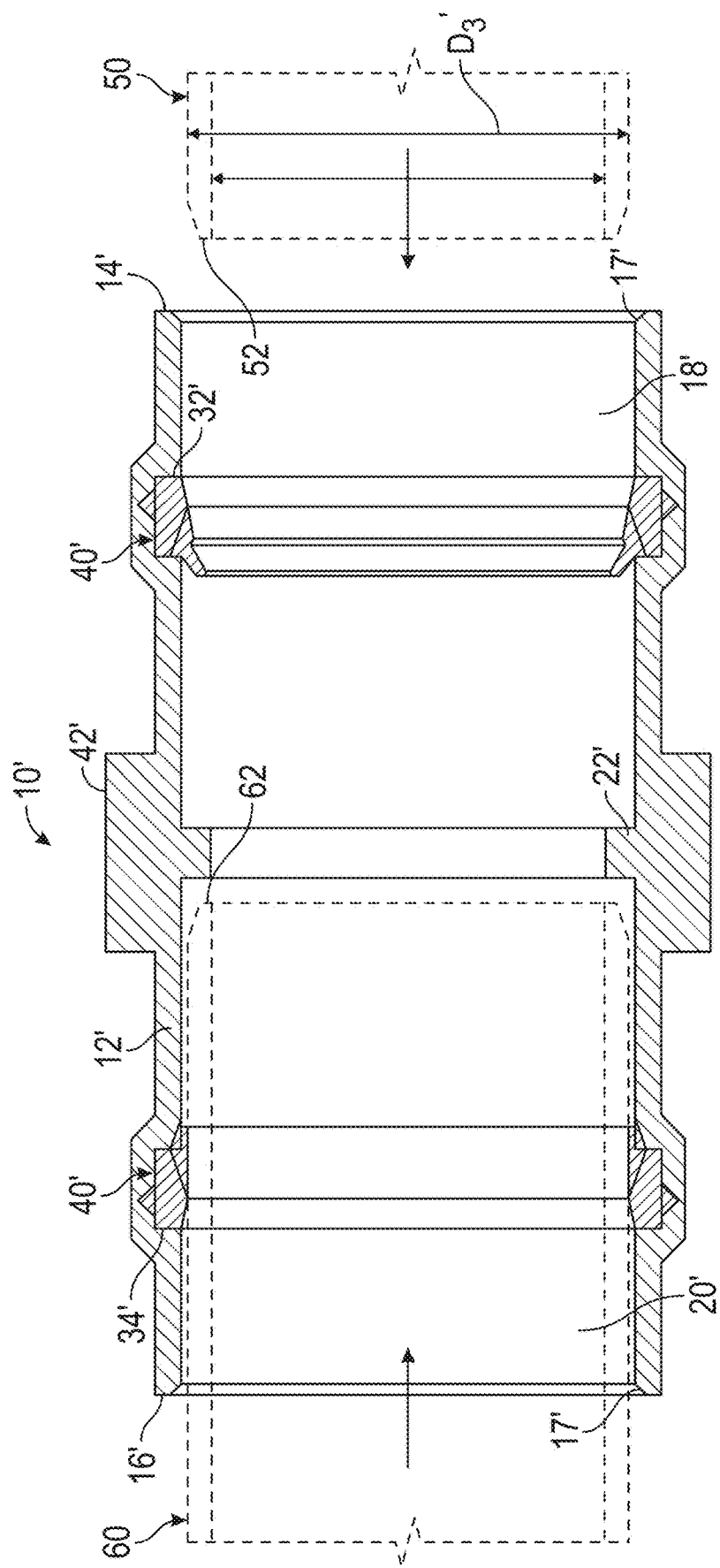
FIG. 6A is a section view of an alternative conduit coupler of the present disclosure with a first conduit positioned in the coupler and a second conduit positioned adjacent the coupler.
Figure 6B:
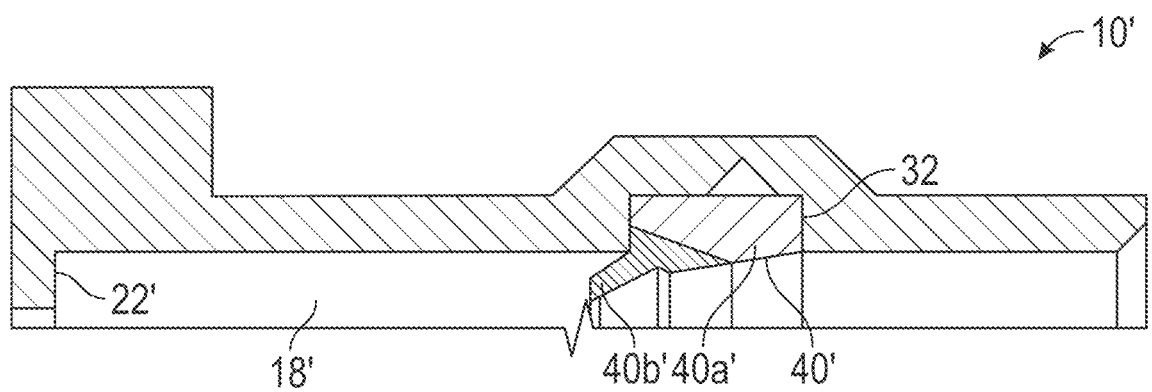
FIG. 6B is a section view of a portion of the alternative conduit coupler of FIG. 6A showing a seal in a disengaged position.
Figure 6C:
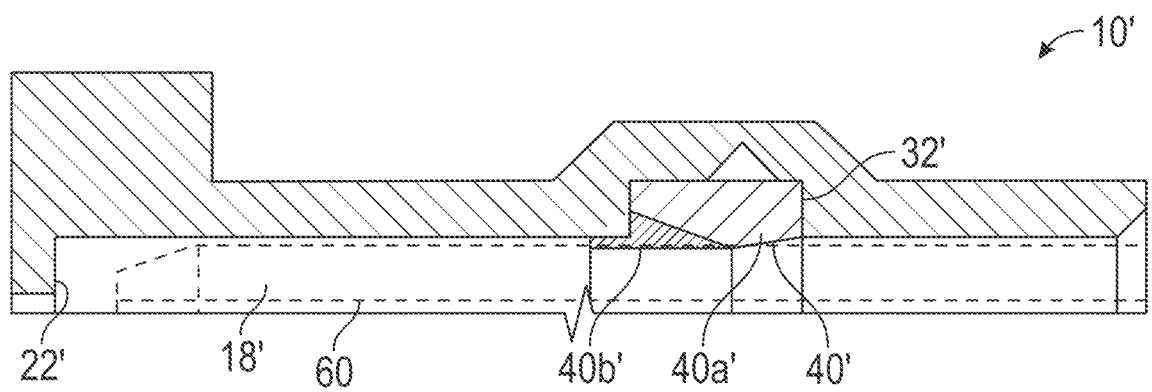
FIG. 6C is a section view of a portion of the alternative conduit coupler of FIG. 6B showing a seal in an engaged position.
Figure 7:
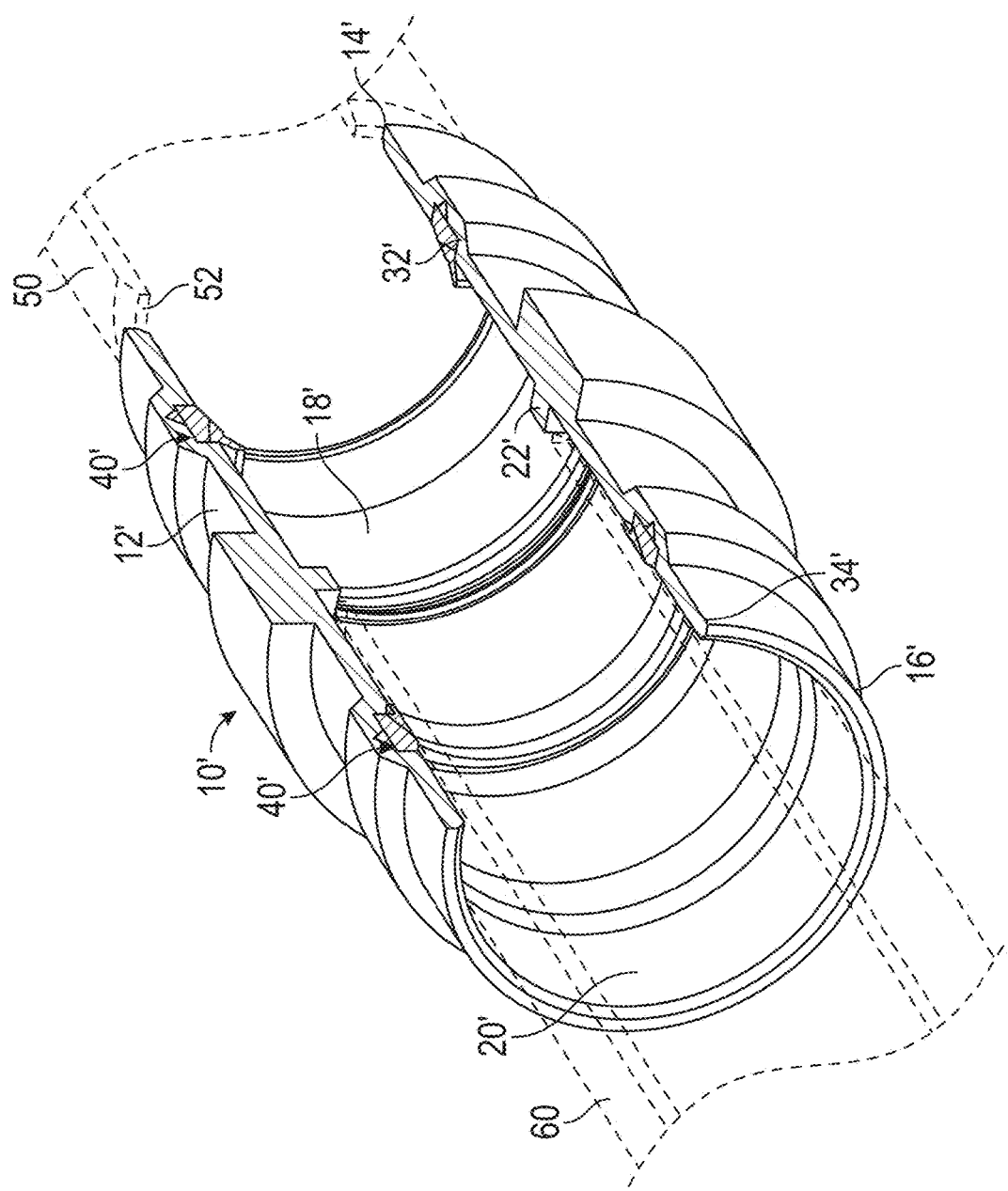
FIG. 7 is a perspective section view of the conduit coupler of FIG. 5.

Referring now to FIGS. 6A-7, an alternative coupler 10' may include various configuration which include extra shoulders, undulations, or other surface features (e.g., a central shoulder 42' positioned on an outer surface 26'). In embodiments, coupler 10' includes only a first annular recess 32' and a second annular recess 34'. In embodiments, coupler 10' is similar, or substantially similar to coupler 10, and they may have similar dimensions.

Still referring to FIGS. 6A-7, alternative coupler 10' is configured to receive first conduit 50, or first pipe 50, within a first portion 18' and a second conduit 60, or second pipe 60, within a second portion 20'. First conduit 50 generally has a first end 52 and a second end (not shown) which define a first length (not shown), and second conduit has a first end 62 and a second end 64 (FIG. 8) which define the fourth length L4 (FIG. 8). Each of first conduit 50 and second conduit 60 are substantially similar and have an outer diameter D3', which is greater than diameter D2 and less than diameter D1. In embodiments, outer diameter D3' is identical to outer diameter D3 of coupler 10. That is, first conduit 50 and second conduit 60 are sized to fit within and extend into each of first portion 18' and second portion 20' and abut shoulder 22'. As shown in FIG. 5, first conduit 50 is positioned outside coupler 10' and second conduit 60 is positioned within second portion 20' of coupler 10'. In embodiments, seal 40' is a one-way seal, or one-way gasket 40' within first portion 18' is shown in the disengaged position when first conduit 50 is not positioned within first portion 18'. One-way gasket 40' within second portion 20' is shown in the engaged position when second conduit has been inserted into, and positioned in, second portion 20'. When either of first conduit 50 or second conduit 60 are inserted into first portion 18' or second portion 20', respectively, one-way gasket 40' deforms from the disengaged position to the engaged position. In the engaged position, one-way gasket 40' is configured to place a clamping force onto conduit 50, 60 and increase the force required to remove conduit 50, 60 from coupler 10'.

Still referring to FIGS. 6A-7, conduit 60 is shown inserted into second portion 20' of alternative coupler 10' and gasket 40' is in the engaged position. As conduit 60 is inserted into second portion 20', first end 62 is configured to approach inner flange 22'. In embodiments, first end 62 is configured to contact inner flange 22'. That is, inner flange 22' is a stopping member for conduit 60. In embodiments, first conduit 50 is configured to be inserted into first portion 18' and will be stopped by inner flange 22'.

In embodiments, each of the first conduit 50, second conduit 60, and coupler 10' are made of a high density polyethylene (HDPE) material. In embodiments, one or more of first conduit 50, second conduit 60, and coupler 10' are made of a HDPE material and the other of the first conduit 50, second conduit 60, and coupler 10' are made of another material, such as a rubber, carbon fiber, metal, plastic, or another polymeric material. Conduit 50, 60 is configured to support and provide a path for fluidic materials to flow. In embodiments, conduits 50, 60 are configured to support electrical cables, telecommunications equipment or cables, water, waste, or other materials.

Still referring to FIGS. 6A-7, in embodiments, one or more of first end 14' and second end 16' are bell-shaped (not shown) to facilitate easier installation of first conduit 50 and second conduit 60. In embodiments, each of first end 14' and second end 16' include a chamfered edge 17' to facilitate easier installation of first conduit 50 and second conduit 60.

Referring to FIGS. 6B-6C, gasket 40' is shown in each of a disengaged position (FIG. 6B) and an engaged position (FIG. 6C). Gasket 40' generally includes a main body portion 40a' and a leg portion 40b'. Main body portion 40a' is configured sit within annular recesses 32', 34', and leg portion 40b' is configured to extend into first portion 18' and second portion 20'. When conduit 50, 60 are inserted into first portion 18', second portion 20', respectively, gasket 40' transitions from disengaged position to the engaged position. In the disengaged position, leg portion 40b' stands proud of inner surface 24' extending generally inwardly. In the engaged position, leg portion 40b' is compressed downwardly toward the inner surface 24' of coupler 10'. Leg portion 40b' extends generally inwardly and toward the center of coupler 10' (e.g., toward axis X2).

Referring to FIGS. 8-15, a method of joining conduits assemblies is provided, and either of couplers 10, 10' may be used to join one or more conduits (e.g., conduits 50, 60). In embodiments, couplers 10, 10' operate substantially similarly or identically and may be used interchangeably. In embodiments, couplers 10, 10' may have substantially similar or identical dimensions.

Referring now to FIG. 8, a plurality of conduit assemblies 70 are positioned in a bank 72. That is, a second conduit assembly 70 is positioned adjacent the first conduit assembly. In embodiments, multiple conduit assemblies 70 are positioned adjacent each other, or in proximity to each other. Conduit assemblies 70 are generally comprised of a conduit 50, 60 and a coupler 10 coupled to, and overlapping a portion of, conduit 50, 60. Each conduit assembly 70 has a fifth length L5 greater than fourth length L4. Fifth length L5 is approximately equal to the fourth length L4 of conduit 50, 60 plus approximately half of first length L1 of coupler 10. In embodiments, the plurality of conduit assemblies 70 are positioned in a matrix configuration (e.g., 3×4 configuration; three rows and four columns of conduit assemblies 70). In embodiments, bank 72 may have a plurality of matrix configurations (e.g., 1×1 configuration, 1×2 configuration, 2×2 configuration, 2×3 configuration, 3×3 configuration, etc.). In embodiments, the matrix configuration may be any number of conduit assemblies 70 in any arrangement. Bank 72 may be configurable according to the specifications of a given project (e.g., bank 72 may be configured wider, narrower, taller, or shorter to meet the needs of a given project).

Still referring to FIG. 8, conduit assemblies 70 are supported by one or more supports 74 which may appropriately space apart conduit assemblies 70. Supports 74 may be identical to ensure conduit assemblies 70 are spaced and supports 74 may be configured to ensure that conduit assemblies are flat, or horizontal. In embodiments, supports 74 may be non-identical and configured to allow conduit assemblies to lie offset from horizontal (i.e., angled relative to a horizontal plane).

Figure 9:
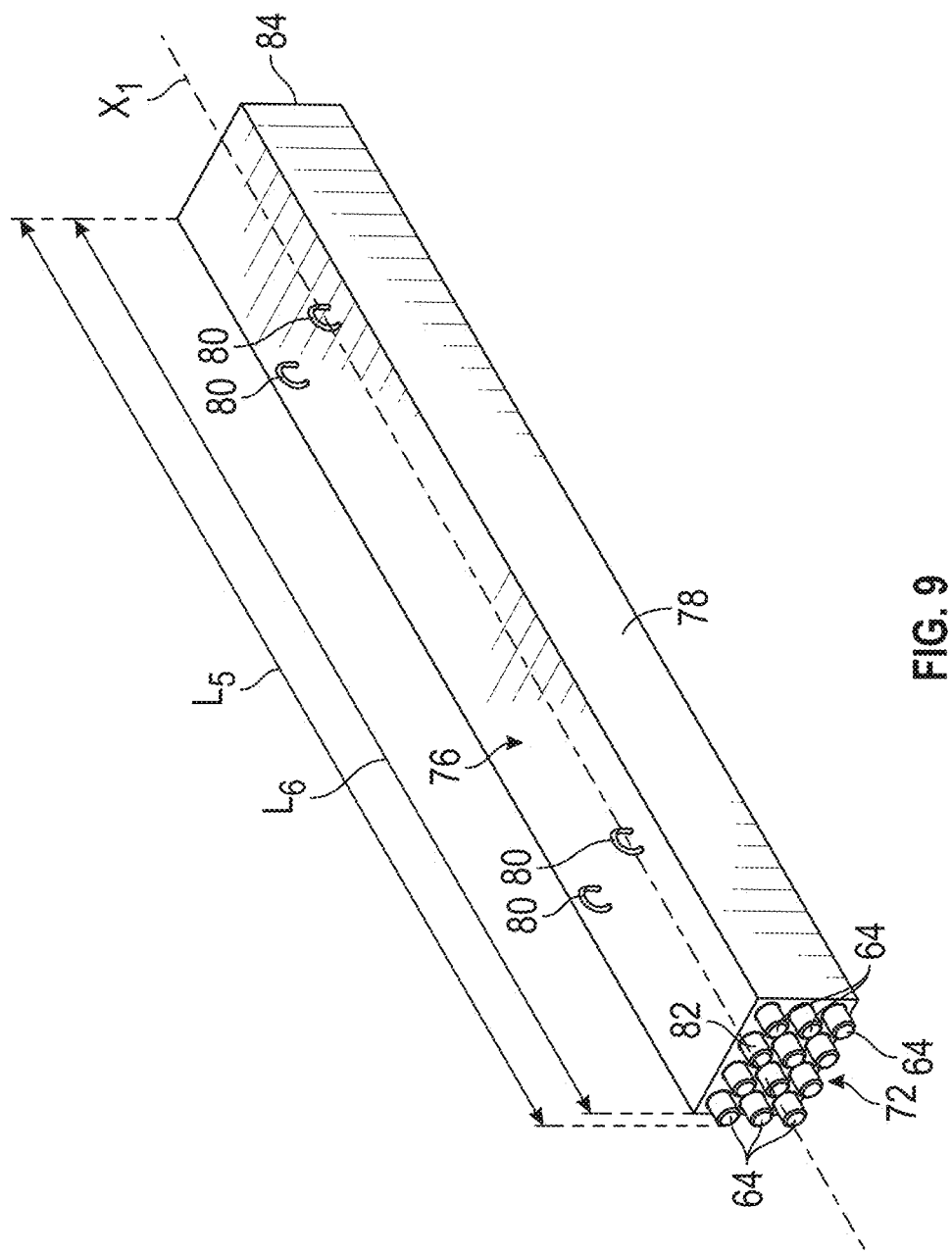
FIG. 9 is a perspective view of a bank assembly encased in a covering material.
Figure 10:
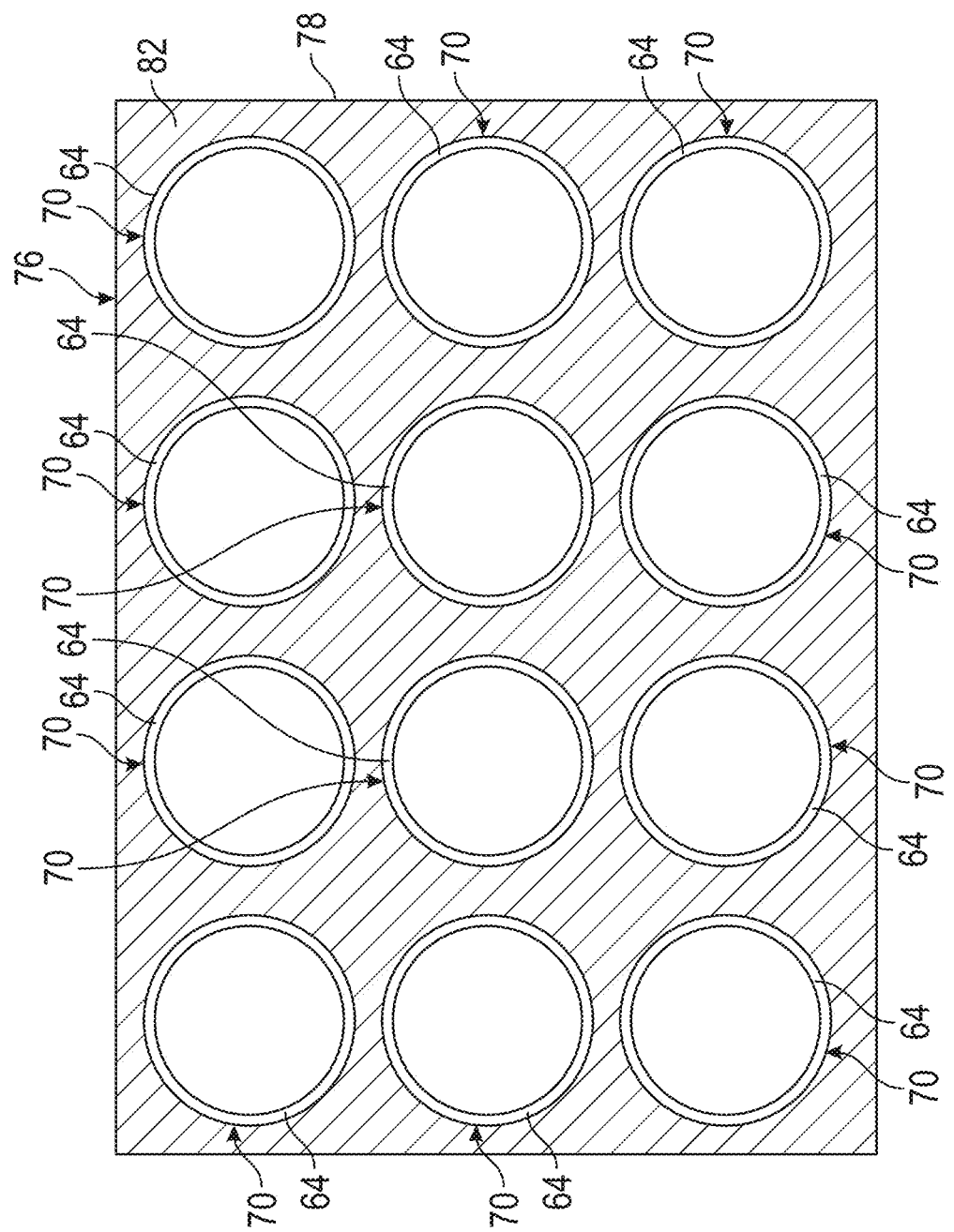
FIG. 10 is a front view of the bank assembly of FIG. 8.

Referring now to FIG. 9, a bank assembly 76, or encased bank 76, is created by covering each of conduit assemblies 70 within bank 72 with a material 78. In embodiments, bank 72 is positioned within a mold (not shown) and material 78 is poured around bank 72 to create bank assembly 76. In embodiments, material 78 is concrete. Bank assembly 76 may also comprise one or more handles 80 to allow bank assembly 76 to be moved around by one or more persons or machines (e.g., crane). In embodiments, a molding machine receives bank assembly 76, one or more walls surrounds bank 72, and material is poured around bank 72 to encase conduit assemblies 70 in material 78. Bank assembly 76 extends generally longitudinally parallel to longitudinal axis X1. Illustratively, bank assembly 76 has a first wall 82 positioned at a first longitudinal extent of bank assembly 76 and a second wall 84 is positioned at a second longitudinal extent of bank assembly 76 opposite first wall 82.

Figure 11:
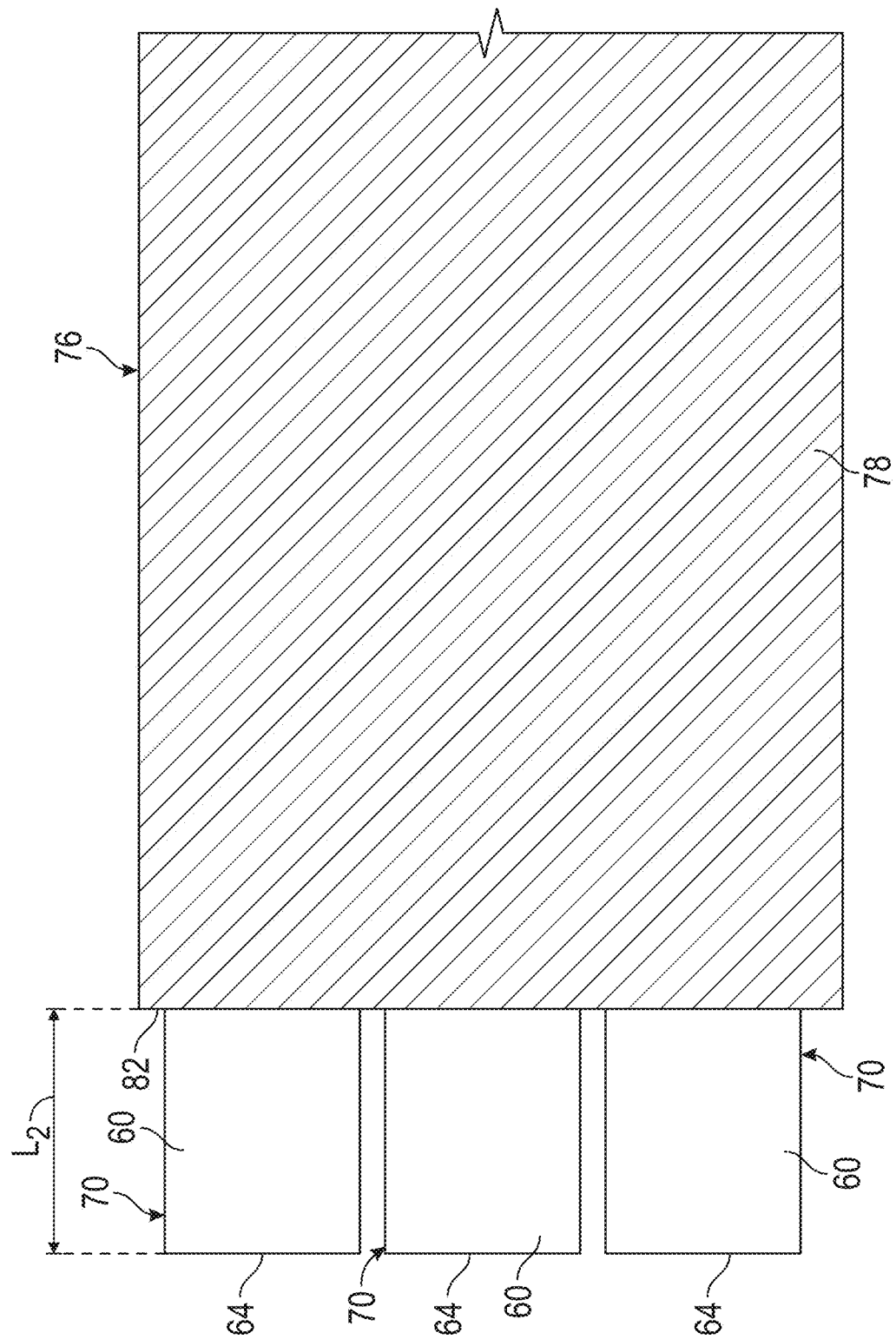
FIG. 11 is a partial top view of the bank assembly of FIG. 8.

Still referring to FIG. 9, material 78 has a sixth length L6 along longitudinal axis X1 that is less than fifth length L5 of conduit assemblies 70. In embodiments, sixth length L6 is approximately equal to fourth length L4. Material 78 covers less than the entirety of conduit assemblies 70 so that a portion of conduit assemblies 70 extend beyond a longitudinal extent of first wall 82. In embodiments, conduit assemblies 70 extend beyond a longitudinal extent of either of first wall 82 or second wall 84. In embodiments, second end 64 of conduit assembly 70 extends beyond first wall 82. In embodiments, a portion of coupler 10 extends beyond a longitudinal extent of either of first wall 82 or second wall 84. In embodiments, a portion of conduit assemblies 70 extend beyond a longitudinal extent of both of first wall 82 and second wall 84. In embodiments, second end 64 of second conduit 60 extends beyond first wall 82 a distance approximately equal to second length L2 (FIG. 11). In embodiments, the matrix of conduit assemblies 70 (FIG. 9) are all configured to extend beyond first wall 82 a distance approximately equal to second length L2. A corresponding matrix of couplers 10 are configured to mirror the matrix of conduit assemblies 70.

Referring now to FIGS. 12-15, a method of assembling multiple bank assemblies 76 to fluidly couple conduit assemblies 70 includes positioning a first bank assembly 76 and a second bank assembly 76' in an aligned manner such that the conduit assemblies 70, 70' are laterally aligned and parallel to one another and bank assembly 76 is longitudinally offset from bank assembly 76'. Throughout FIGS. 8-15, second bank assembly 76' will be denoted with a prime (') notation to delineate the separate bank assemblies. In embodiments, bank assembly 76 and bank assembly 76' are identical. FIGS. 12-15 illustrate a first bank assembly 76 and a second bank assembly 76'. In embodiments, a plurality of bank assemblies may be constructed and assembled to create a fluidly coupled conduit assembly of any length desired. The plurality of bank assemblies 76, 76' may be positioned underneath a ground surface 100 and subsequently covered and buried with earth, dirt, concrete, or other material. In embodiments, the plurality of bank assemblies 76, 76' may be positioned above a ground surface 100.

Figure 12:
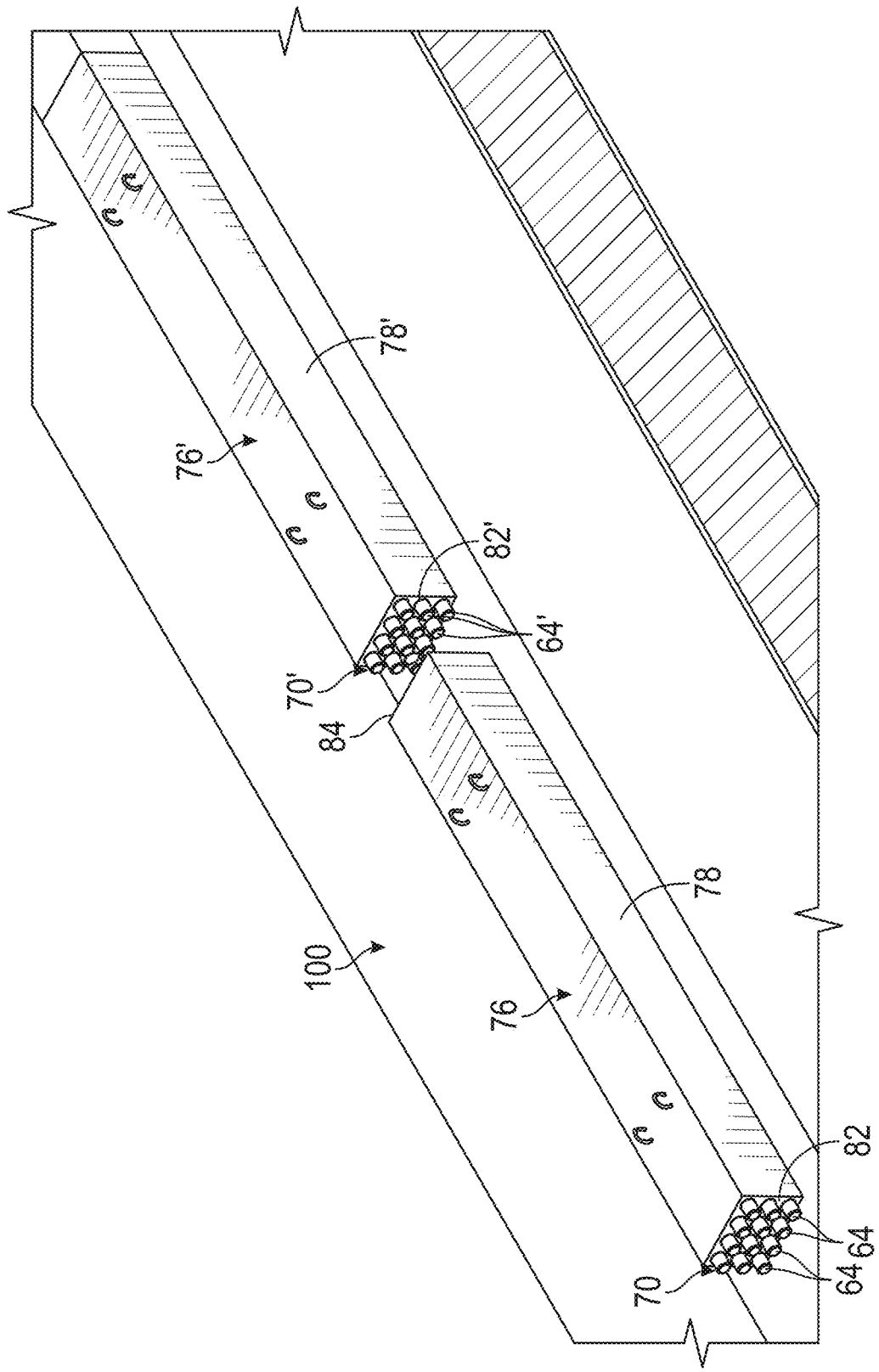
FIG. 12 is a perspective view of a pair of aligned bank assemblies.
Figure 13:
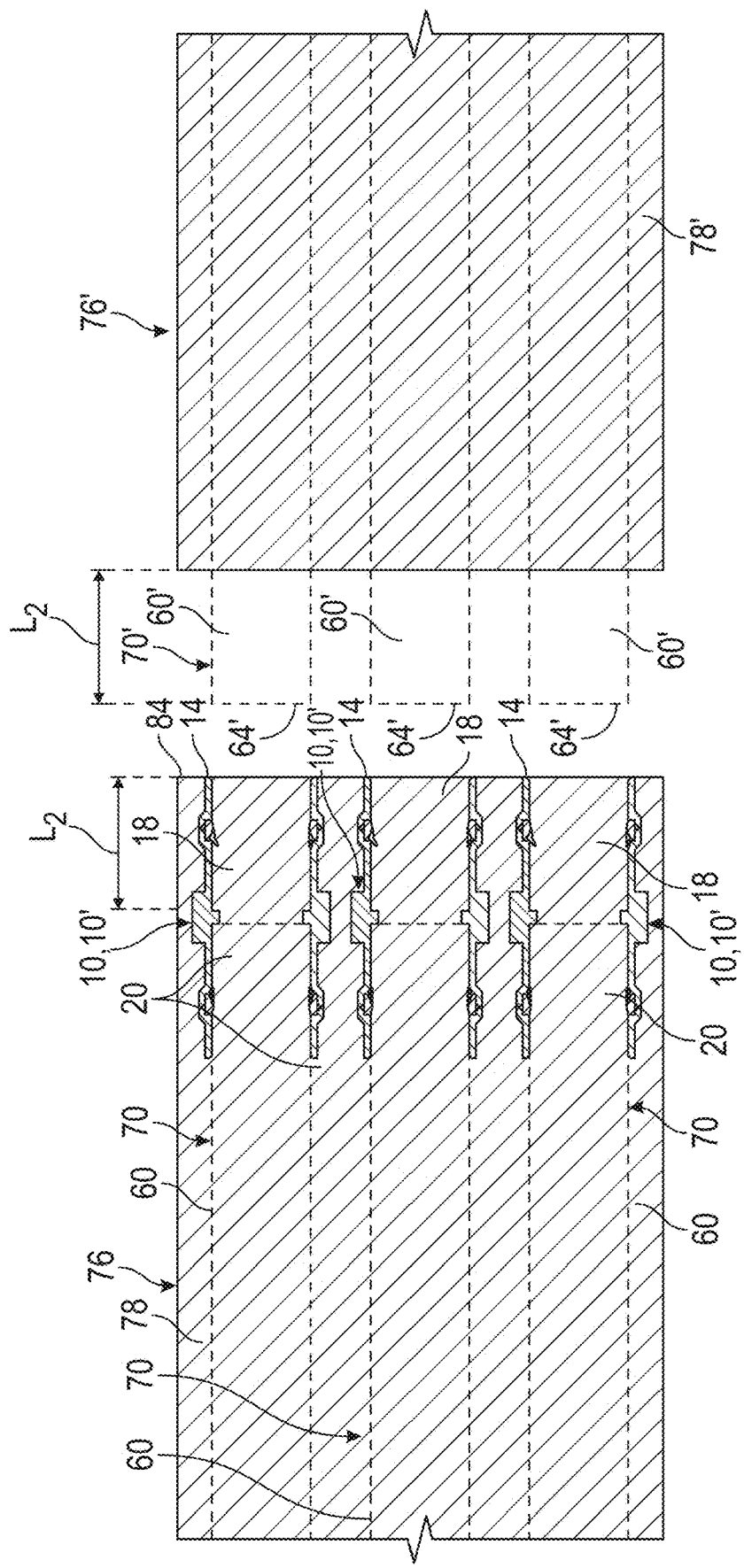
FIG. 13 is a top view of the aligned bank assemblies of FIG. 11.

Referring to FIGS. 12-13, second bank assembly 76' is positioned so that conduit assemblies 70, 70' are aligned. That is, for example, when each of conduit assemblies 70, 70' are viewed from the same perspective (e.g., looking at first wall 82 and first wall 82'), conduit assembly 70 in the top left corner of bank assembly 76 and conduit assembly 70' in the top left corner of bank assembly 76' are positioned coaxially and conduit assembly 70 in the bottom right corner of bank assembly 76 and conduit assembly 70' in the bottom right corner of bank assembly 76' are positioned coaxially. In embodiments, second end 64 of conduit 60 extends beyond first wall 82 of bank assembly 76 and second wall 84 of bank assembly 76 is substantially flush with first end 14 of coupler 10.

Referring to FIG. 13, bank assembly 76' is positioned so that second end 64' of conduit assemblies 70' are positioned to be inserted into first portion 18 of couplers 10 in bank assembly 76. Coupler 10 is completely encased within bank assembly 76 and prior to insertion of second end 64' of conduit assemblies 70', first portion 18 is configured to receive second end 64' and one-way gasket 40 within first portion 18 is in the disengaged position. Further, each first portion 18 of each coupler 10 within bank assembly 76 has a one-way gasket 40 in the disengaged position prior to the insertion of second end 64' of conduit assemblies 70'.

Figure 14:
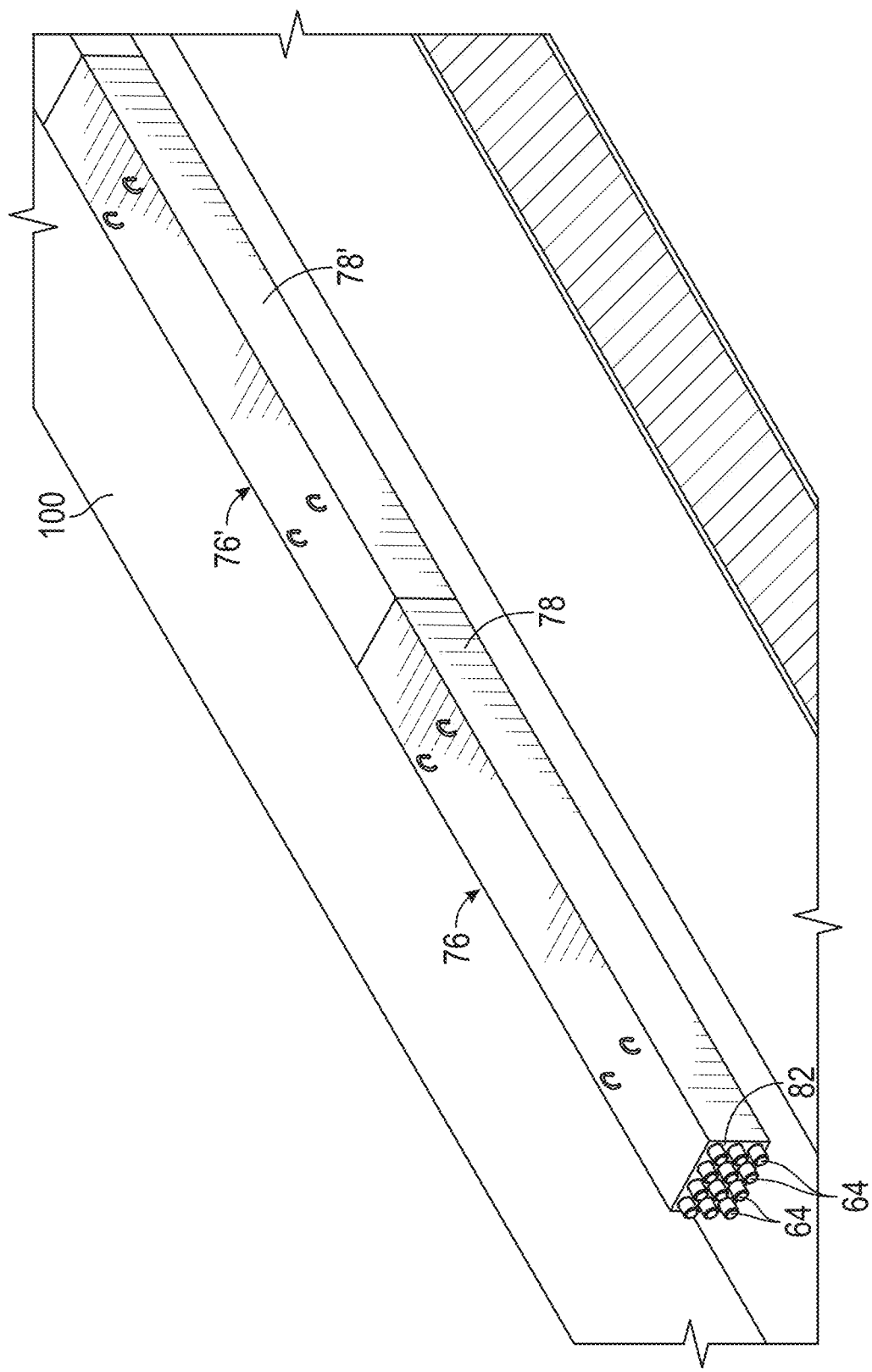
FIG. 14 is a perspective view of a pair of coupled bank assemblies.
Figure 15:
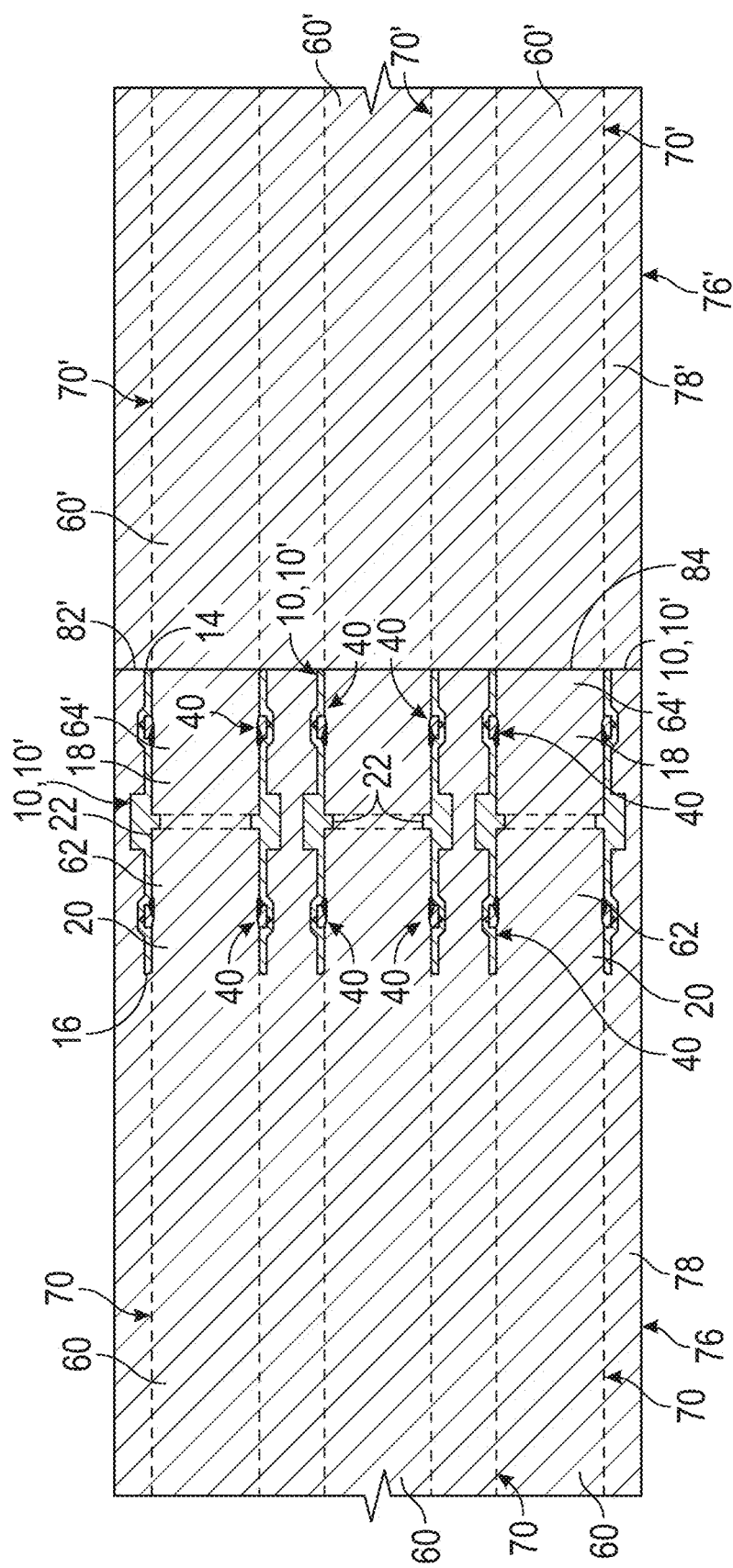
FIG. 15 is a top view of the coupled bank assemblies of FIG. 13.
Figure 16:
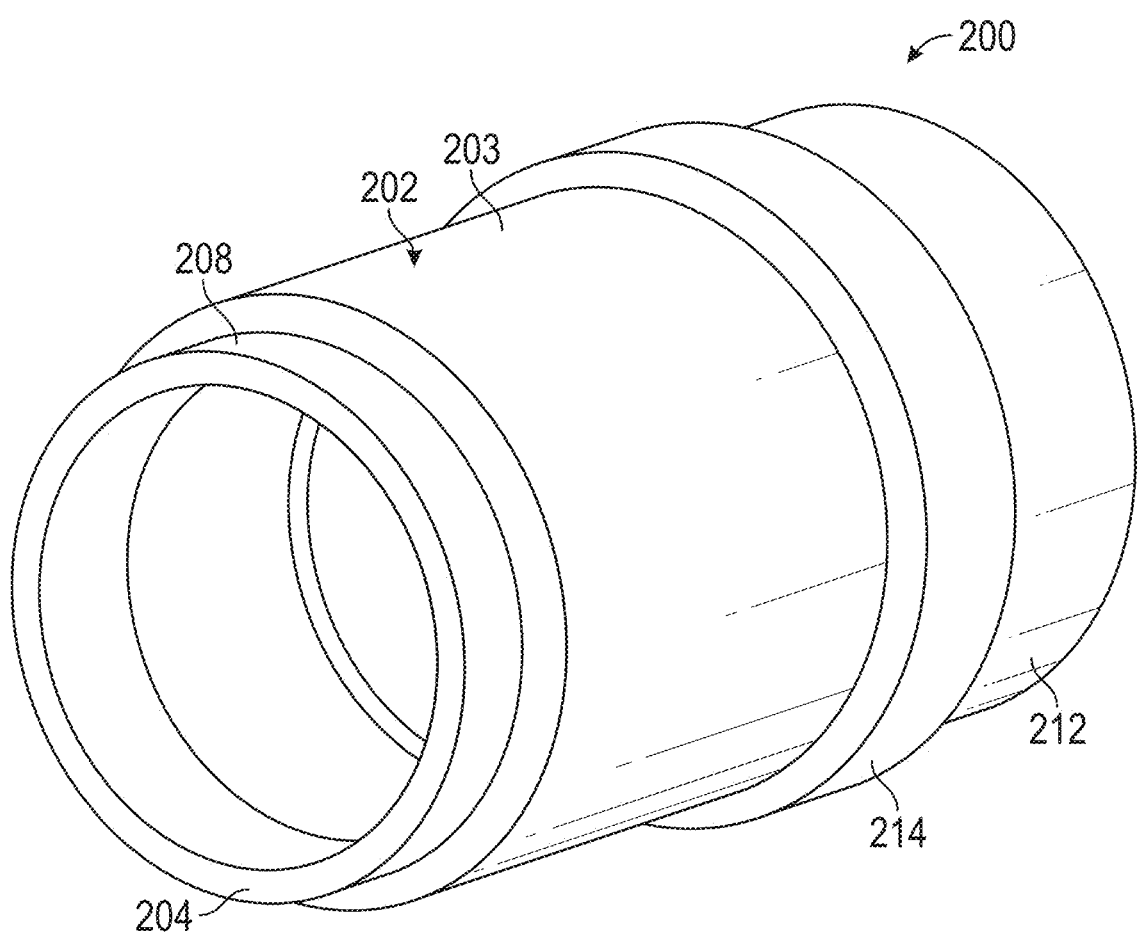
FIG. 16 is a perspective view of a coupler of the present disclosure.
Figure 17:
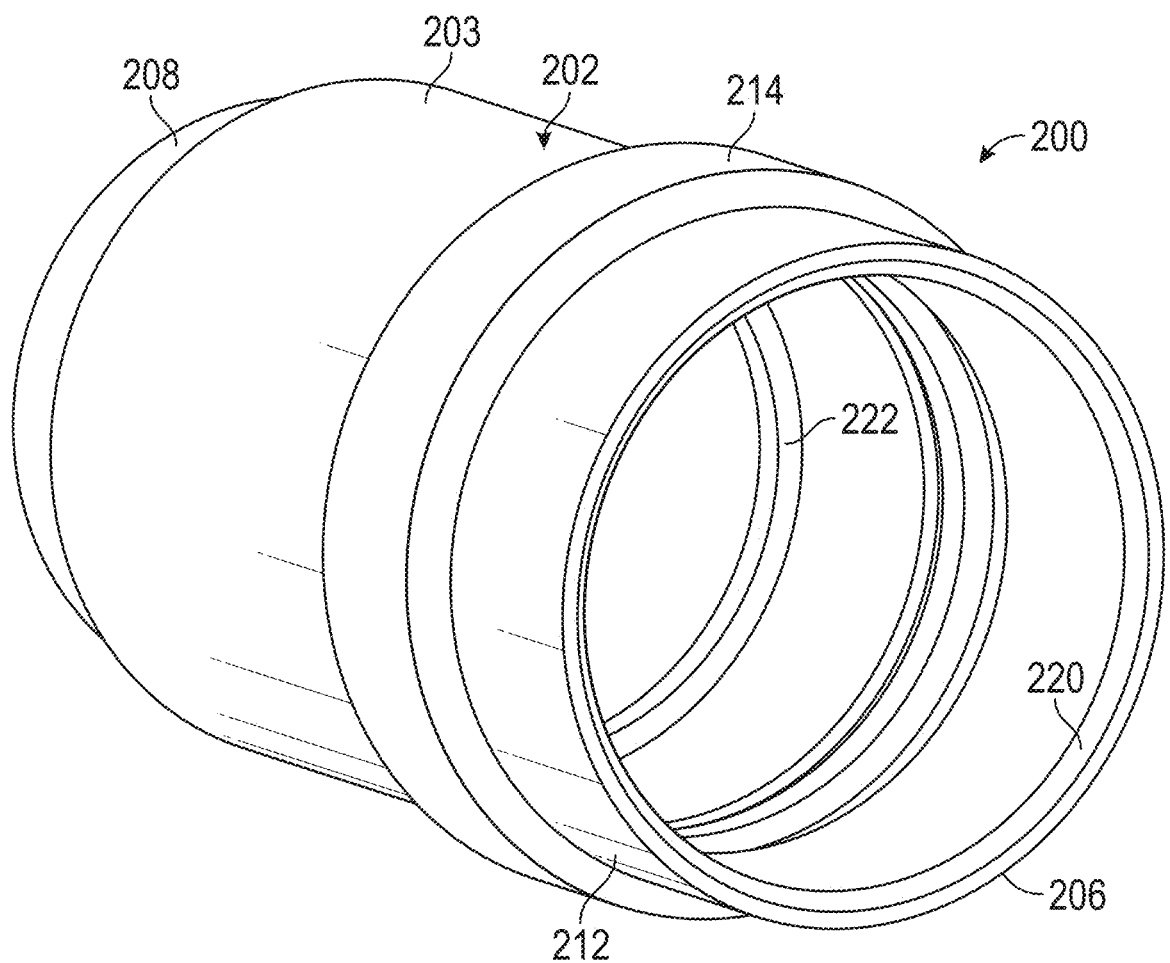
FIG. 17 is a perspective view of the coupler of FIG. 16.
Figure 18:
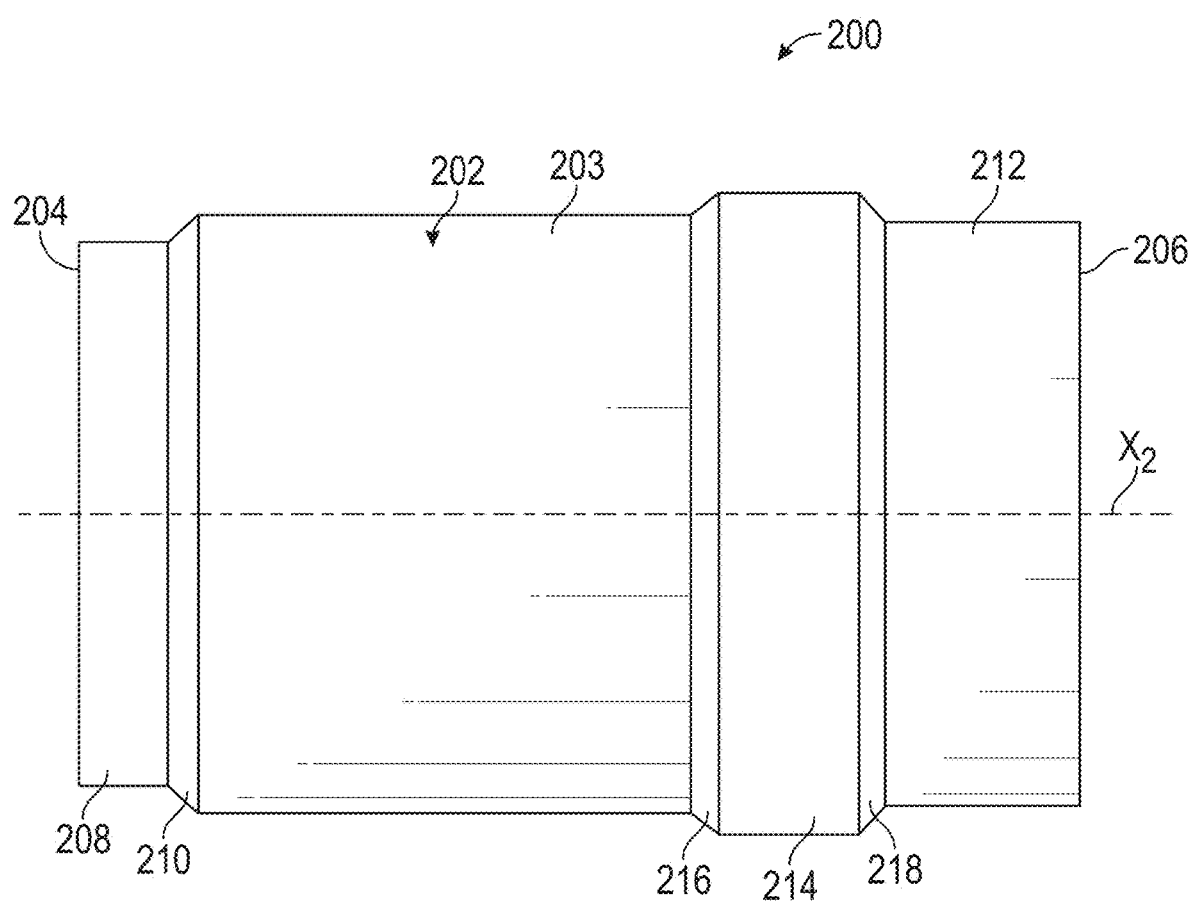
FIG. 18 is a top view of the coupler of FIG. 16.
Figure 19:
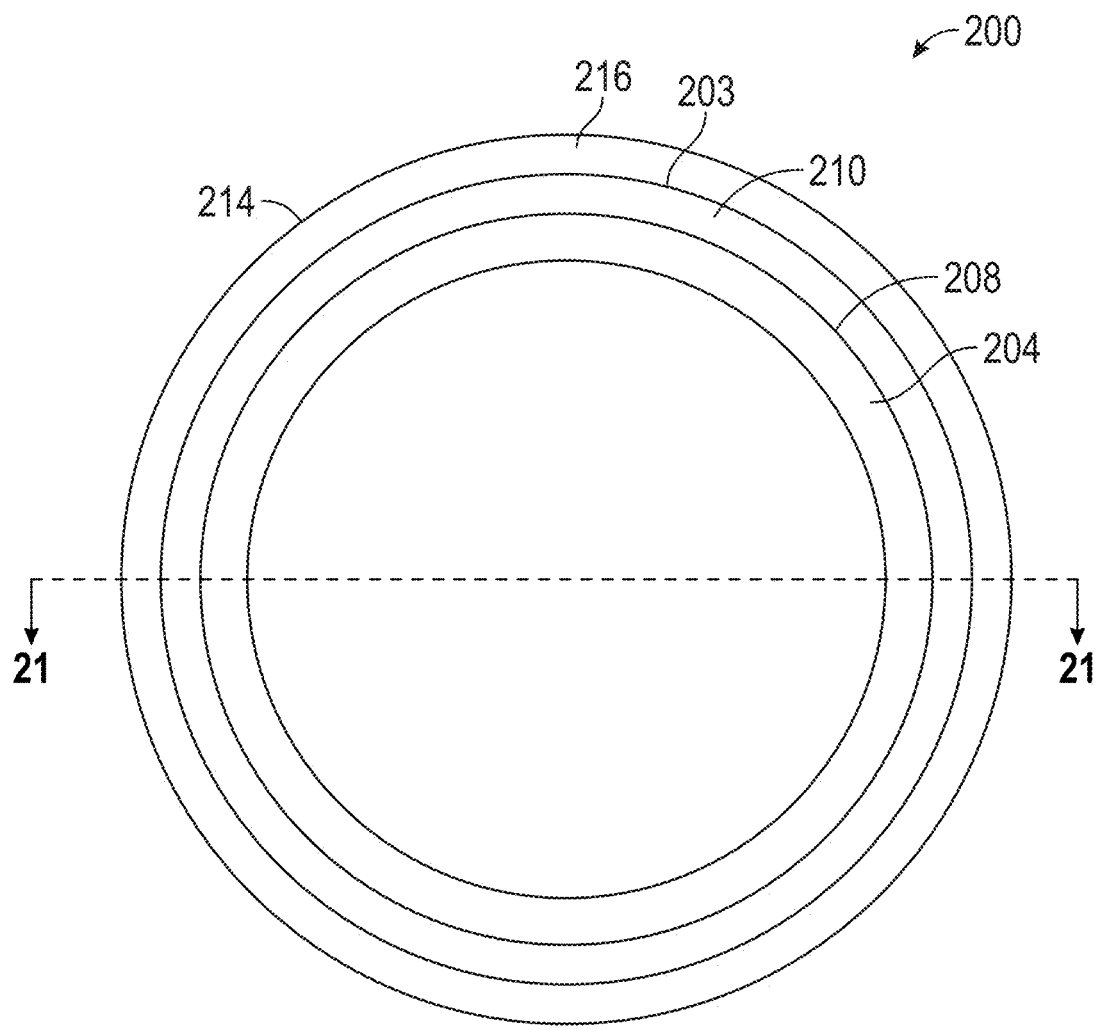
FIG. 19 is a left side view of the coupler of FIG. 16.
Figure 20:
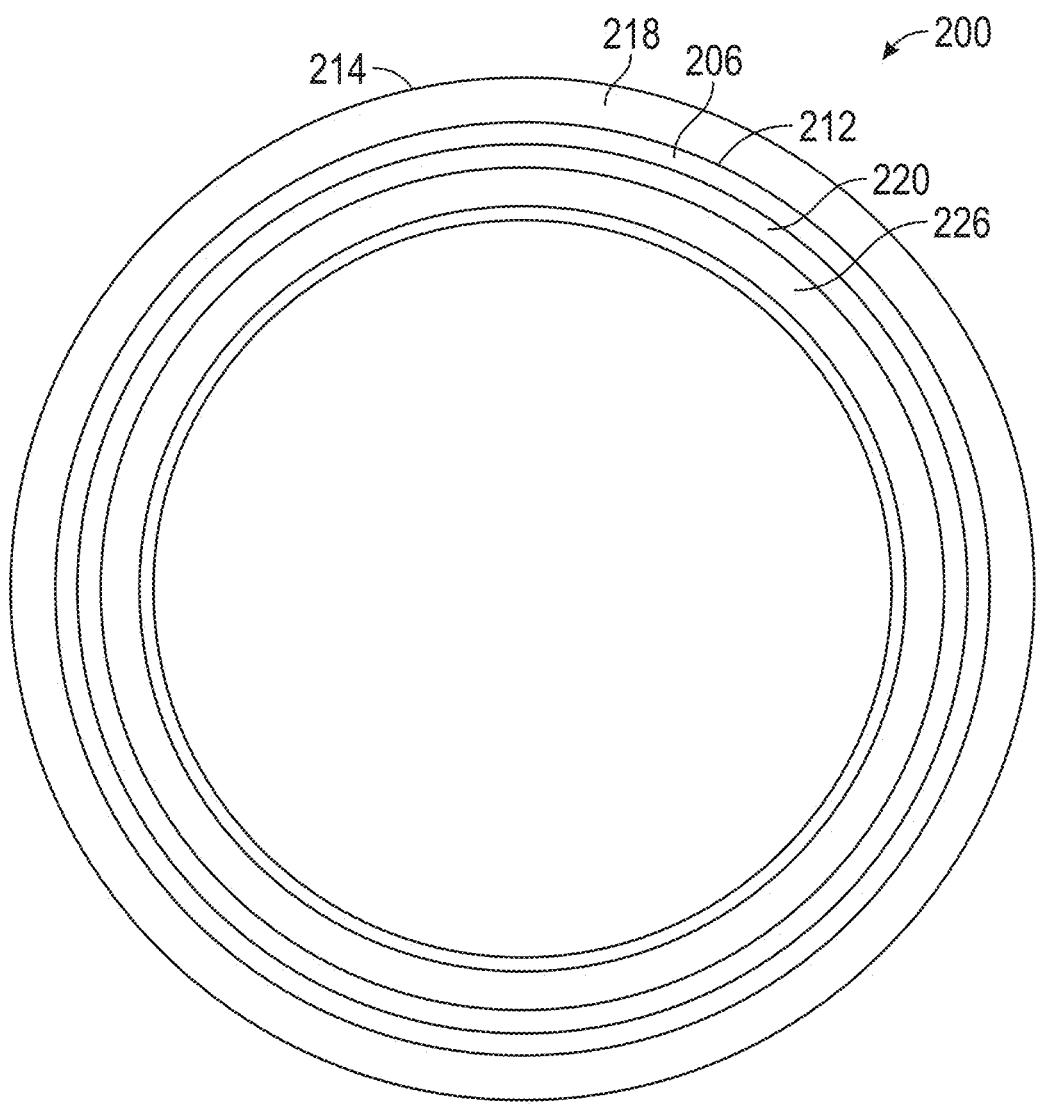
FIG. 20 is a right side view of the coupler of FIG. 16.

Referring now to FIGS. 14-15, bank assembly 76 may be coupled to bank assembly 76' by positioning the second ends 64' of the matrix of conduit assemblies 70' within first portions 18 of the matrix of couplers 10 in bank assembly 76. That is, when second ends 64' of conduit assemblies 70' are positioned within first portions 18, conduit assembly 70 of bank assembly 76 is fluidly coupled with the corresponding conduit assembly 70' of bank assembly 76'. Second wall 84 of bank assembly 76 interfaces with first wall 82' of bank assembly 76', creating a generally continuous surface across a top surface of bank assembly 76 and bank assembly 76'. Further, when second wall 84 interfaces with, or contacts, first wall 82', the conduit assemblies 70, 70' are sealed within material 78, 78'. In embodiments, a sealing material, adhesive material, or other joining material may be placed between second wall 84 and first wall 82'.

In embodiments, multiple bank assemblies 76 can be placed beside each other, on top of each other, or in any arrangement to create optimal solutions for transporting material (e.g., water, waste, etc.).

In embodiments, bank assemblies 76 may be configured with conduits 50, 60 that are curved, that are inclined, declined, or otherwise shaped to accommodate the material flow path required.

In embodiments, referring to FIG. 15, first end 14 of couplers 10 have a bell shaped end (e.g., first portion 18 gets wider as it goes outwardly to first end 14). Bell shaped end increases the size of first end 14 to make it easier to fit second end 64' of conduit assemblies 70' into first portion 18 when coupling or joining bank assembly 76 to bank assembly 76'.

Referring now to FIGS. 16-21, an alternative coupler 200 includes a body 202. In embodiments, body 202 is generally cylindrically shaped and extends along a centerline X2. Coupler 200 includes a first extent 204 and a second extent 206. Body 202 includes a first portion 203, a second portion 208 positioned adjacent first extent 204 and a chamfered portion 210 extends between first portion 203 and second portion 208. A third portion 212 is positioned adjacent second extent 206, and a shoulder 214 is positioned intermediate first portion 203 and third portion 212. A chamfered portion 216 extends between shoulder 214 and first portion 203 and a chamfered portion 218 extends between shoulder 214 and third portion 212. In embodiments, second extent 206 defines a chamfered edge 220.

Figure 21:
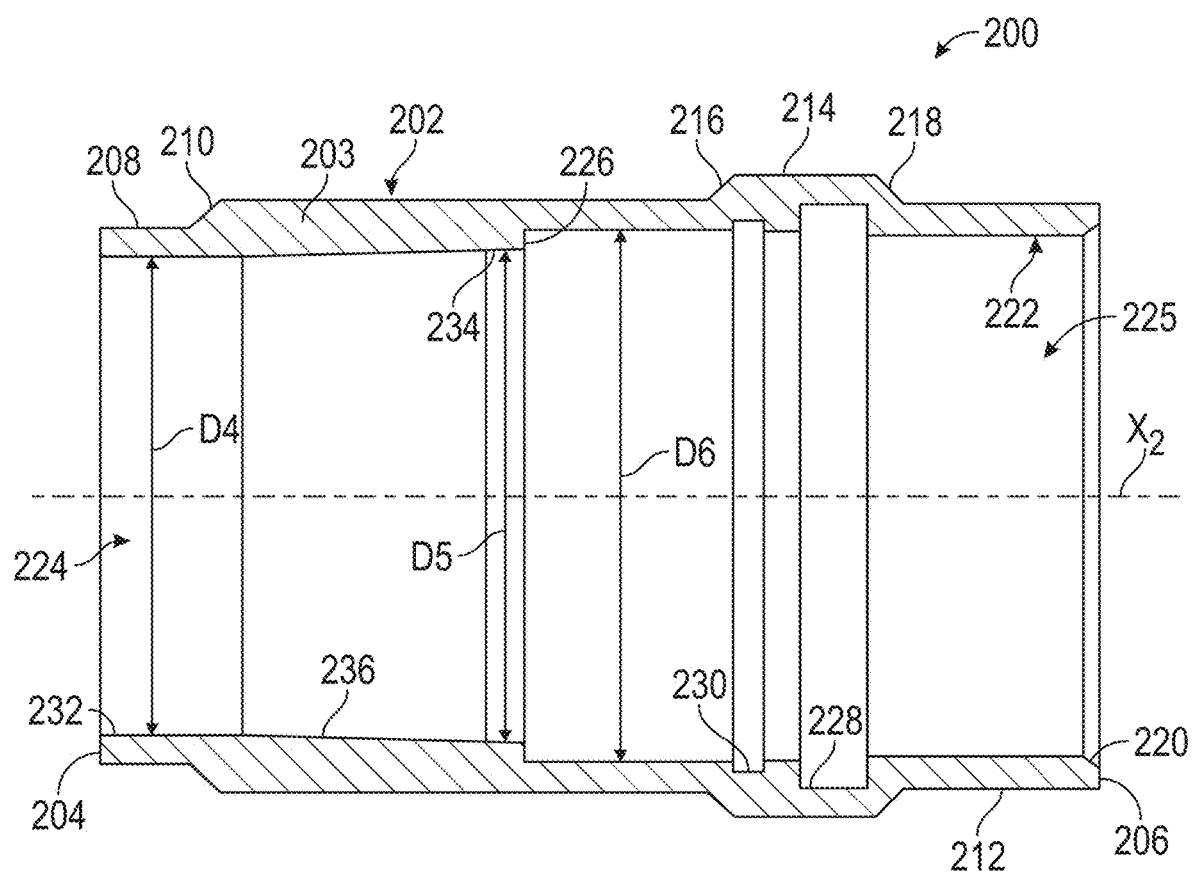
FIG. 21 is a section view of the coupler of FIG. 16 taken along line 21-21 of FIG. 19.

Referring to FIG. 21, coupler 200 includes a first inner portion 224 positioned adjacent first extent 204 and a second inner portion 225 positioned adjacent second extent 206, and a shoulder 226 is positioned intermediate first inner portion 224 and second inner portion 225. First portion 224 defines a first inner surface 232 defining a diameter D4, a second inner surface 234 defining a diameter D5, and a ramped surface 236 extending between first inner surface 232 and second inner surface 234. In embodiments, first inner surface 232 and second inner surface 234 define circular cross-sections and diameter D4 is smaller than diameter D5, and ramped surface 236 defines a variable diameter circular cross-section along the length of ramped surface 236 such that a smooth transition is made between first inner surface 232 and second inner surface 234. Second inner portion 225 defines an inner surface 222 defining a diameter D6. In embodiments, inner surface 222 defines a circular cross-section. In embodiments, diameter D6 is greater than diameter D5 and diameter D4. In embodiments, second inner portion 225 includes a first recess 228 and a second recess 230, and each of first recess 228 and second recess 230 are generally axially aligned with shoulder 214. In embodiments, coupler 200 may be formed of a high density polyethylene (HDPE). In embodiments, coupler 200 may be formed of a PVC material, a carbon fiber material, plastic material, metallic material, or another polymeric material.

Figure 22:
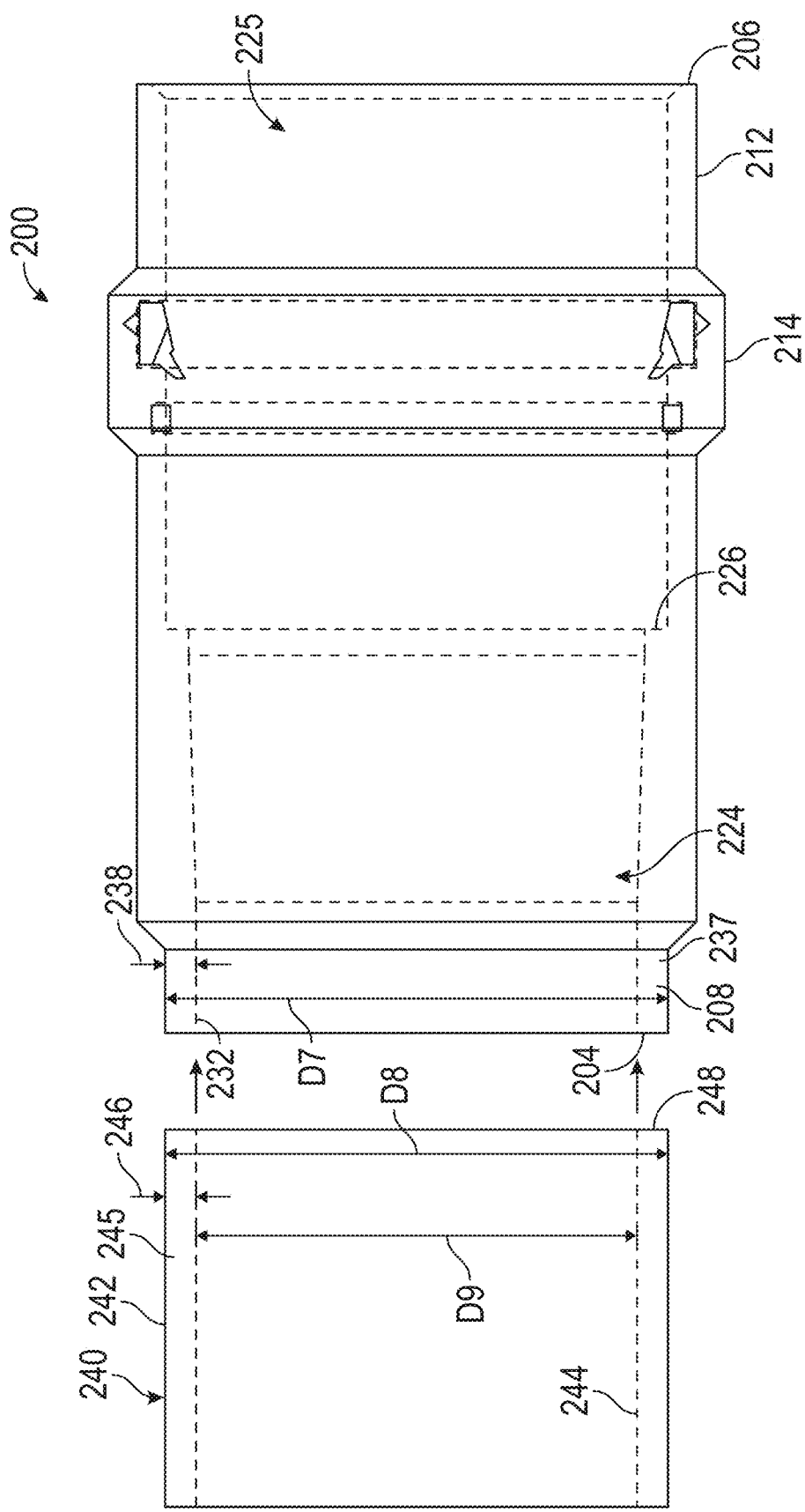
FIG. 22 is a top view of the coupler of FIG. 16 spaced apart from a conduit.

Referring now to FIG. 22, second portion 208 defines an outer diameter D7, and second portion 208 defines a wall 237 with a wall width 238. In embodiments, coupler 200 is operable to couple with a conduit 240. In embodiments, conduit 240 is a tubular member which may have a generally cylindrical profile and conduit 240 defines an outer surface 242, an inner surface 244, a wall 245, and an outer wall width 246. Conduit 240 also defines an outer diameter D8 and an inner diameter D9. Further, conduit 240 defines an axial extent 248. In embodiments, conduit 240 is positioned adjacent coupler 200 such that axial extent 248 of conduit 240 may be coupled to first extent 204 of coupler 200 (see FIG. 23). In embodiments, conduit 240 may be formed of HDPE.

Figure 23:
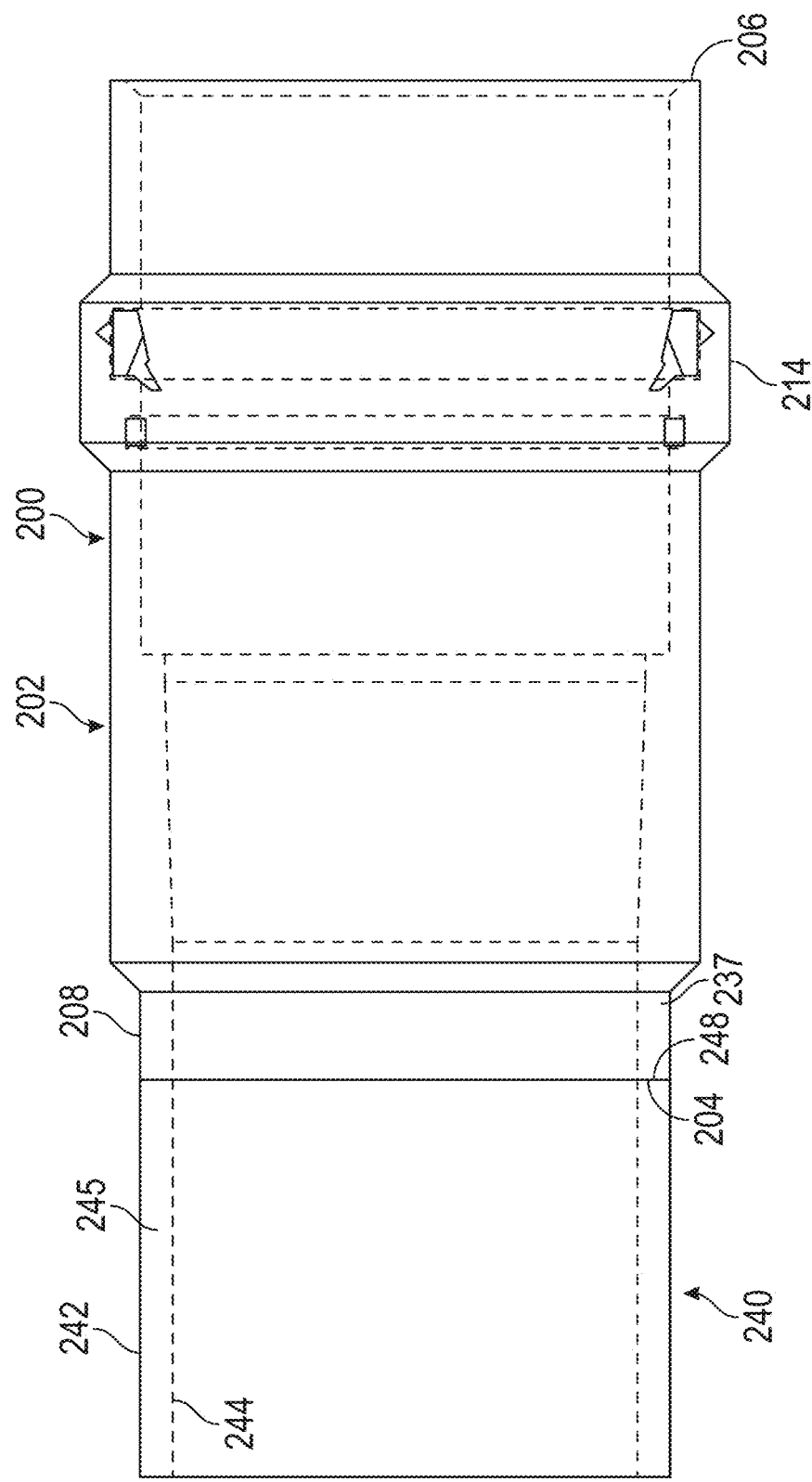
FIG. 23 is a top view of the coupler of FIG. 16 coupling with the conduit of FIG. 23.
Figure 24:
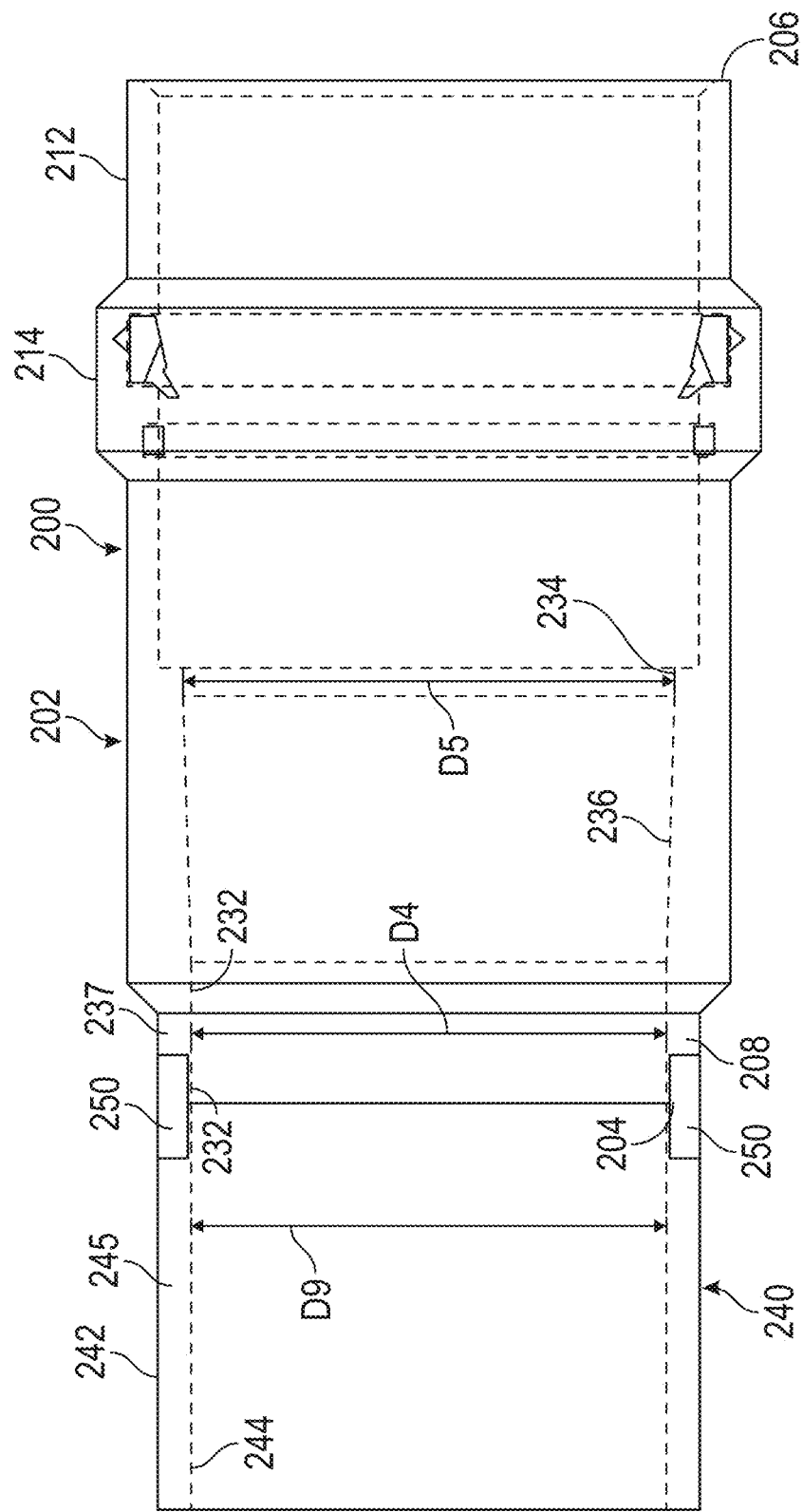
FIG. 24 is a top view of the coupler of FIG. 16 coupled with the conduit of FIG. 23.

Referring now to FIGS. 23-24, conduit 240 may be coupled to coupler 200 by one or more methods to facilitate a fluid connection between conduit 240 and coupler 200. In embodiments, diameter D8 of conduit 240 is approximately the same as diameter D7 of coupler 200. In embodiments, diameter D9 of conduit 240 is approximately the same as diameter D4 (FIG. 21) of coupler 200. In embodiments, wall width 246 of conduit 240 is approximately the same as wall width 238 of coupler 200. In embodiments, conduit 240 may be coupled to coupler 200 by a welding process, such as friction stir welding (FSW). That is, conduit 240 may be positioned to be axially aligned with coupler 200 and axial extent 248 may be physically coupled with first extent 204. A coupling process (e.g., a welding process) may be utilized to join conduit 240 and coupler 200.

Figure 25:
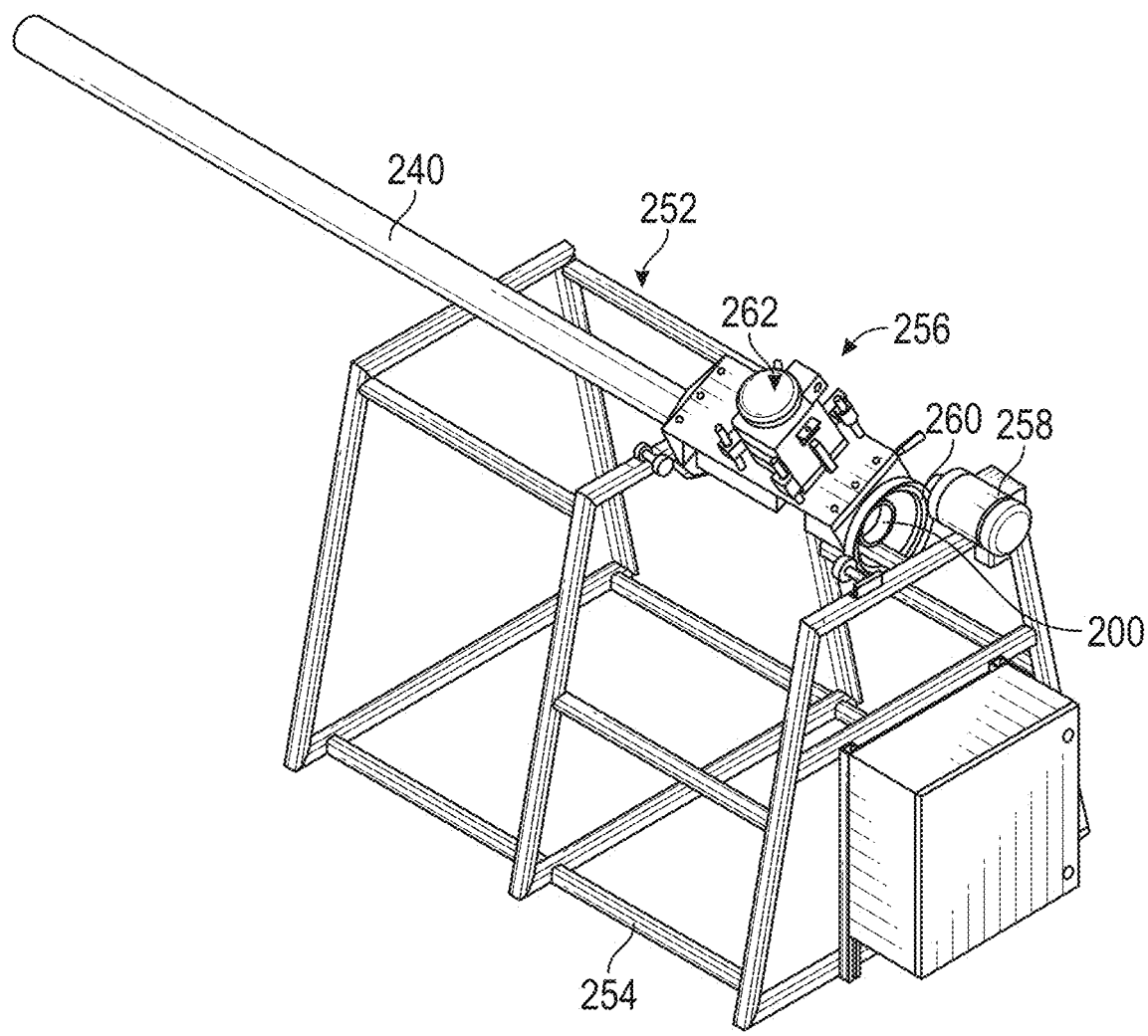
FIG. 25 is a perspective view of a fixture for coupling the coupler of FIG. 16 and the conduit of FIG. 23.

Referring to FIG. 25, a fixture 252 may include a frame 254 and a welding assembly 256 supported by the frame 254. Welding assembly 256 may include a motor 258 supported by the frame and operably coupled to a gear 260. A welder 262 may be coupled to gear 260 and motor 258 may be operable to rotate gear 260 and welder 262. In embodiments, conduit 240 and coupler 200 are supported by fixture 252 and may be coupled together adjacent welder 262. In embodiments, welder 262 may rotate around the outer perimeter of conduit 240 and coupler 200.

Referring now to FIG. 24, welder 262 may be operable to join wall 237 and wall 245 by softening the material of wall 237 and wall 245 and effectively stirring, or joining, the material together to join conduit 240 with coupler 200. Friction Stir Welding may be used to temporarily flow a portion of the conduit 240 and coupler 200 to allow them to be joined together. In embodiments, welder 262 may join conduit 240 and coupler 200 by creating a weld zone 250 within walls 237, 245 adjacent first extent 204, extent 248, respectively.

Figure 26:
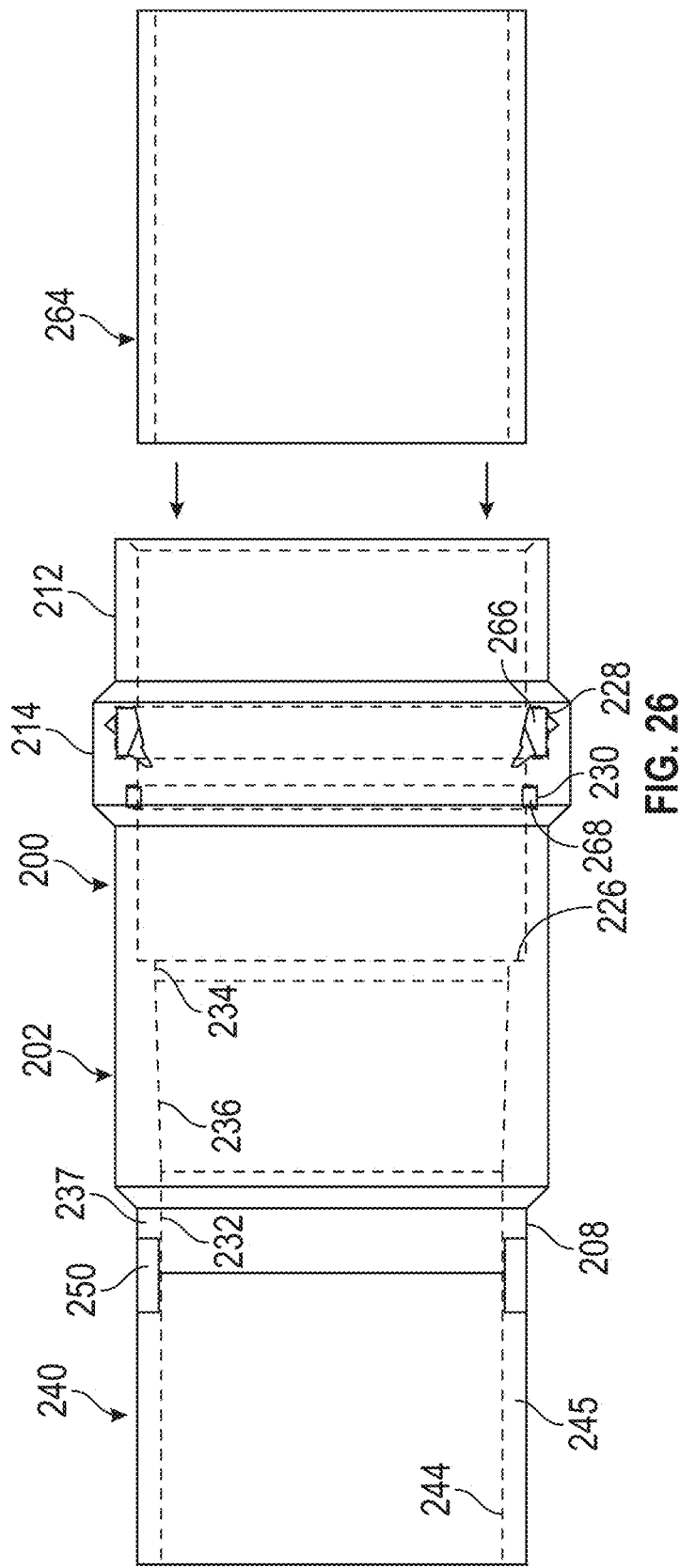
FIG. 26 is a top view of the coupler and conduit of FIG. 24 spaced apart from a conduit.
Figure 27:
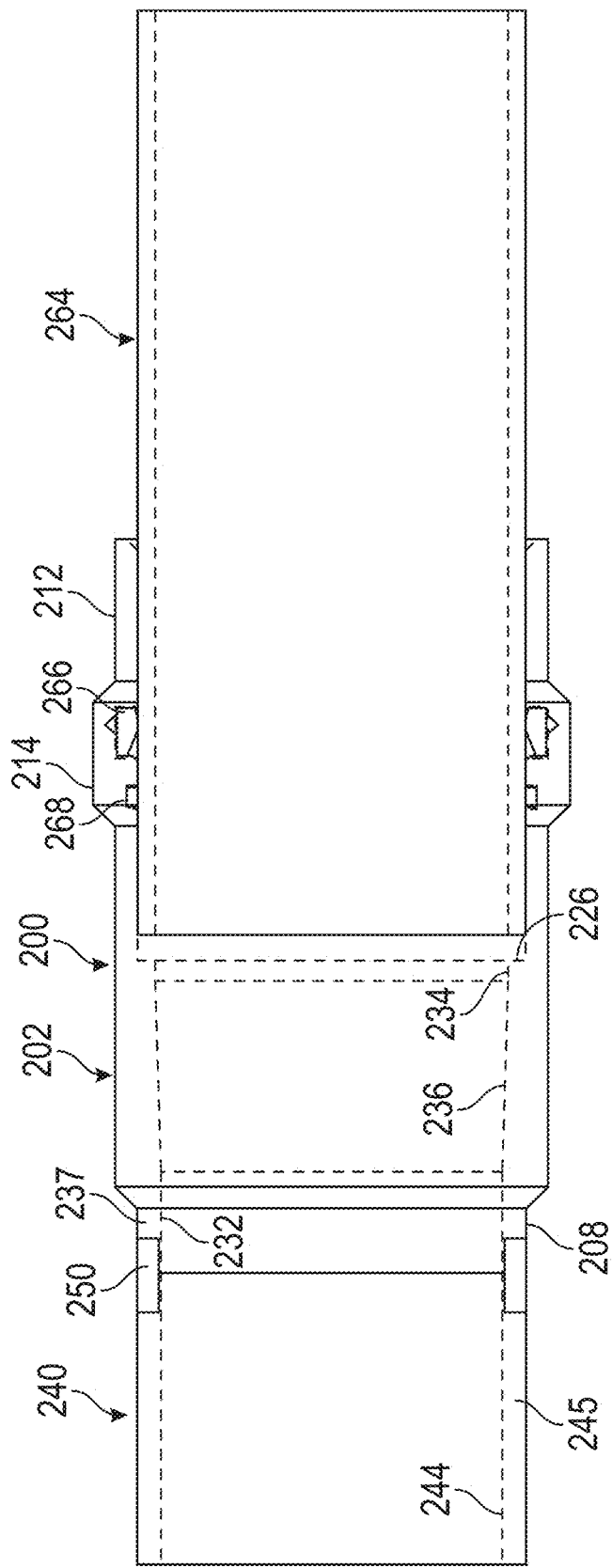
FIG. 27 is a top view of the coupler and conduit of FIG. 24 coupled with the conduit of FIG. 26.
Figure 28:
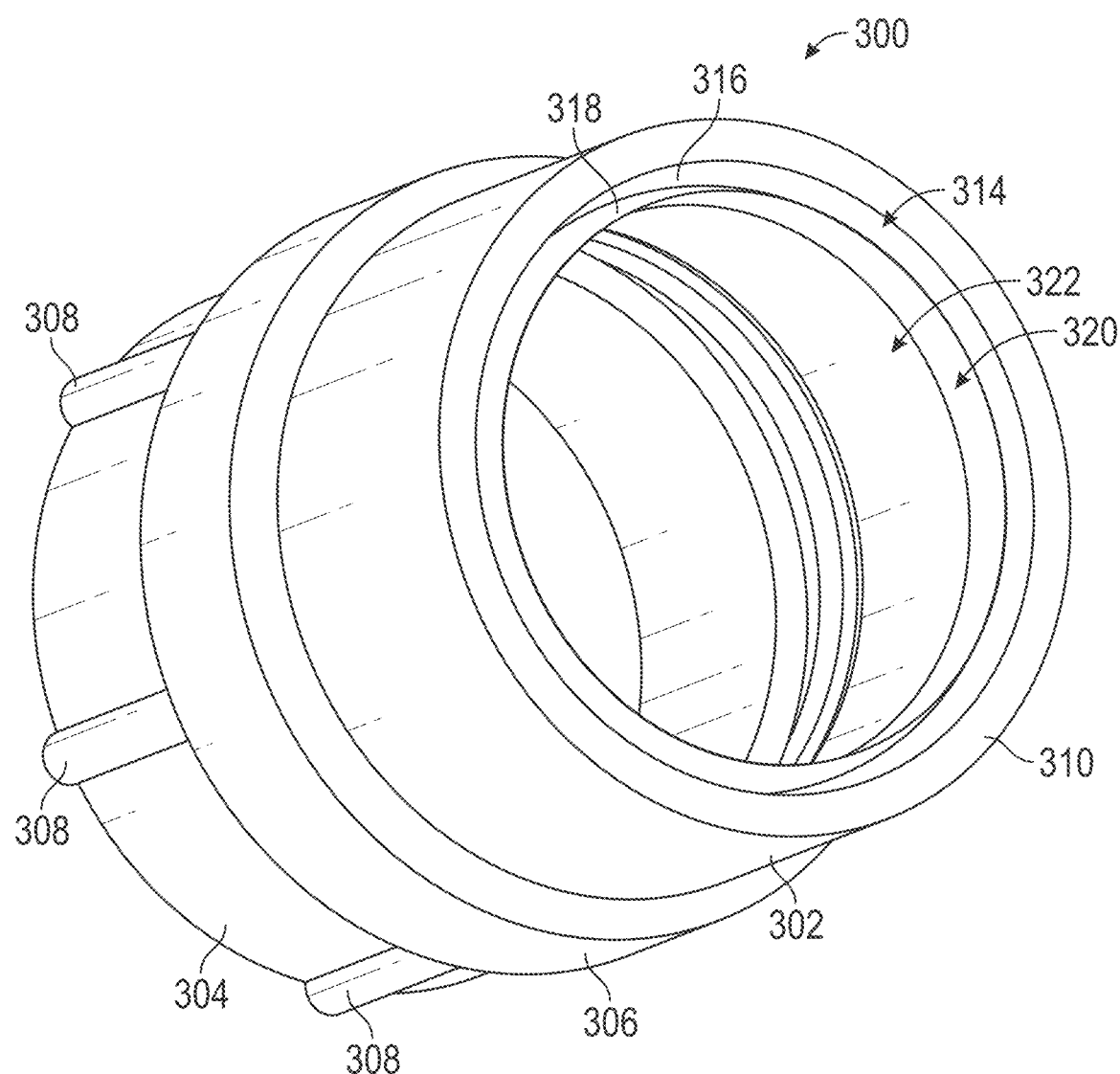
FIG. 28 is a perspective view of a coupler of the present disclosure.
Figure 29:
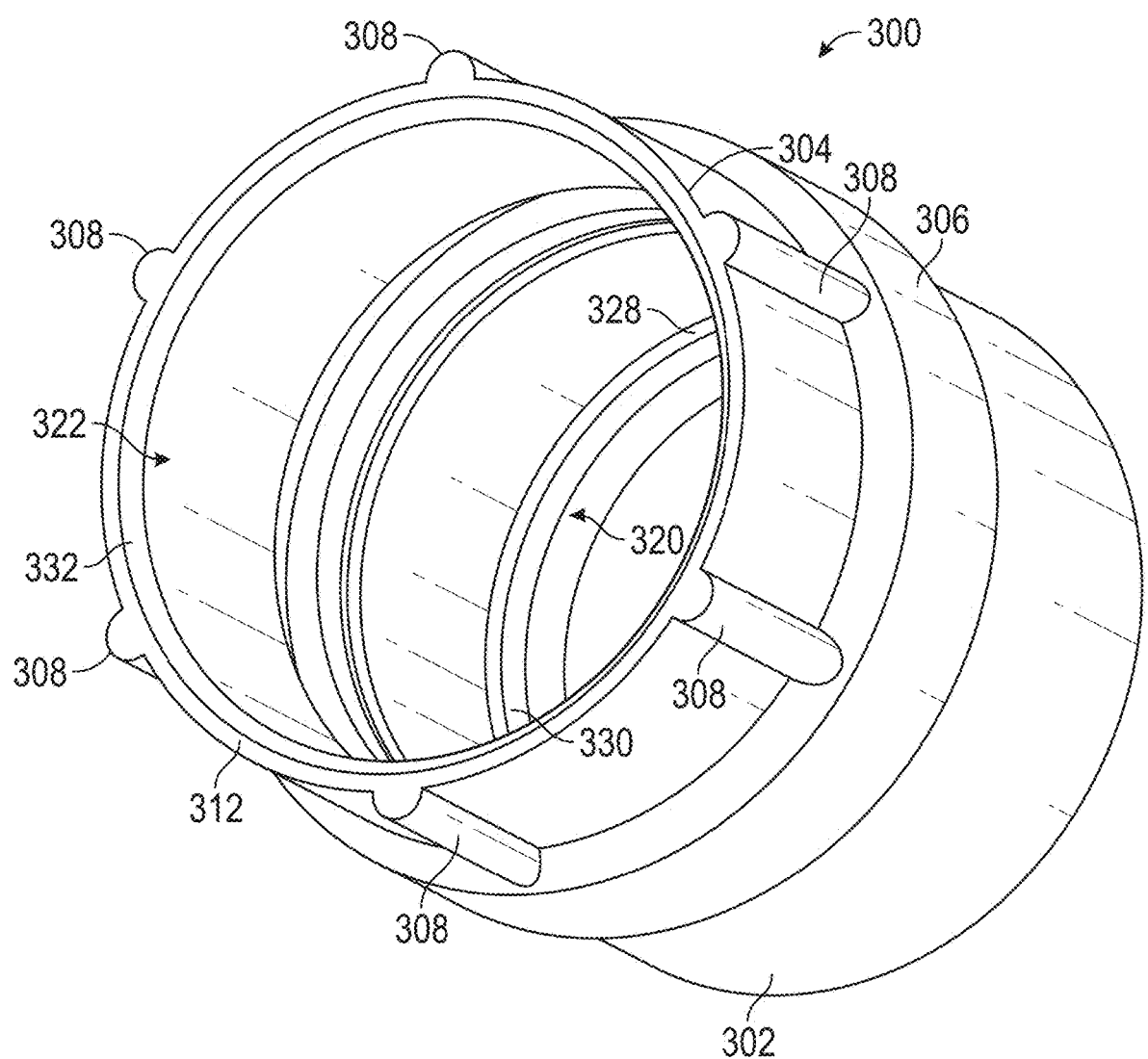
FIG. 29 is a perspective view of the coupler of FIG. 28.
Figure 30:
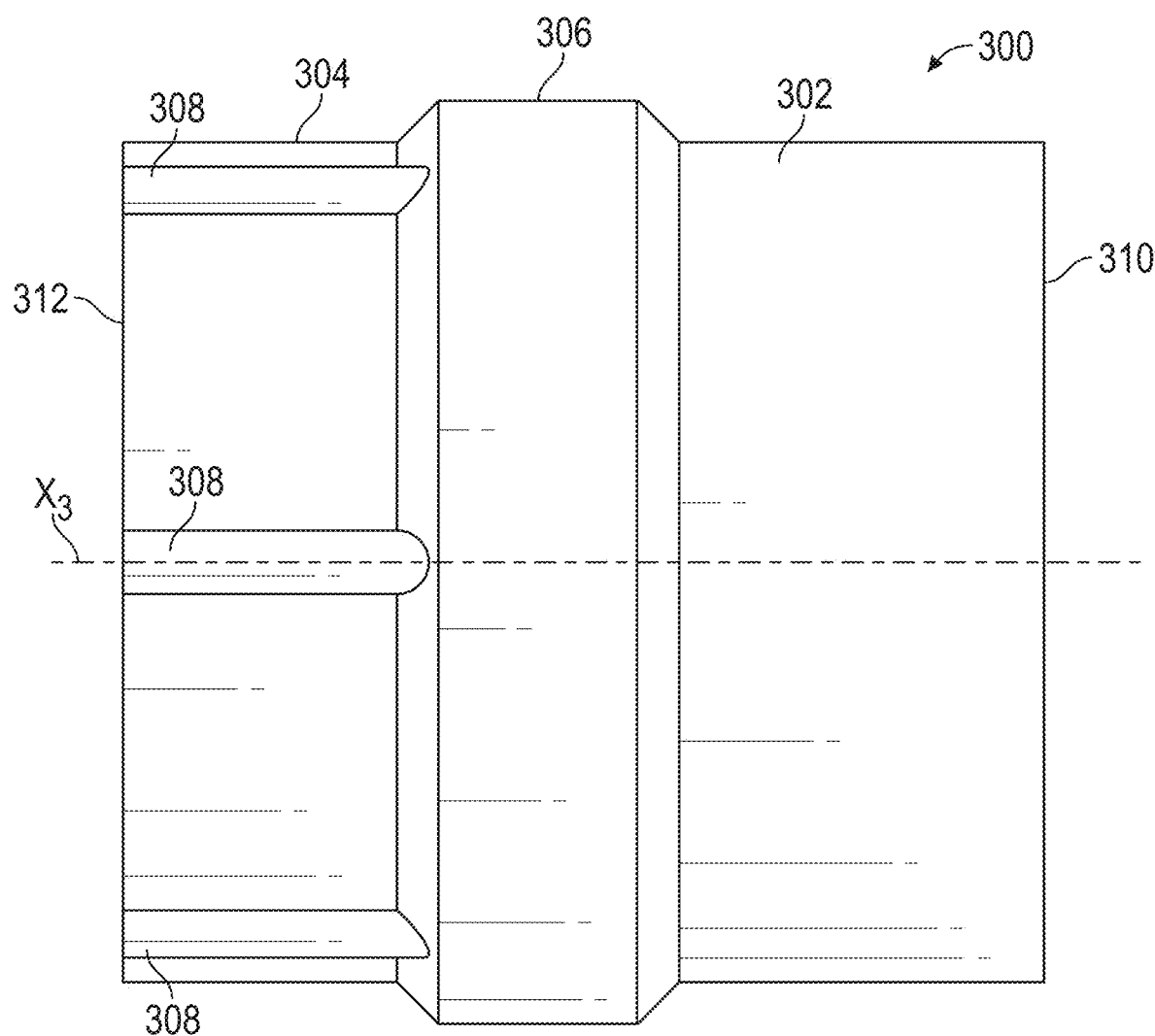
FIG. 30 is a top view of the coupler of FIG. 28.
Figure 31:
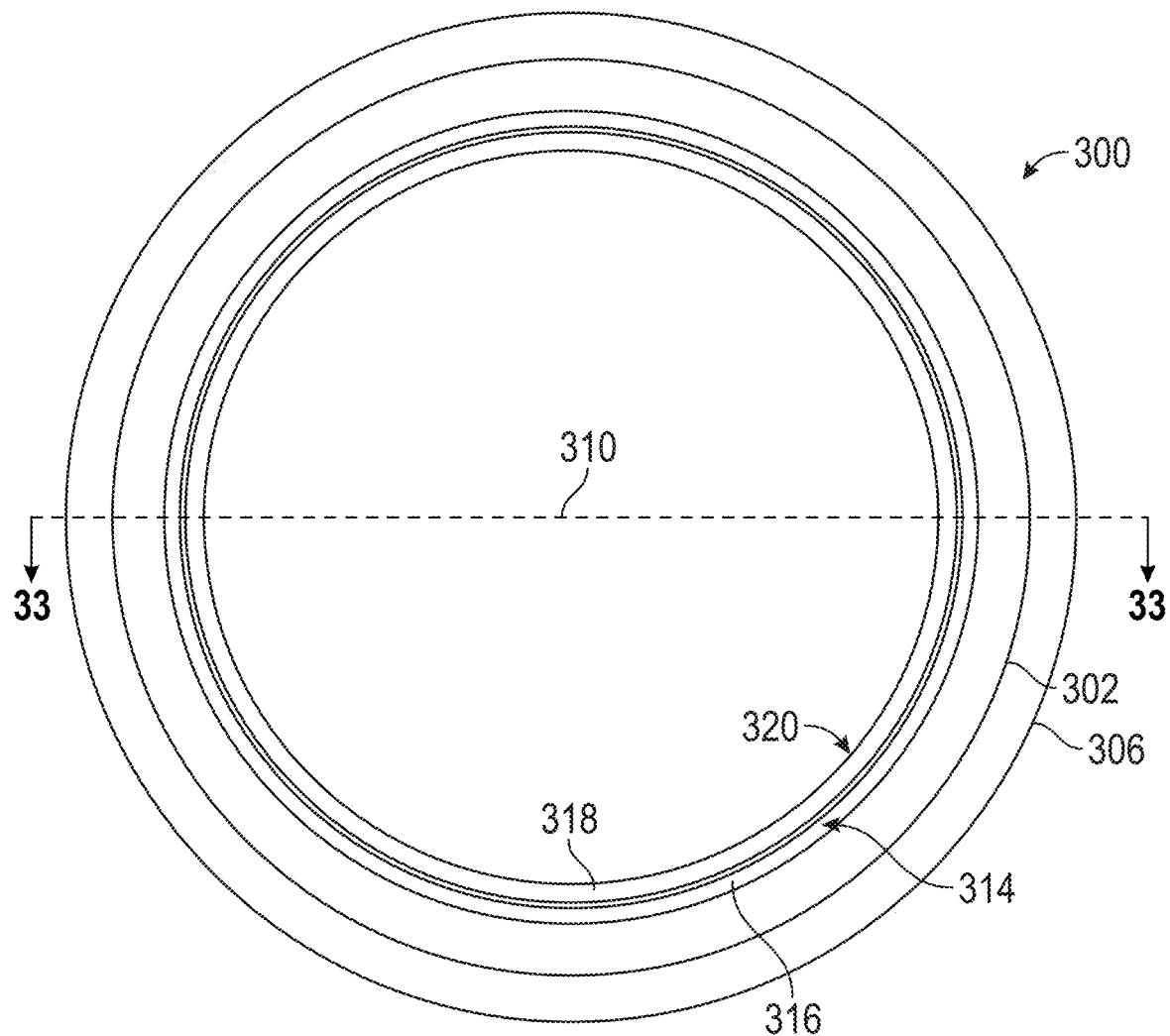
FIG. 31 is a left side view of the coupler of FIG. 28.
Figure 32:
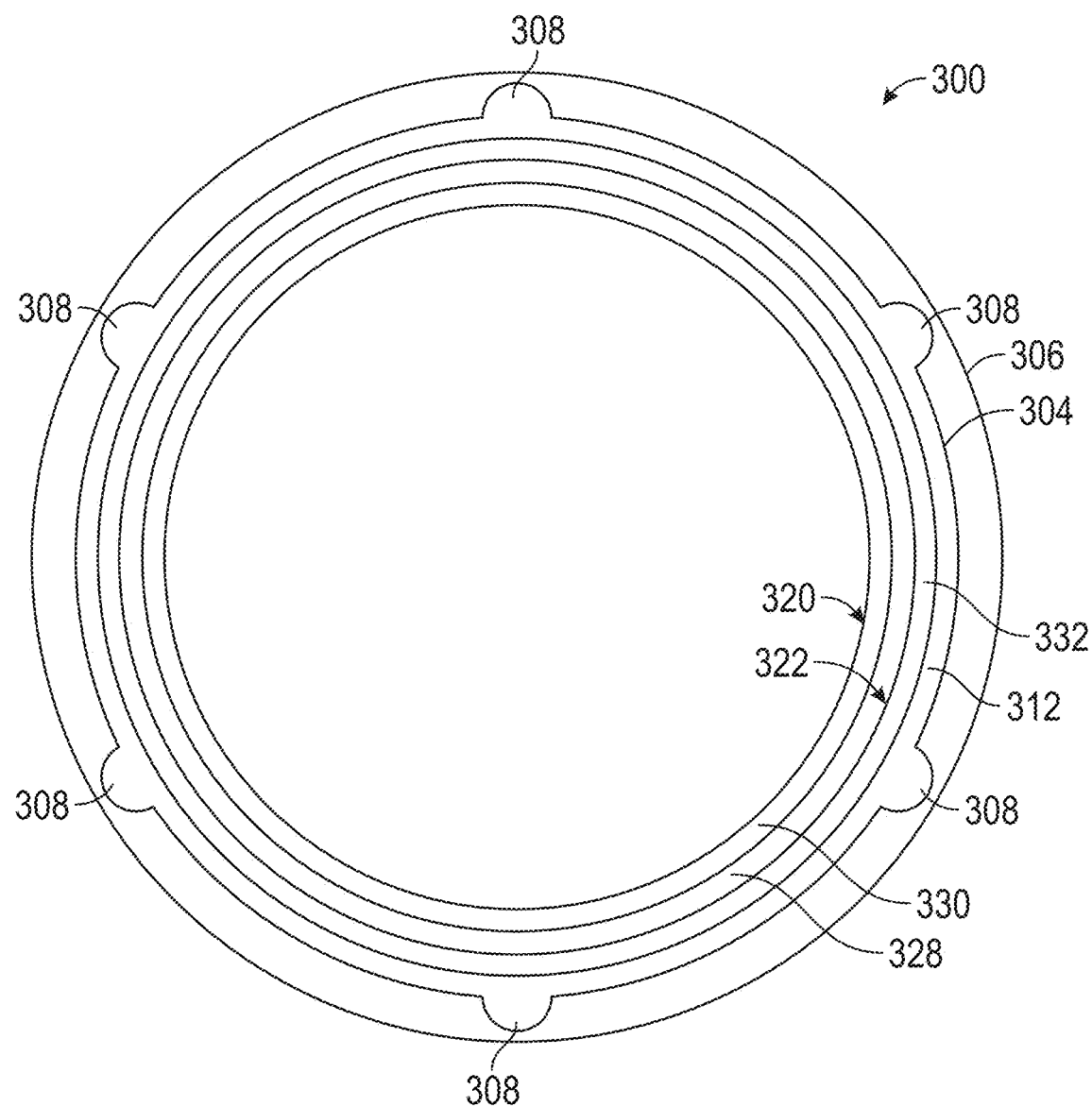
FIG. 32 is a right side view of the coupler of FIG. 28.

Referring now to FIGS. 26-27, coupler 200 may be operable to receive a conduit 264 (which may be similar to, or the same as, conduits 50, 60 (FIG. 6A)). In embodiments, conduit 264 may be formed of a different material (e.g., polyvinyl chloride (PVC)) and may be positioned within second inner portion 225 of coupler 200 (similar to, or the same as, conduit 50, 60 positioned within first portion 50, second portion 60, of coupler 10). That is, first recess 228 may receive a gasket 266 (similar to, or the same as, gasket 40 (FIG. 5A) or gasket 40' (FIG. 6A)) and second recess 230 may receive a biasing member 268 (similar to, or the same as, biasing member 41 (FIG. 5A)). In embodiments, gasket 266 is a one-way gasket. Conduit 264 may be inserted into second inner portion 225 and retained within second inner portion 225 by one or more of gasket 266 and biasing member 268. In embodiments, conduit 264 may be positioned within second inner portion 225 such that conduit 264 abuts, or is adjacent to shoulder 226. Referring to FIG. 27, coupler 200 may be operably coupled between a first conduit (e.g., conduit 240) formed of a first material and a second conduit (e.g., conduit 264) formed of a second material, and the first conduit may be fluidly coupled with conduit 264. In embodiments, chamfered edge 220 creates increased surface area for conduit 264 to contact coupler 200 and properly insert into second inner portion 225.

Referring now to FIGS. 28-33, a coupler 300 includes a first portion 302, a second portion 304, and a third portion 306 positioned intermediate the first portion 302 and second portion 304. In embodiments, coupler 300 is generally cylindrical, and each of first portion 302, second portion 304, and third portion 306 are generally cylindrical and coupler 300 extends along a longitudinal axis X3. In embodiments, a plurality of extensions 308 extend radially outwardly from second portion 304. In embodiments, coupler 300 includes a plurality of extensions 308 spaced equally around second portion 304. In embodiments, coupler 300 includes six extensions 308 each spaced sixty degrees apart. In embodiments, coupler 300 includes two extensions 308, three extensions 308, four extensions 308, five extensions 308, or more extensions. In embodiments, third portion 306 is a shoulder portion that extends radially outwardly from each of first portion 302 and second portion 304.

Referring still to FIGS. 28-33, coupler 300 defines a first extent 310 positioned proximate first portion 302 and a second extent 312 positioned proximate second portion 304. In embodiments, first extent 310 defines a first radial width 336. In embodiments, a groove or channel 314 is recessed within first extent 310 and channel 314 defines a first wall 316 and a second wall 318. First wall 316 and second wall 318 define an angle 334. In embodiments, angle 334 is 30 degrees. In embodiments, angle 334 is greater than 20 degrees. In embodiments, angle 334 is greater than 30 degrees. In embodiments, channel 314 defines a radial width 338, and radial width 338 is less than radial width 336. In embodiments, channel 314 defines an axial depth 340.

Figure 33:
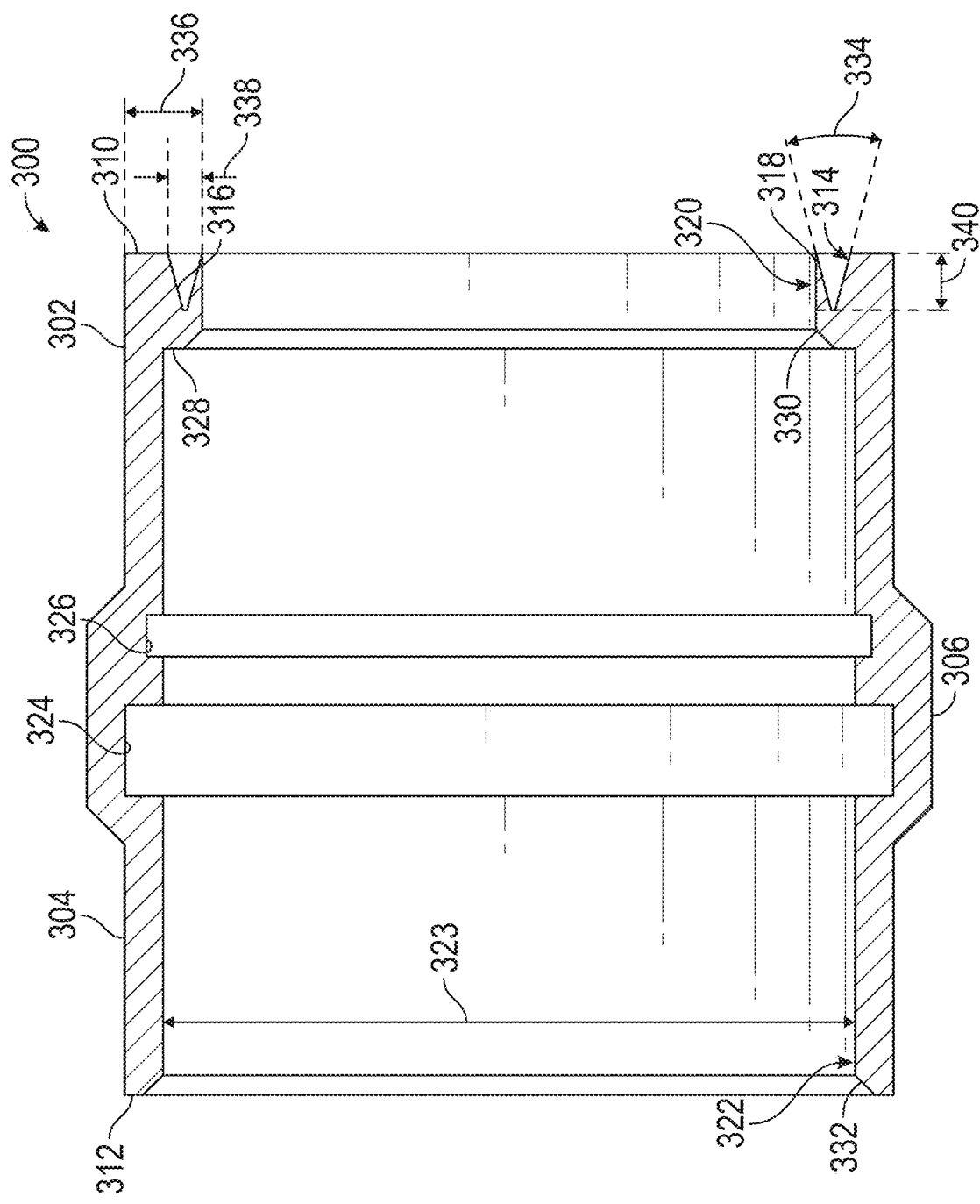
FIG. 33 is a section view of the coupler of FIG. 28 taken along line 33-33 of FIG. 31.

Referring now to FIG. 33, coupler 300 defines a first inner portion 320 positioned adjacent first extent 310 of first portion 302 and coupler 300 defines a second inner portion 322 positioned adjacent second extent 312 of second portion 304. Second inner portion 322 may be generally circular and define a diameter 323. In embodiments, a shoulder 328 is positioned intermediate first inner portion 320 and second inner portion 322. In embodiments, a chamfered portion 330 is positioned adjacent shoulder 328 and chamfered portion 330 extends between shoulder 328 and first inner portion 320. In embodiments, a chamfered portion 332 is positioned adjacent second extent 312 and chamfered portion 332 extends between second extent 312 and second inner portion 322.

Referring still to FIG. 33, third portion 306 of coupler 300 defines a first recessed portion 324 (similar to or the same as recessed portion 34) and a second recessed portion 326 (similar to or the same as recessed portion 38). In embodiments, recessed portion 324 is a circumferential recess (e.g., extends around the internal circumference of second inner portion 322) and recessed portion 326 is a circumferential recess (e.g., extends around the internal circumference of second inner portion 322). In embodiments, coupler 300 may receive two separate conduits on either longitudinal extent (e.g., a first conduit coupled to coupler 300 at first inner portion 320 and a second conduit coupled to coupler 300 at second inner portion 322).

In embodiments, coupler 300 is formed of HDPE. In embodiments, coupler 300 is formed of PVC or another suitable material such as carbon fiber, plastic, metal, concrete, or another material.

Figure 34:
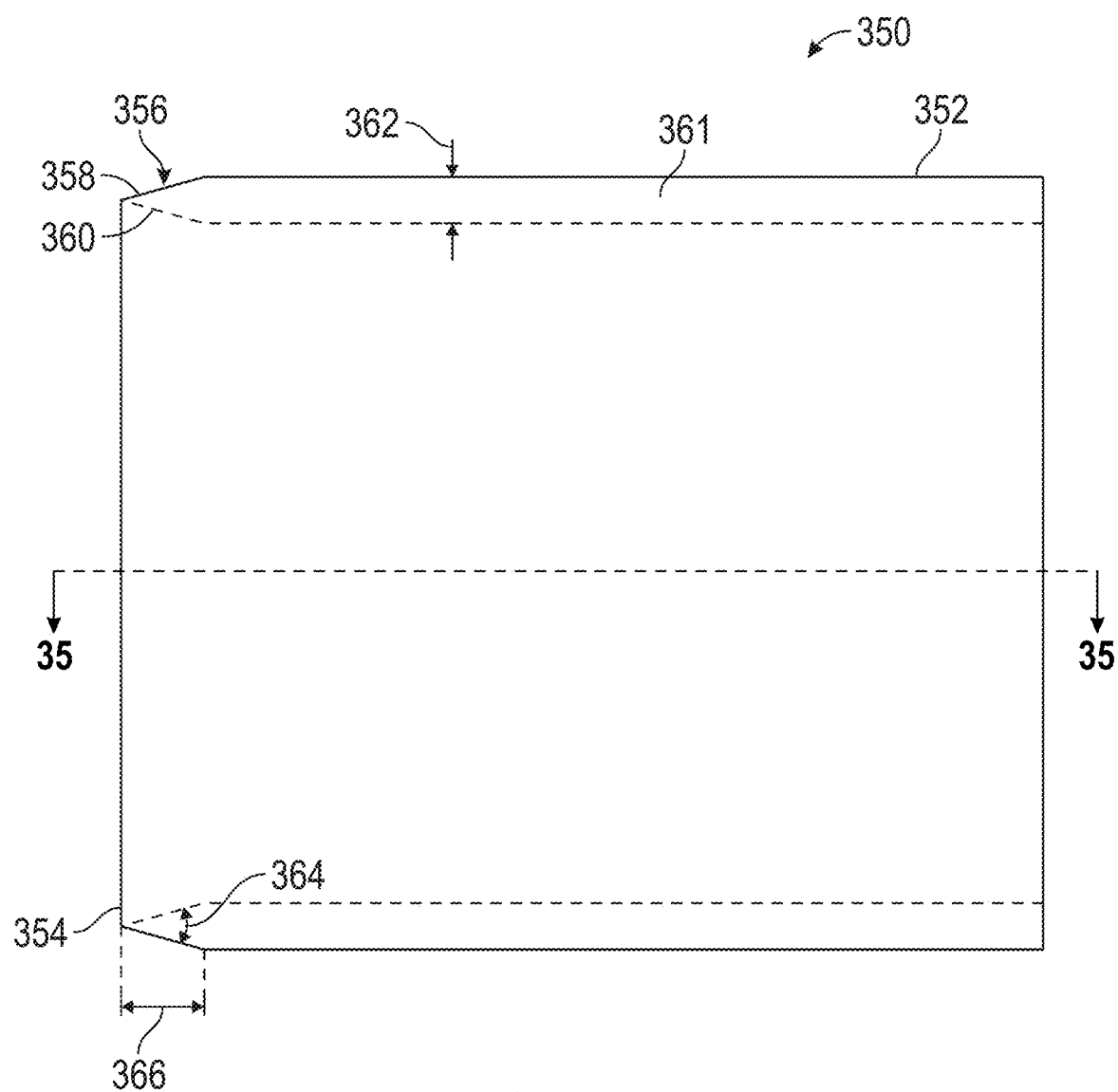
FIG. 34 is a top view of a conduit of the present disclosure.
Figure 35:
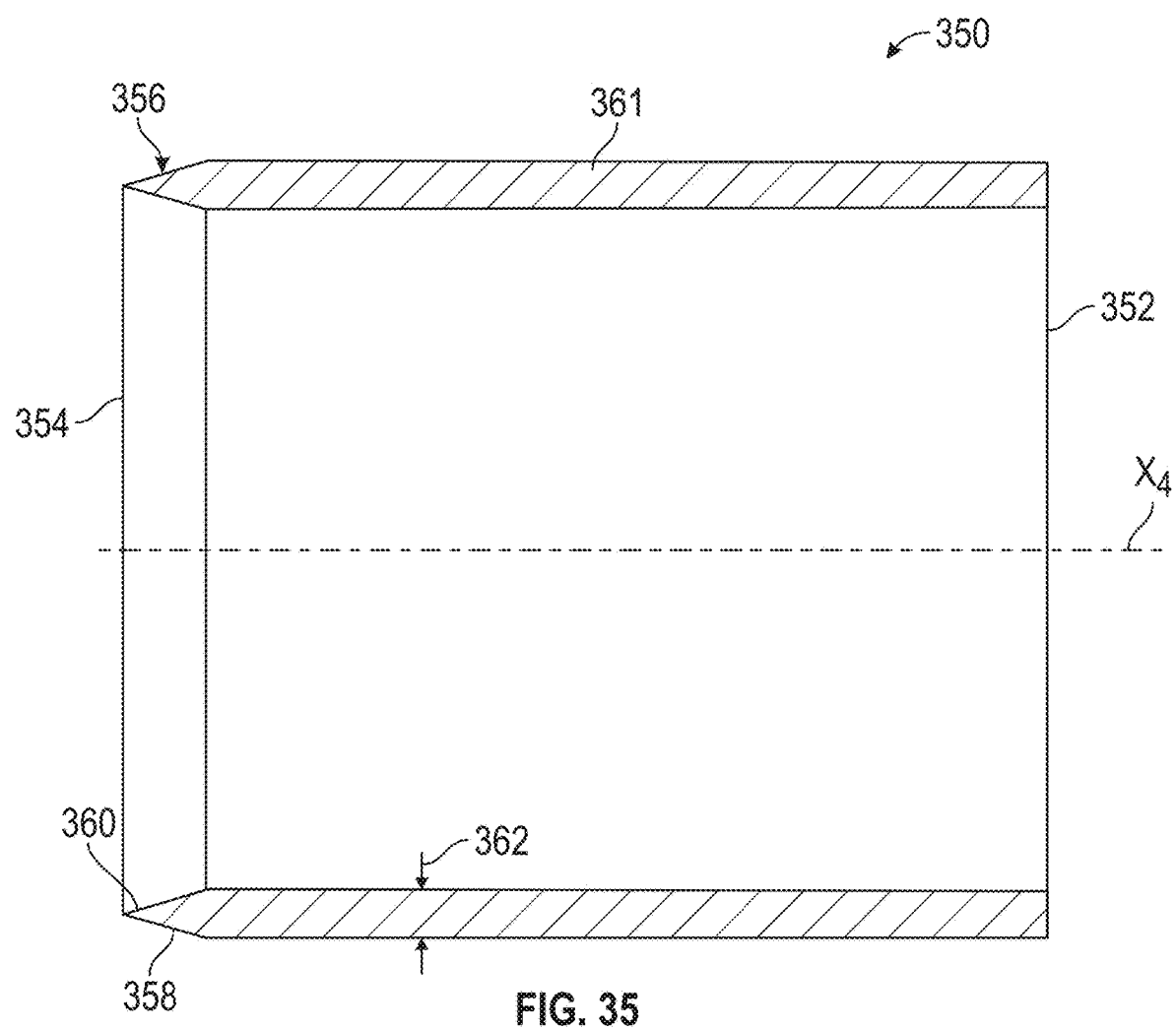
FIG. 35 is a section view of the conduit of FIG. 34 taken along line 35-35 of FIG. 34.

Referring now to FIGS. 34-35, a conduit 350 includes a body 352 extending along a longitudinal axis X4 and body 352 defines a first extent 354 and a second extent (not shown). Body 352 includes a tongue or edge portion 356 defining a first or outer wall 358 and a second or inner wall 360. In embodiments, the first wall 358 is angled from the second wall 360 by an angle 364 and tongue portion 356 defines an axial depth 366. In embodiments, conduit 350 defines an outer wall 361 with an outer wall width 362. In embodiments, conduit 350 is formed of HDPE, PVC, or another suitable material.

Figure 36:
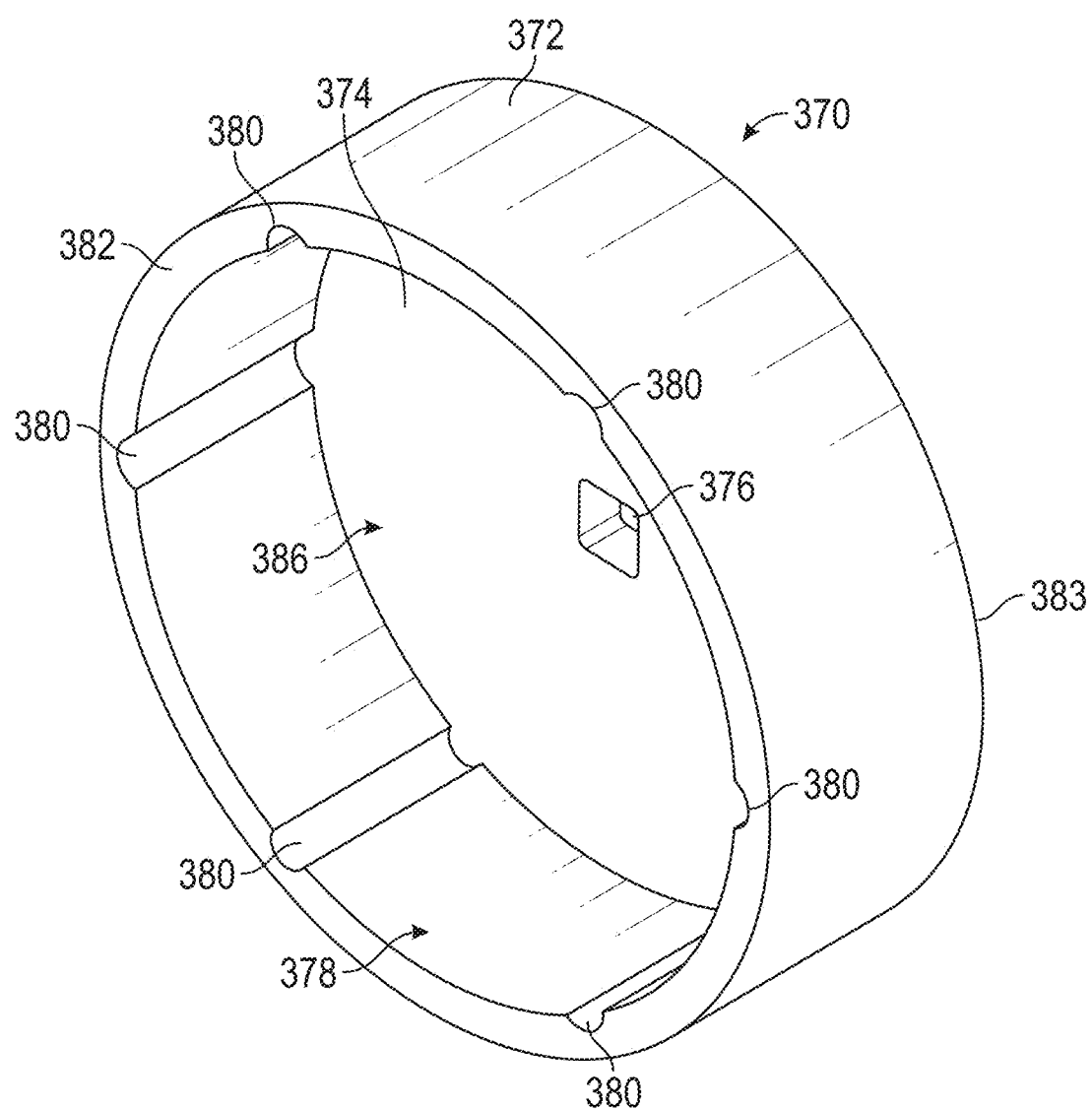
FIG. 36 is a perspective view of a driver of the present disclosure.
Figure 37:
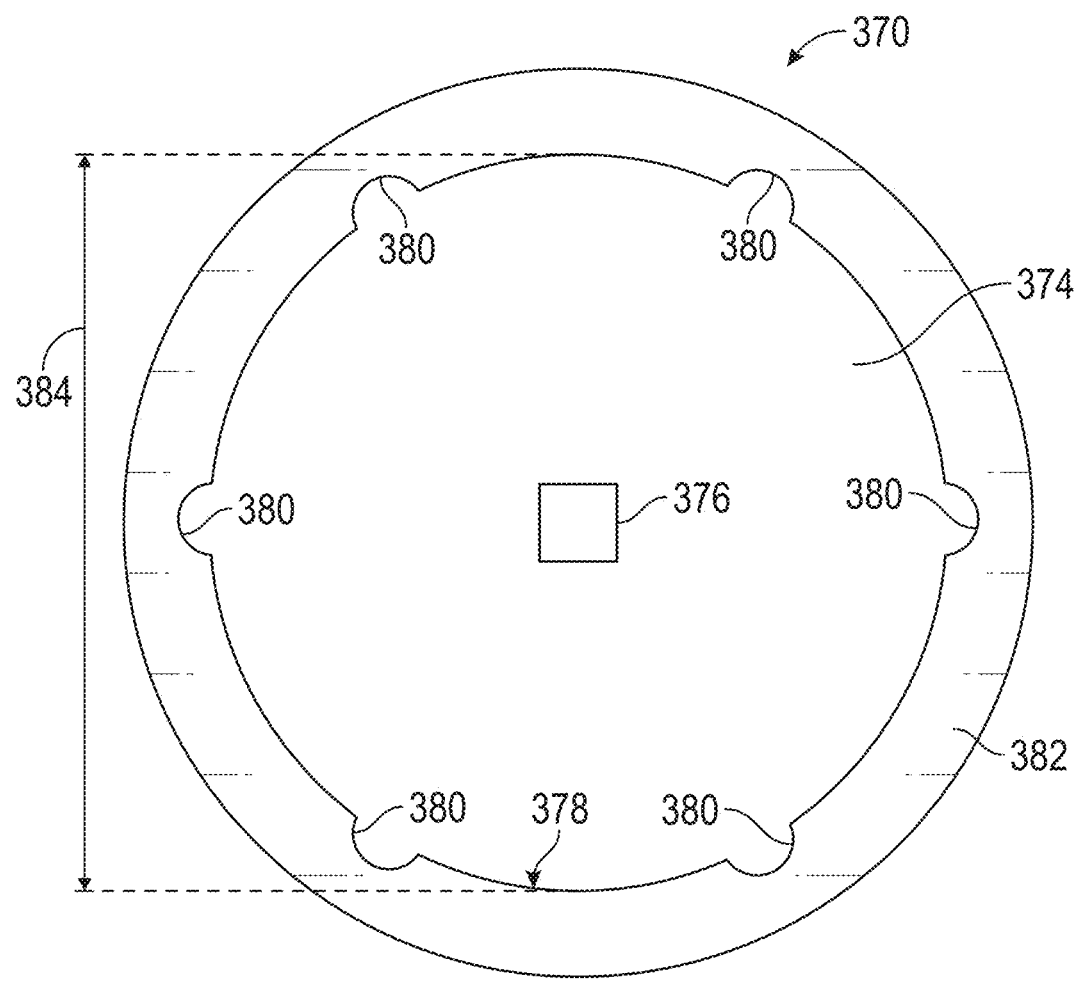
FIG. 37 is a side view of the driver of FIG. 36.

Referring now to FIGS. 36-37, a driver 370 includes a body 372. Body 372 is generally cylindrical and has a first extent 382 and a wall 374 extending along a second extent 383. In embodiments, wall 374 defines an aperture 376. In embodiments, aperture 376 is a square aperture, or a generally rectangular aperture. In embodiments, aperture 376 has a triangular shape, a star shape, or another shape.

Referring still to FIGS. 36-37, body 372 defines a inner surface 378, and inner surface 378 includes a plurality of channels 380 extending between the first extent 382 and wall 374. In embodiments, channels 380 are arcuate channels. In embodiments, channels 380 are square or rectangular channels. In embodiments, inner surface 378 is circular and driver 370 includes six channels 380 spaced about the circumference of inner surface 378. In embodiments, channels 380 are sized and shaped to receive extensions 308. Further, inner surface 378 defines a diameter 384. In embodiments, driver 370 generally defines a recessed portion 386 and second portion 304 of coupler 300 may be received within recessed portion 386. Channels 380 may receive extensions 308 and inner surface 378 receives second portion 304 such that coupler 300 is keyed within driver 370. That is, driver 370 may be rotatably coupled to coupler 300 by inserting second portion 304 of coupler 300 within recess 386 of driver 370. In embodiments, a tool 388 (FIG. 38), such as a ratchet or drill, may have a drive output (not shown) which may fit within aperture 376 and operable to rotate driver 370. In embodiments, tool 388 (e.g., ratchet or drill) may be operable to rotate the coupler 300 by rotating driver 370. In embodiments, tool 388 includes a motor operable to rotate the drive output and driver 370. In embodiments, tool 388 is operable to rotate the coupler 300 at rotational speeds greater than 500 rpm. In embodiments, tool 388 is operable to rotate the coupler 300 at rotational speeds greater than 1,000 rpm. In embodiments, tool 388 is operable to rotate the coupler 300 at a rotational speed of approximately 1,200 rpm.

Figure 38:
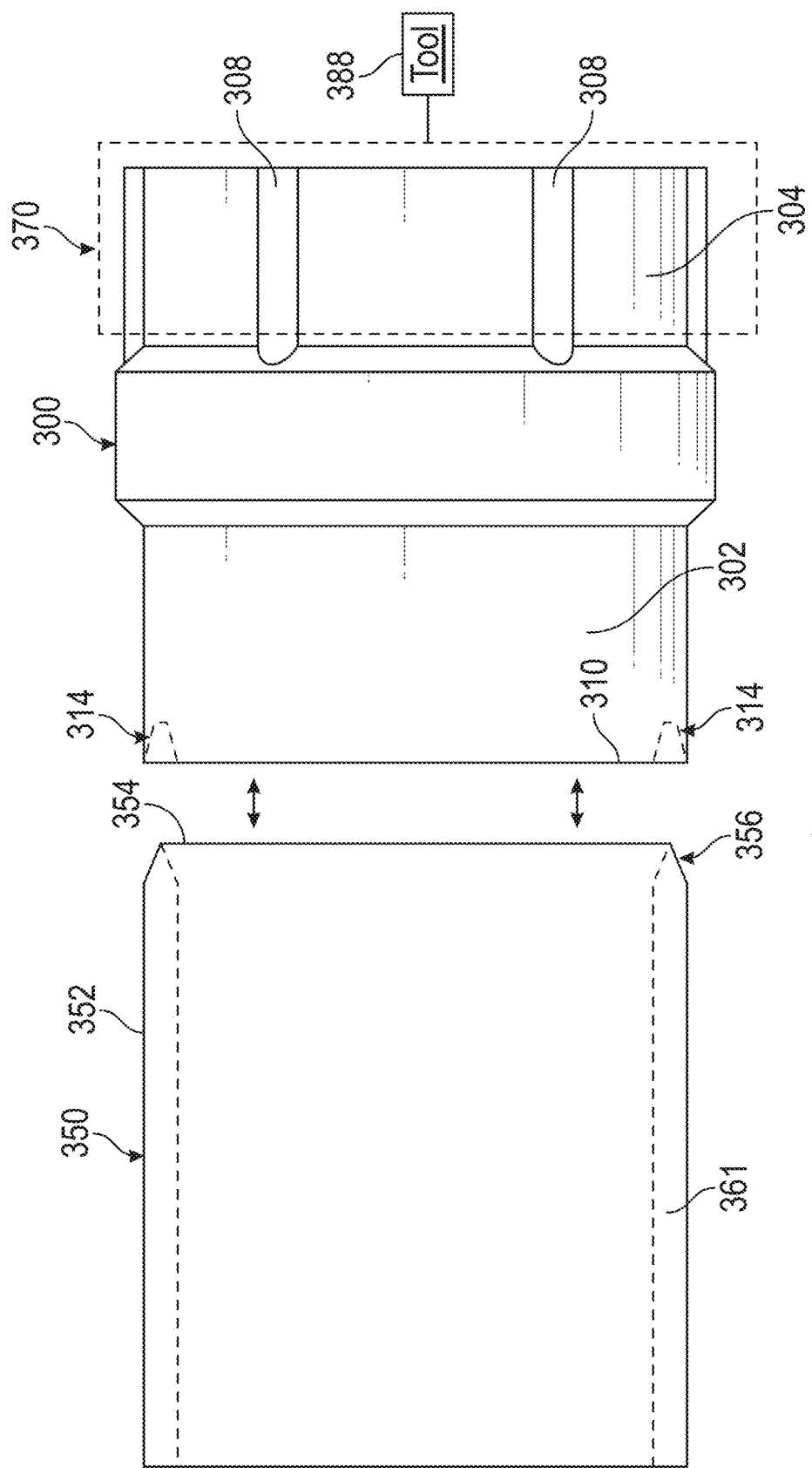
FIG. 38 is a top view of the driver of FIG. 36 and coupler of FIG. 28 spaced from the conduit of FIG. 34.
Figure 39:
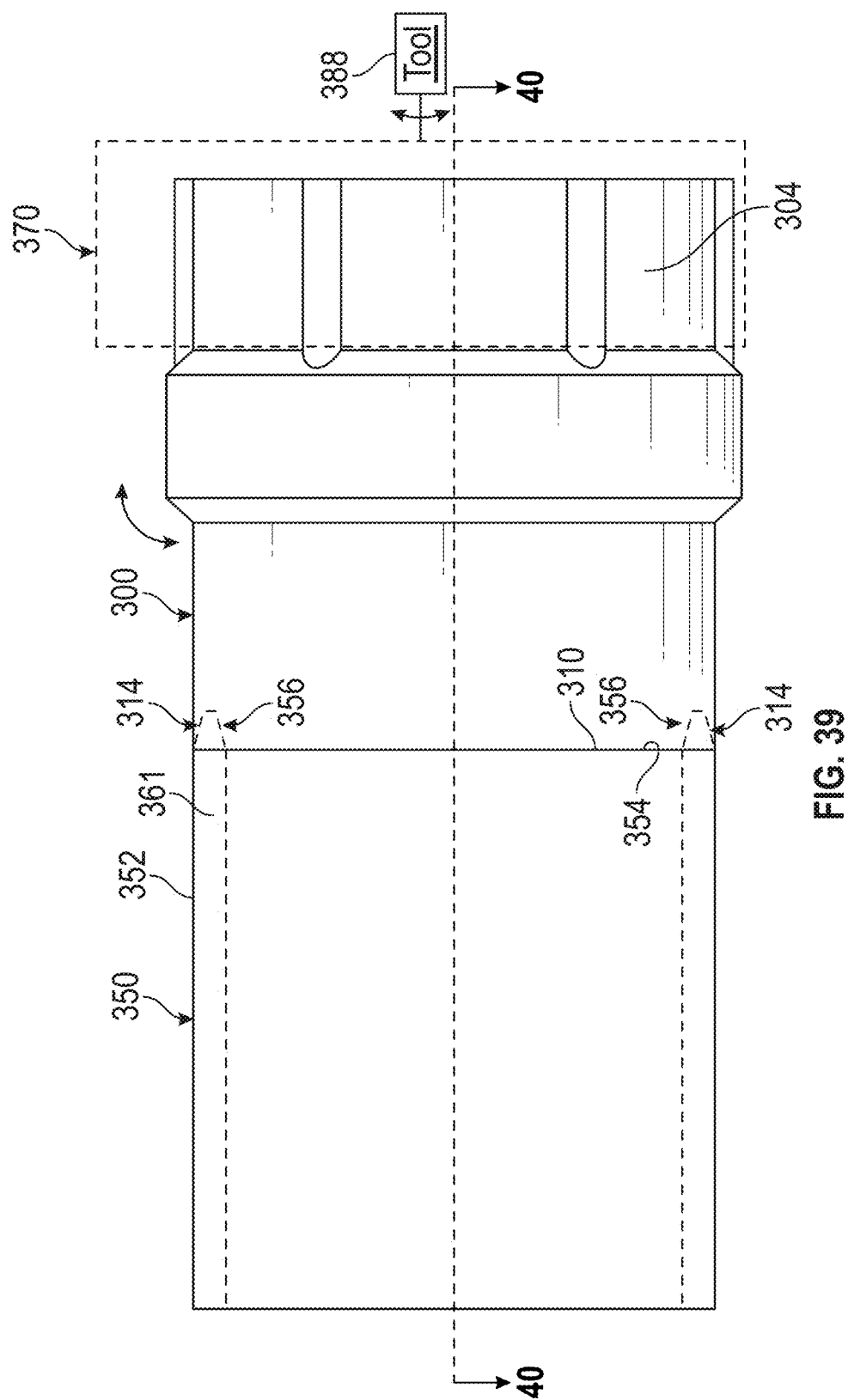
FIG. 39 is a top view of the coupler of FIG. 28 coupled with the conduit of FIG. 34.

Referring now to FIGS. 38-39, coupler 300 may be positioned adjacent conduit 350 such that tongue portion 356 is positioned within groove portion 314 of first portion 302. Driver 370 may be positioned over second portion 304 such that extensions 308 are received within channels 380. Tool 388 (e.g., ratchet or drill) may be rotatably coupled to driver 370 such that tool 388 may rotate driver 370 and coupler 300 relative to conduit 350 while tongue portion 356 is within groove portion 314.

Figure 40:
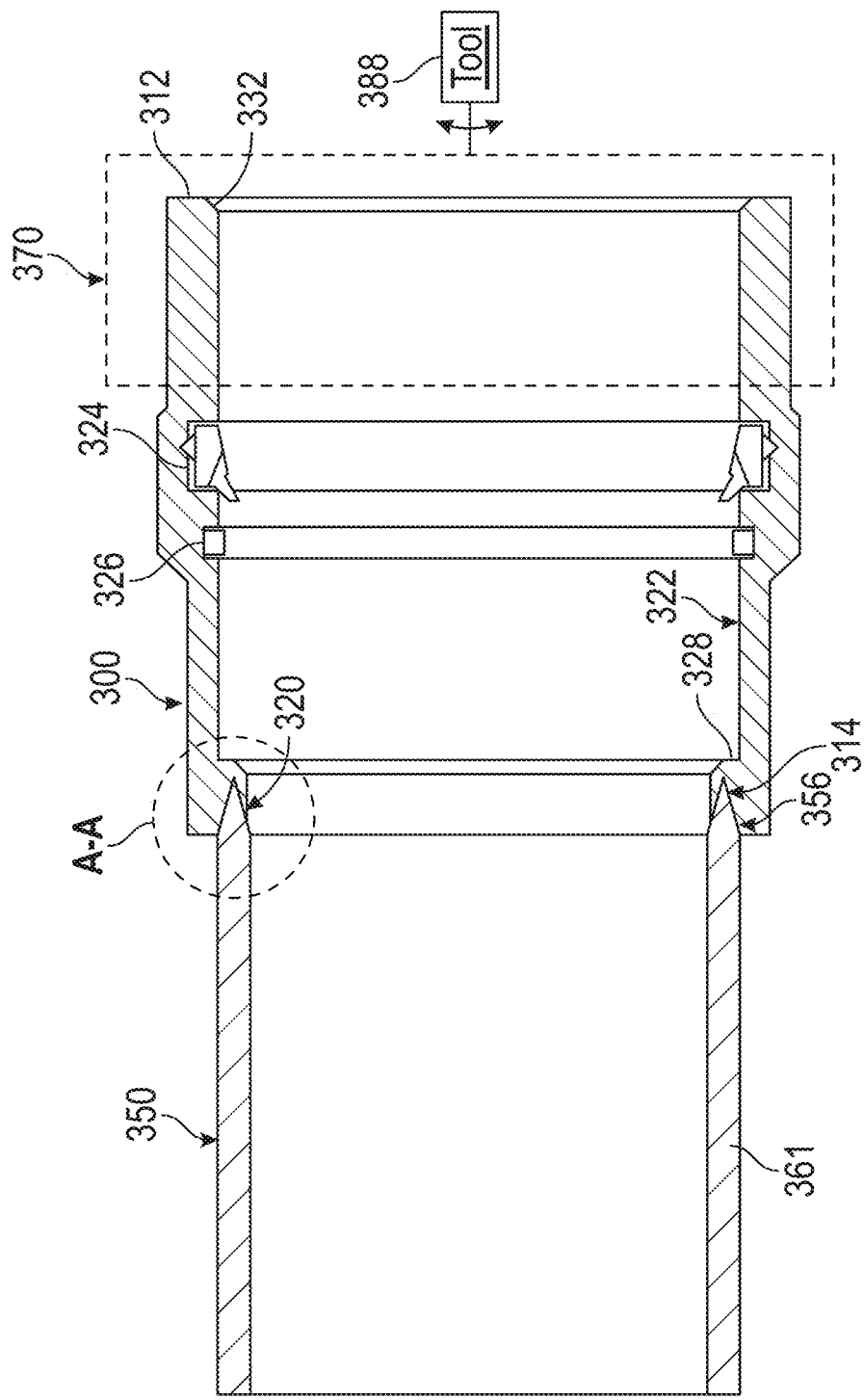
FIG. 40 is a section view of the coupler and conduit of FIG. 39 taken along line 40-40 of FIG. 39.
Figure 41:
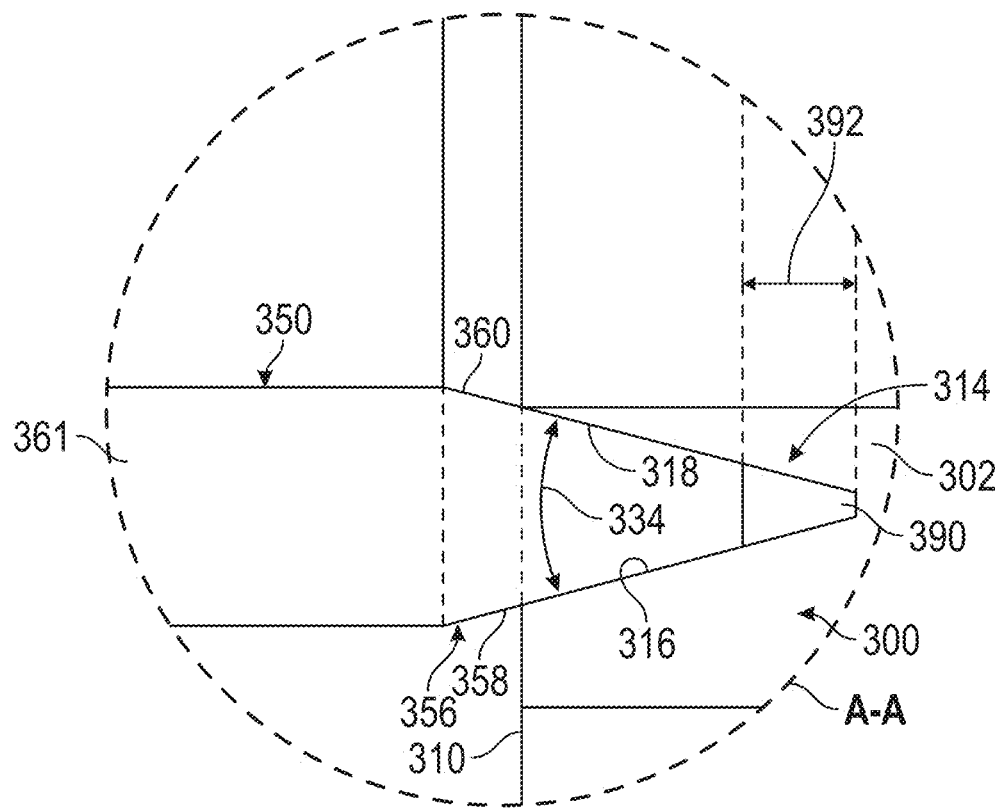
FIG. 41 is a section view of the coupler and conduit of FIG. 39 taken along section A-A of FIG. 40.

Referring now to FIGS. 39-41, coupler 300 may be joined with conduit 350 by a coupling method such as spin welding. In embodiments, coupler 300 and conduit 350 may be rotated relative to each other and longitudinally compressed together to create a friction weld. That is, tongue portion 356 of conduit 350 may be rotated within and longitudinally compressed into groove portion 314 such that first wall 358 and second wall 360 of tongue portion 356 move along, and create friction with, first wall 316 and second wall 318 of groove portion 314. Friction between tongue portion 356 and groove portion 314 heats the interface between tongue portion 356 and groove portion 314 to melt, or weld, tongue portion 356 of conduit 350 to groove portion 314 of coupler 300 and create a weld portion 390. In embodiments, weld portion 390 is formed to have a weld depth 392. In embodiments, weld depth 392 is formed to be a proportion of the width 362 of outer wall 361. In embodiments, weld depth 392 is fifty percent of the wall width 362. In embodiments, weld depth 392 is eighty percent of the wall width 362. In embodiments, weld depth 392 is between thirty percent and ninety percent of the wall width 362. In embodiments, coupler 300 is coupled to conduit 350 by other welding methods. In embodiments, coupler 300 is coupled to conduit 350 with one or more of a weld, adhesive, fastener, or other component.

Figure 42:
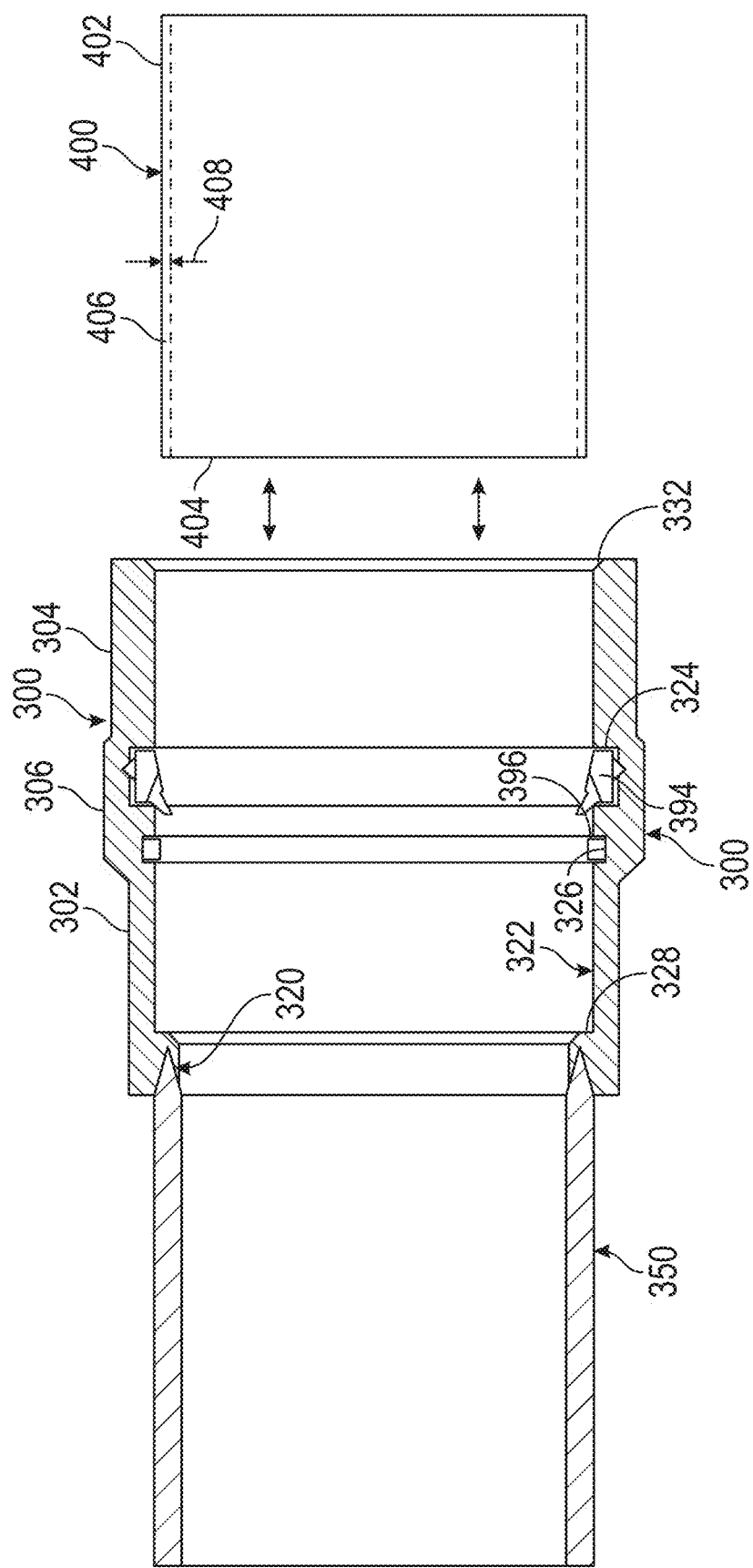
FIG. 42 is a top view of the coupler and conduit of FIG. 39 spaced apart from a conduit.
Figure 43:
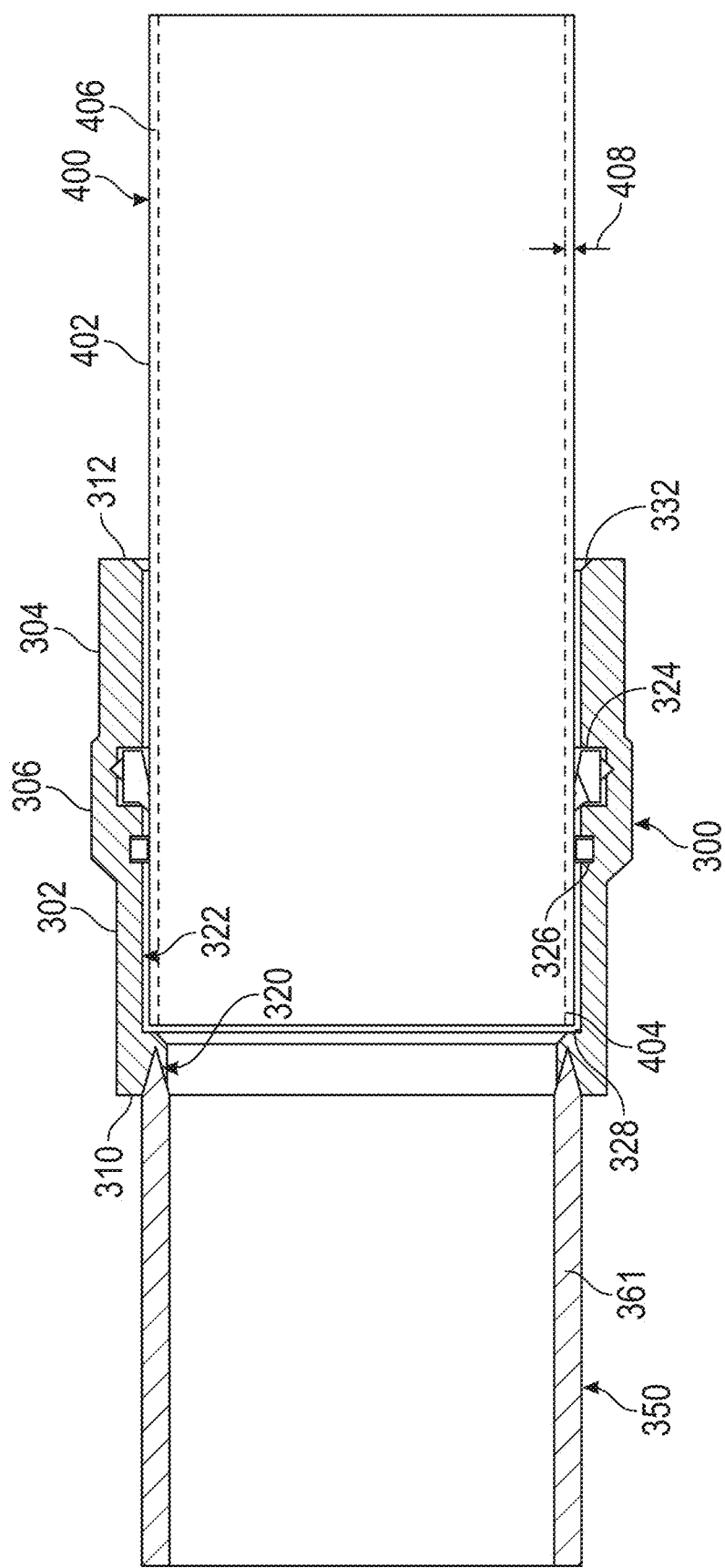
FIG. 43 is a top view of the coupler and conduit of FIG. 39 coupled to a conduit.

Referring now to FIGS. 42-43, a conduit 400 includes a body 402 and a first extent 404. Conduit 400 is generally cylindrical and defines an outer wall 406 with an outer wall width 408. In embodiments, a gasket 394 (e.g., similar to or the same as gasket 40 (FIG. 5A) or gasket 40' (FIG. 6A)) is positioned within first recess 324 and a biasing member 396 (similar to, or the same as, biasing member 41 (FIG. 5A)) is positioned within second recess 326. Conduit 400 may be received within second inner portion 322 (similar to, or the same as, conduit 50, 60 positioned within first portion 50, second portion 60, of coupler 10) such that conduit 400 is abutting, or positioned adjacent to shoulder 328. In embodiments, gasket 394 is a one-way gasket. Conduit 400 may be inserted into second inner portion 322 and retained within second inner portion 322 by one or more of gasket 394 and biasing member 396. Referring to FIG. 43, coupler 300 may be operably coupled between a first conduit (e.g., conduit 350) formed of a first material and a second conduit (e.g., conduit 400) formed of a second material, and the first conduit 350 may be fluidly coupled with conduit 400. In embodiments, chamfered portion 332 creates increased surface area for conduit 400 to contact coupler 300 and properly insert into second inner portion 322.

In embodiments, coupler 300 is formed of an HDPE material, conduit 350 is formed of an HDPE material, and conduit 400 is formed of a PVC material. In embodiments, each of coupler 300 and conduit 350 are formed of a first material and conduit 400 is formed of a second material different from the first material. In embodiments, coupler 300 and conduit 350 are formed of appropriate materials to facilitate the spin welding process. In embodiments, one of conduits 350, 400 are existing conduits in an existing structure or installment (e.g., building, ground structure, etc.) and coupler 300 may be positioned onto the existing conduit 350, 400 to facilitate the transition from a first conduit (e.g., conduit 350, 400) formed of a first material to a second conduit (e.g., conduit 350, 400) formed of a second material.

In embodiments, either of coupler 200, 300 may be utilized within a bank assembly (e.g., bank assembly 76, 76' (FIG. 12); similar to coupler 10, 10'). In embodiments, either of coupler 200, 300 may be utilized with one or more conduits to create a raceway for electrical conduits, waste, water, or other material.

Now referring to FIGS. 44A-44D, a plurality of conduits may formed as sweeps, or angled conduits, with various angled, and may be formed from an HDPE material.

Referring to FIG. 44A, a conduit 410 may be angled at a 90 degree angle (e.g., a first end 412 is directed at a 90 degree angle relative to a second end 414).

Referring to FIG. 44B, a conduit 420 may be angled at a 45 degree angle (e.g., a first end 422 is directed at a 45 degree angle relative to a second end 424).

Referring to FIG. 44C, a conduit 430 may be angled at a 30 degree angle (e.g., a first end 432 is directed at a 30 degree angle relative to a second end 434).

Referring to FIG. 44D, a conduit 440 may be angled at a 22.5 degree angle (e.g., a first end 442 is directed at a 22.5 degree angle relative to a second end 444).

Figure 45A:
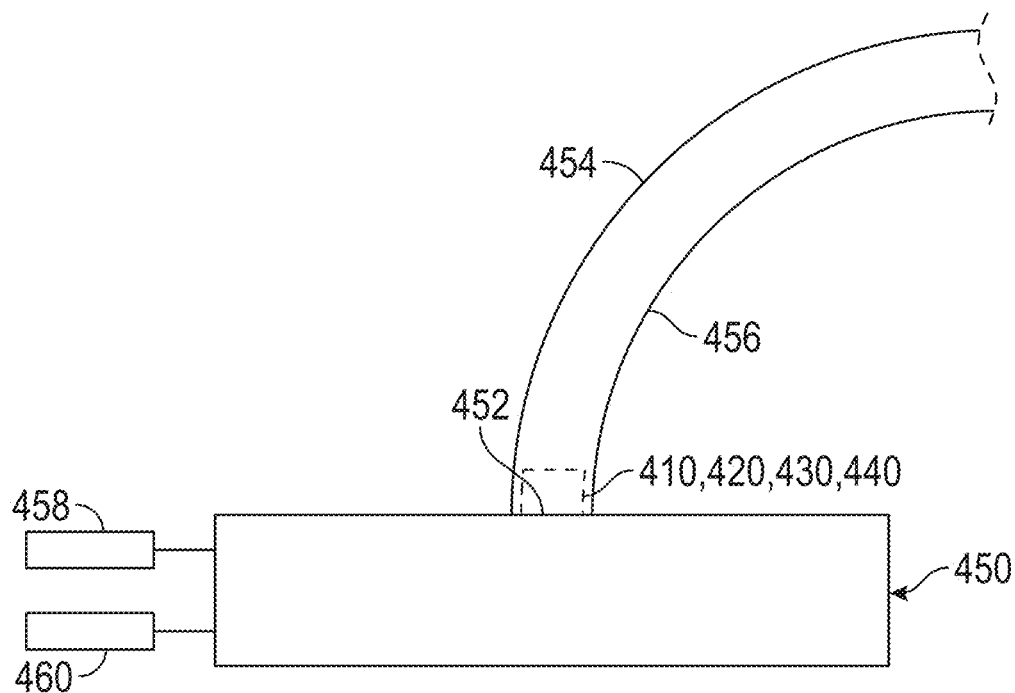
FIG. 45A is a top view of an extruder showing a conduit extruded a first distance.
Figure 45B:
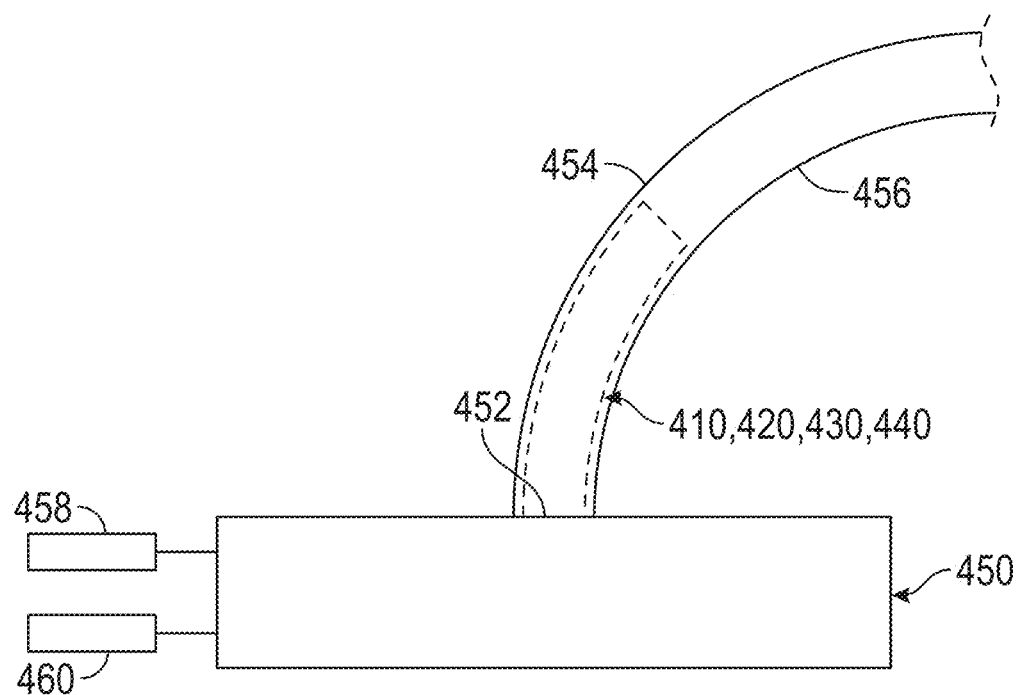
FIG. 45B is a top view of the extruder of FIG. 45 showing the conduit extruded a second distance.
Figure 45C:
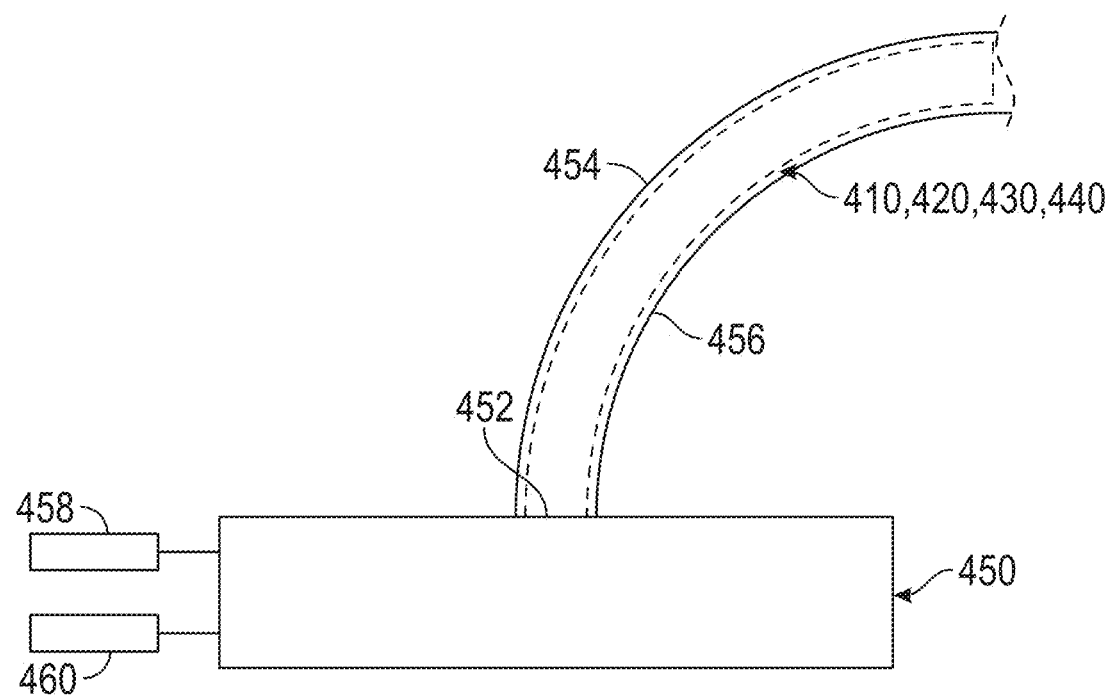
FIG. 45C is a top view of the extruder of FIG. 45 showing the conduit extruded a third distance.
Figure 46:
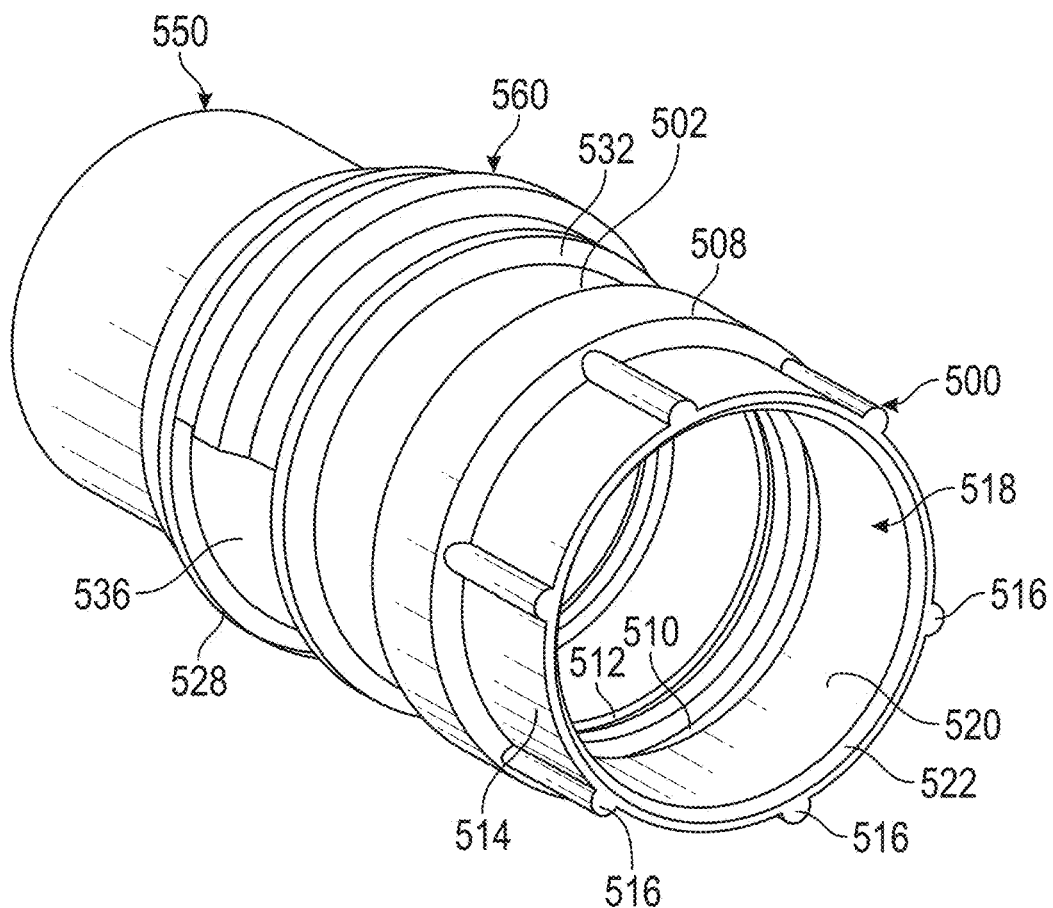
FIG. 46 is a perspective view of an alternative coupler assembly of the present disclosure.
Figure 47:
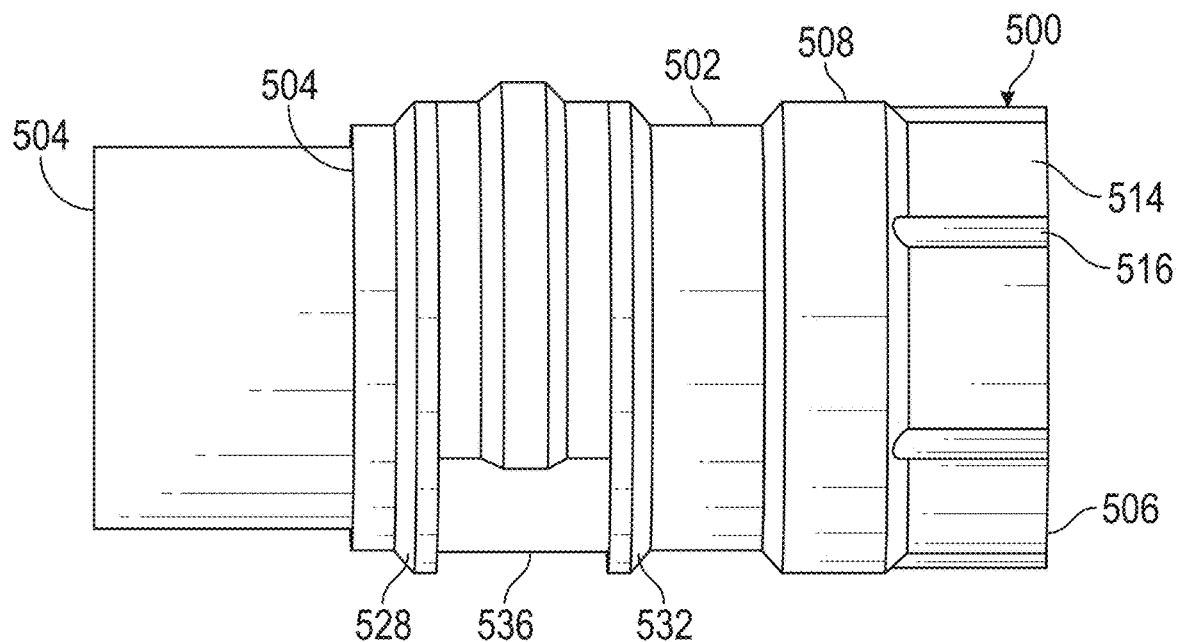
FIG. 47 is a side view of the alternative coupler assembly of FIG. 46.
Figure 48:
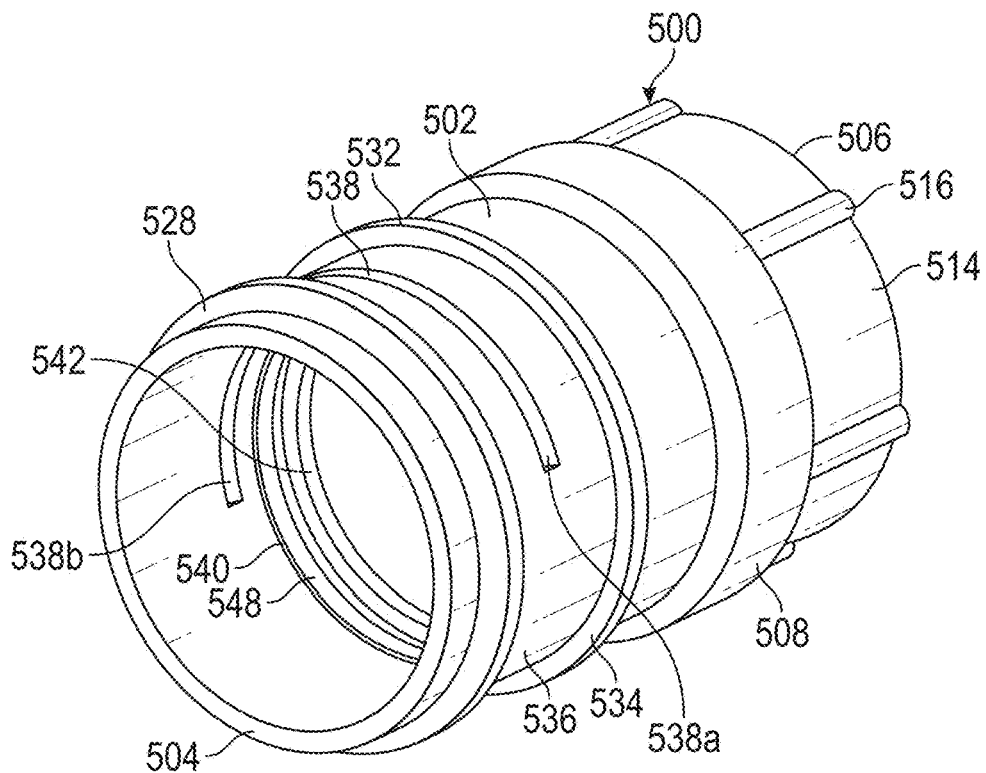
FIG. 48 is a perspective view of a coupler of the alternative coupler assembly of FIG. 46.

Referring now to FIGS. 45A-45C, conduits 410, 420, 430, 440 may be formed by an extruder 450 which includes an output 452. Extruder 450 may be operably coupled to a material input 458 (e.g., a hopper) and a controller 460 which may control characteristics such as extrusion rate, extruder temperature, etc. In embodiments, a first guide 454 is coupled to extruder 450 adjacent output 452 and a second guide 456 is coupled to extruder 450 adjacent output 452. In embodiments, first guide 454 and second guide 456 may be plates, guide wires, supports, or other guiding members. In embodiments, guides 454, 456 may include more guides. In embodiments, guides 454, 456 may be a part of an enclosed guide with a constant circumference. In embodiments, guides 454, 456 are positioned such that a radius is formed to create a desired angle for the formed conduit. That is, for example, if a ninety degree conduit is to be created, guides 454, 456 are positioned to form a ninety degree angle. In embodiments, guides 454, 456 are sized and shaped to receive conduits 410, 420, 430, 440 (e.g., if a 3 inch diameter conduit is being formed, first guide 454 may be offset approximately 3 inches from second guide 456). In embodiments, extruder 450 outputs a standard formed conduit with a predetermined diameter (e.g., 2 inches, 3 inches, 4 inches, 5 inches, 6 inches, 8 inches, 10 inches, 12 inches, or more) and extruder 450 pushes the formed conduit through first guide 454 and second guide 456. The formed conduit is pushed through guides 454, 456 while in a heated, or malleable form to form the respective angled, or swept conduits. In embodiments, conduits 410, 420, 430, 440 are cut, sliced, or otherwise severed when the appropriate length or arc has been extruded from extruder 450.

Referring to FIG. 45A, extruder 450 illustrates a conduit extruded out of extruder 450 a first distance. Referring to FIG. 45B, extruder 450 illustrates a conduit extruded out of extruder 450 a second distance, extending through guides 454, 456. Referring to FIG. 45C, extruder 450 illustrates a conduit extruded out of extruder 450 a third distance, extending through guides 454, 456.

In embodiments, any of couplers 10, 10', 200, 300 may be formed such that a first end of the coupler (e.g., first end 14 of coupler 10) is angled relative to a second end of the coupler (e.g., second end 16 of coupler 10). That is, any of couplers 10, 10', 200, 300 may be angled at a 22.5 degree angle, a 30 degree angle, a 45 degree angle, a 60 degree angle, a 90 degree angle, or another angle between 0-90 degrees. In embodiments, any of couplers 10, 10', 200, 300 may include an intermediate sweep such that a first end of the coupler (e.g., first end 14 of coupler 10) is offset relative to a second end of the coupler (e.g., second end 16 of coupler 10), that is, the first end and second end may be generally parallel but offset from one another. In embodiments, any of couplers 10, 10', 200, 300 may be formed with a T-shaped connection or another type of connection (e.g., a T-shaped connection may include a first end portion similar to first portion 18 of coupler 10, a second end portion similar to second portion 20 of coupler 10, and a third end portion similar to one of first portion 18 or second portion 20 of coupler 10).

In embodiments of the present disclosure, any of gasket 40 (FIG. 5A), gasket 40' (FIG. 6A), gasket 266 (FIG. 26), gasket 394 (FIG. 42) may be the similar or same and may be designed to deform under a predetermined pressure. Additionally, gasket 40, 40', 266, 394 may be undersized relative to the respective recess which it sits (e.g., recess 34 (FIG. 5A), recess 34' (FIG. 6A, recess 228 (FIG. 26), recess 324 (FIG. 42)). In embodiments, gasket 40, 40', 266, 394 may sit proud of the inner surface of coupler 10, 10', 200, 300, respectively, and when the predetermined pressure is applied to gasket 40, 40', 266, 394 (e.g., conduit is inserted into the coupler), the gasket 40, 40', 266, 394 may be compressed within recess 34, 34', 228, 324, respectively. In embodiments, the predetermined pressure is approximately 100 pounds. In embodiments, the predetermined pressure is approximately 80-120 pounds. In embodiments, the predetermined pressure is approximately 60-140 pounds. In embodiments, the predetermined pressure is approximately 40-160 pounds.

In embodiments, any of gasket 40 (FIG. 5A), gasket 40' (FIG. 6A), gasket 266 (FIG. 26), gasket 394 (FIG. 42) includes an approach surface 44 (FIG. 5A) positioned closest to either extent of coupler 10, 10', 200, 300, and defined as the first surface which the conduit may contact when inserted into coupler 10, 10', 200, 300. In embodiments, the approach surface 44 is generally arcuately shaped to allow for the conduit to insert into coupler 10, 10', 200, 300 and slide over gasket 40, 40', 266, 394. In embodiments, the approach surface 44 is a ramped surface, a graded surface, or otherwise formed such that the approach surface 44 is generally non-perpendicular to the axis X1.

Referring now to FIGS. 46-49, a coupler 500 includes a body 502 extending along a longitudinal axis 503 and extending between a first end 504 and a second end 506. Body 502 defines a first shoulder 508 positioned adjacent second end 506. Coupler 500 defines a first interior portion 524 adjacent first end 504 and a second interior portion 518 adjacent second end 506. In embodiments, first interior portion 524 defines an inner face 526 and second inner portion 518 defines an inner face 520. Second interior portion 518 defines a first recess 510 and a second recess 512. In embodiments, each of first recess 510 and second recess 512 are positioned longitudinally adjacent first shoulder 508. In embodiments, first recess 510 and second recess 512 are longitudinally offset from each other. In embodiments, each of first recess 510 and second recess 512 are annular recesses extending around a circumference of the inner face 520 of second interior portion 518. In embodiments, second end 506 defines a chamfered surface 522 to assist in locating or centering a conduit (not shown) operable to sit or fit within second interior portion 518.

In embodiments, an outer portion 514 extends longitudinally outwardly from shoulder 508 toward second end 506. A plurality of extensions 516 extend radially outwardly from outer portion 514. In embodiments, outer portion 514 and extensions 516 are substantially similar to second portion 304 and extensions 308 of coupler 300. That is, outer portion 514 and extensions 516 may interface with a tool (e.g., tool 388) that may then rotate coupler 500.

Referring still to FIGS. 46-49, body 502 includes a second shoulder 528 longitudinally offset from first shoulder 508 and a third shoulder 532 longitudinally offset from second shoulder 528. In embodiments, second shoulder 528 is positioned longitudinally closer to first end 504 than third shoulder 532. In embodiments, second shoulder 528 defines a face 530 facing third shoulder 532. In embodiments, third shoulder 532 defines a face 534 facing second shoulder 530. Body 502 defines a face 536 extending between second shoulder 528 and third shoulder 532. Face 536 defines an aperture 538, or slot 538 extending through face 536 and first interior portion 524. In embodiments, slot 538 is an arcuate slot 538 extending radially along a portion of face 536 between a first slot end 538a and a second slot end 538b. In embodiments, slot 538 is positioned within first interior portion 524. In embodiments, face 530 is separated from face 534 by a longitudinal length 531.

Figure 49:
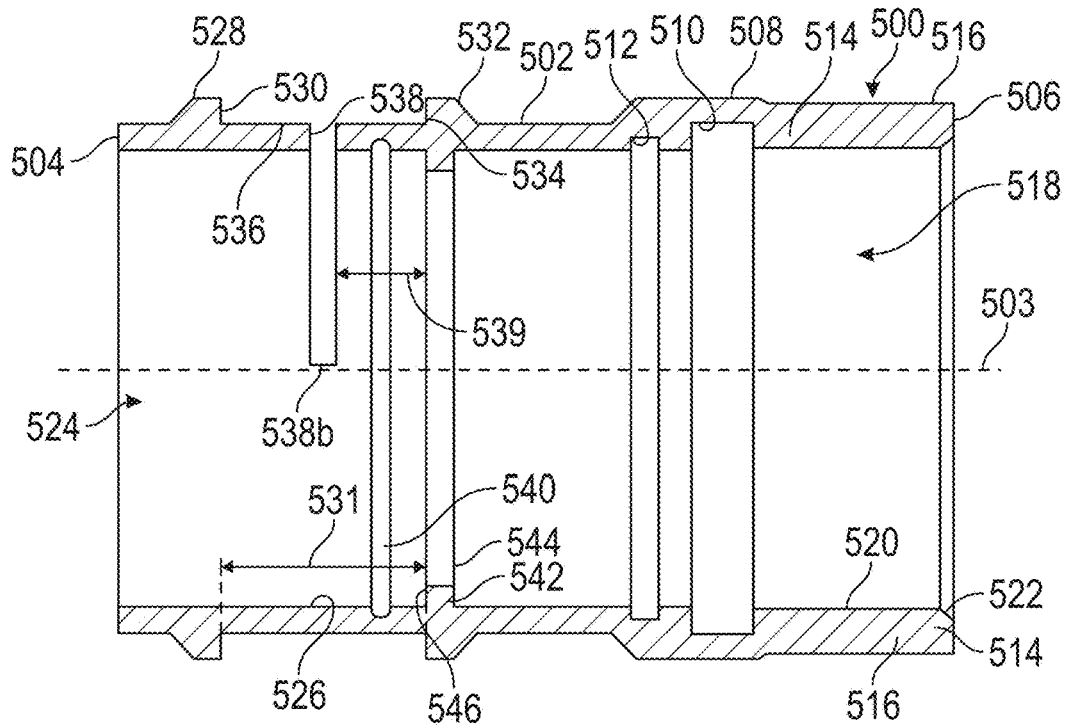
FIG. 49 is a section view of the coupler of FIG. 48 taken along the longitudinal centerline.
Figure 50:
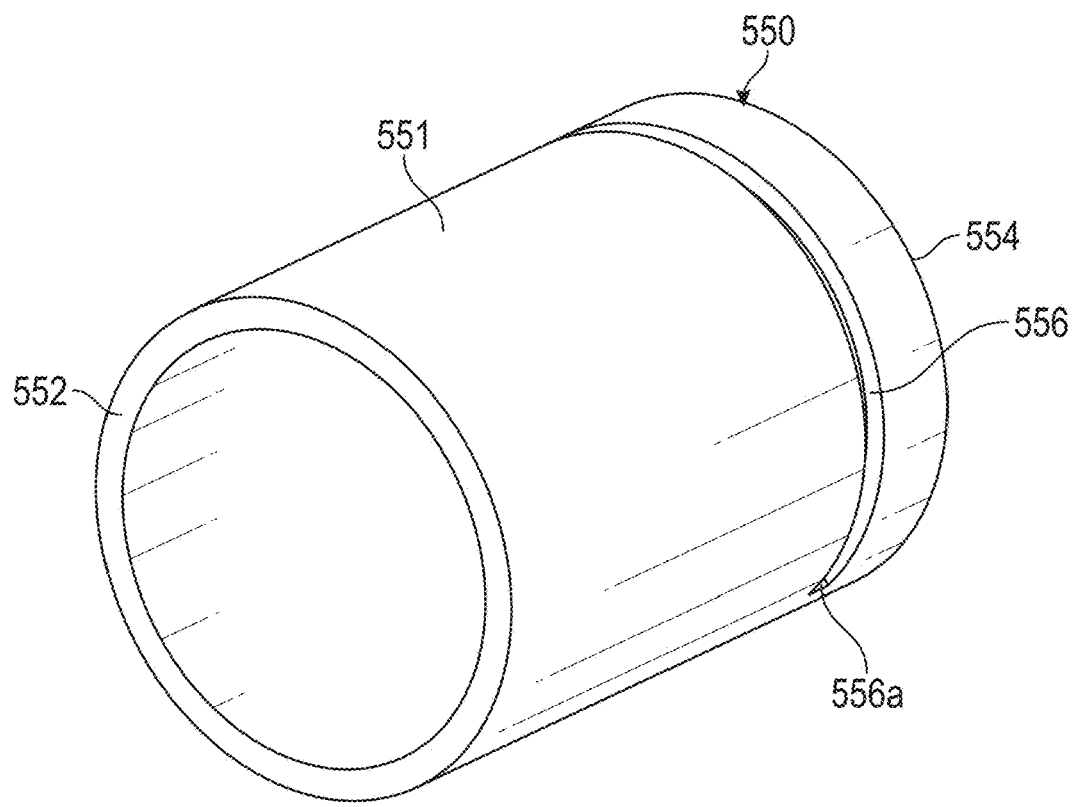
FIG. 50 is a perspective view of a conduit of the alternative coupler assembly of FIG. 46.
Figure 51:
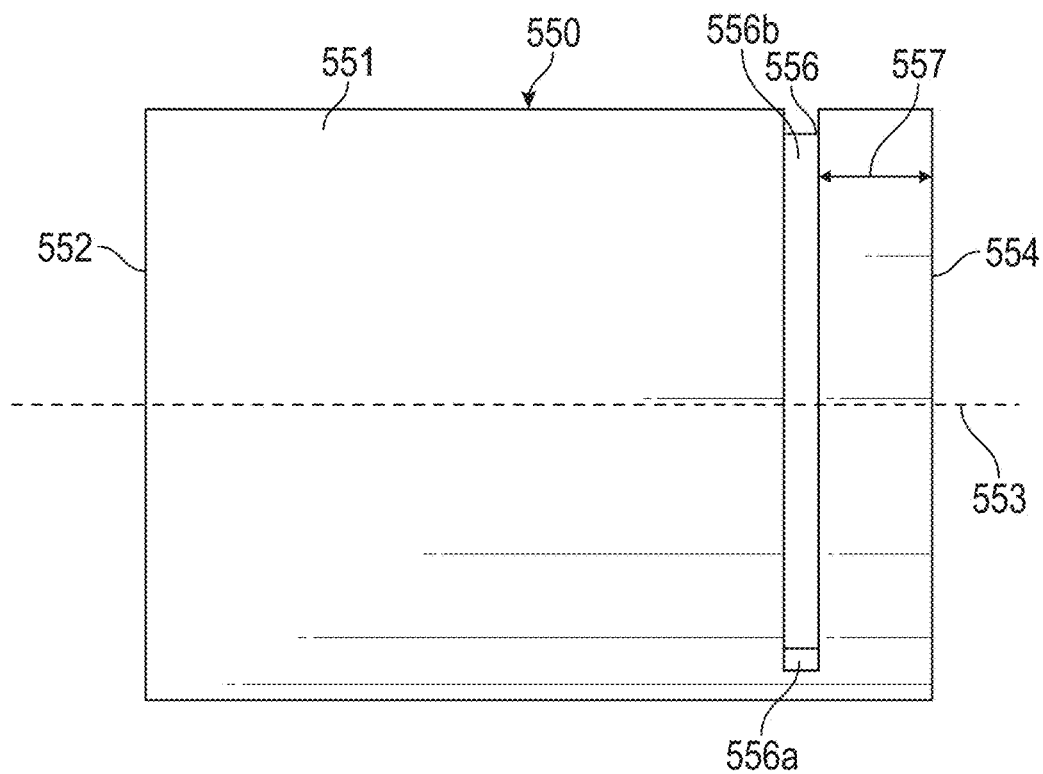
FIG. 51 is a side view of the conduit of FIG. 50.
Figure 52:
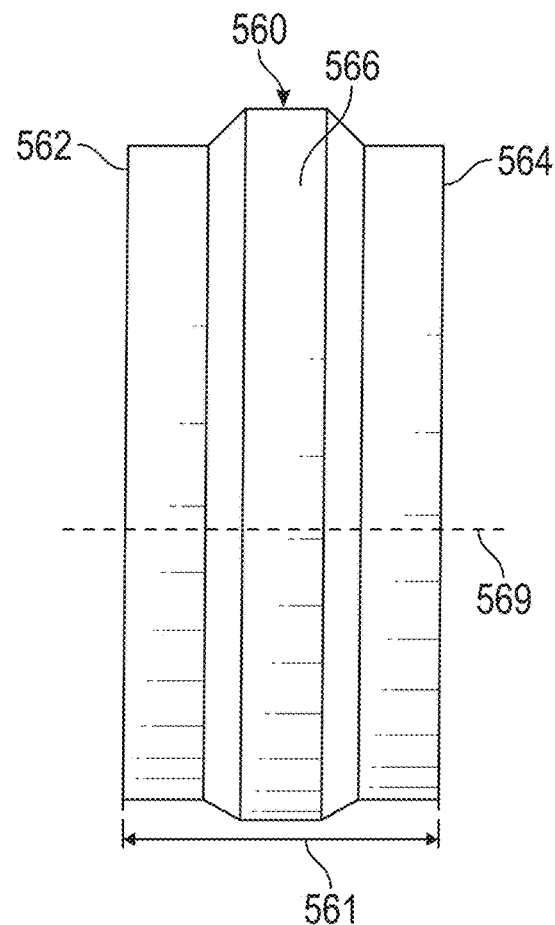
FIG. 52 is a side view of a ring of the alternative coupler assembly of FIG. 46.
Figure 53:
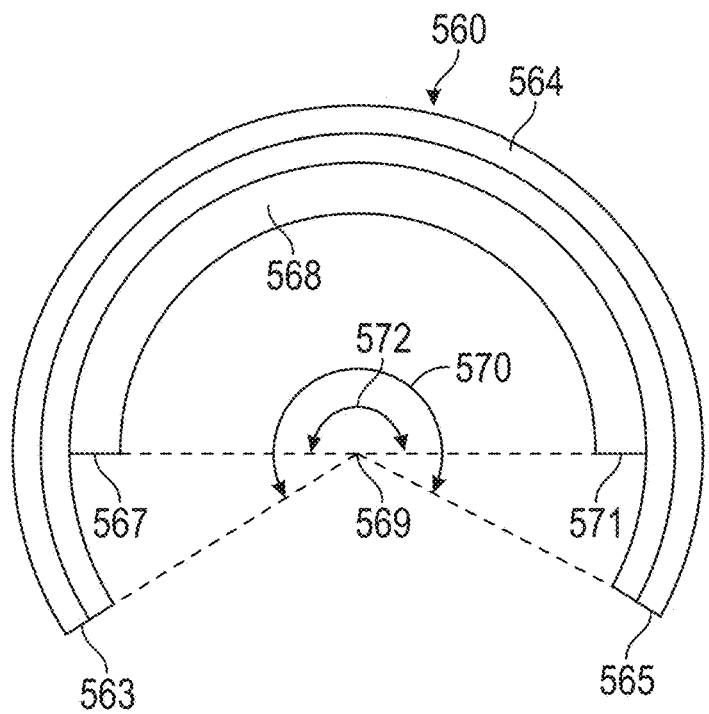
FIG. 53 is a front view of the ring of FIG. 52.

Referring to FIG. 49, coupler 500 defines an interior shoulder 542 positioned longitudinally intermediate first interior portion 524 and second interior portion 518. Interior shoulder 542 is an annular shoulder extending the circumference of the interior of coupler 500. In embodiments, interior shoulder 542 defines a first face 546 facing first end 504 and a second face 544 facing second end 506. In embodiments, interior shoulder 542 is longitudinally offset from slot 538, and in embodiments interior shoulder 542 is longitudinally spaced from slot 538 by a longitudinal distance 539.

Referring still to FIG. 49, coupler 500 defines a recess 540 within inner face 526. In embodiments, recess 540 is positioned within first interior portion 524. In embodiments, recess 540 is an annular recess extending along the circumference of first interior portion 524. In embodiments, recess 540 is positioned longitudinally intermediate slot 538 and shoulder 542. In embodiments, a gasket or seal 548 (FIG. 48) is dimensioned to sit, or fit within, recess 540.

Referring to FIGS. 46-47 and 50-51, a conduit 550 is operable to fit within first interior portion 524. Conduit 550 extends along a longitudinal axis 553 and generally defines a first end 552 and a second end 554. In embodiments, conduit 550 is generally cylindrical. In embodiments, conduit 550 defines a slot 556 extending through an outer surface 551 of conduit 550. In embodiments, slot 556 is longitudinally spaced from second end 554 by a longitudinal distance 557. In embodiments, slot 556 extends radially along outer surface 551 between a first slot end 556a and a second slot end 556b.

Referring to FIGS. 46-47 and 52-53, a ring 560 includes a first end 562 and a second end 564, and a shoulder 566 is positioned intermediate the first end 562 and second end 564. In embodiments, ring 560 is an arcuate portion positioned radially about an axis 569. In embodiments, ring 560 extends longitudinally along axis 569 a distance 561. In embodiments, distance 561 is the same as or less than distance 539. In embodiments, ring 560 defines a first leg 563 and a second leg 565, and the first leg 563 is radially spaced from second leg 565 by an angle 570. In embodiments, angle 570 is greater than 180 degrees. Ring 560 also defines an extension 568 extending radially inwardly toward longitudinal axis 569. Extension 568 is generally arcuate and extends between a first radial end 567 and a second radial end 571. In embodiments, the first radial end 567 is radially spaced from second radial end 571 by an angle 572. In embodiments, the angle 572 is approximately 180 degrees.

Figure 54:
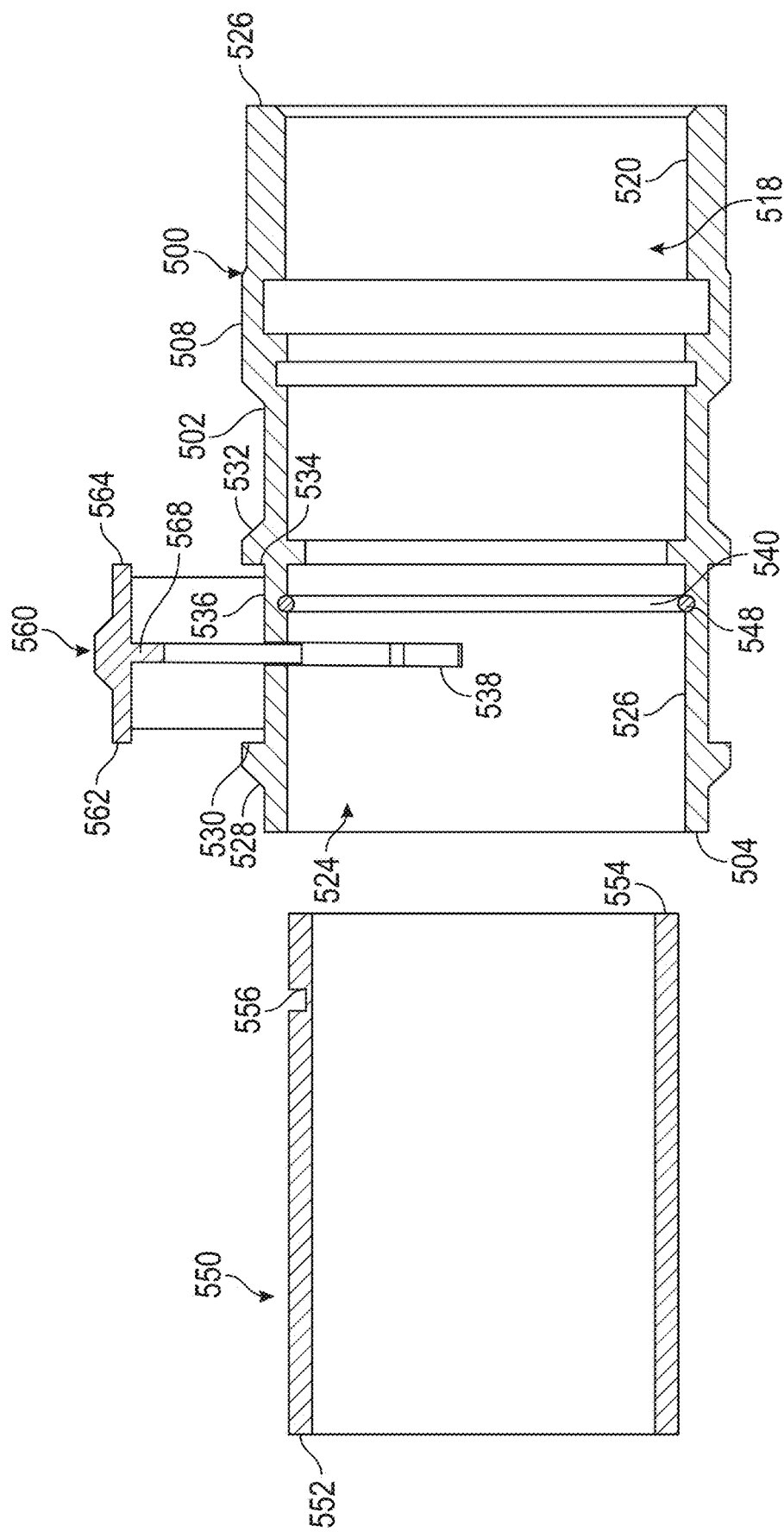
FIG. 54 is a section side view of the alternative coupler assembly of FIG. 46 disassembled.
Figure 55:
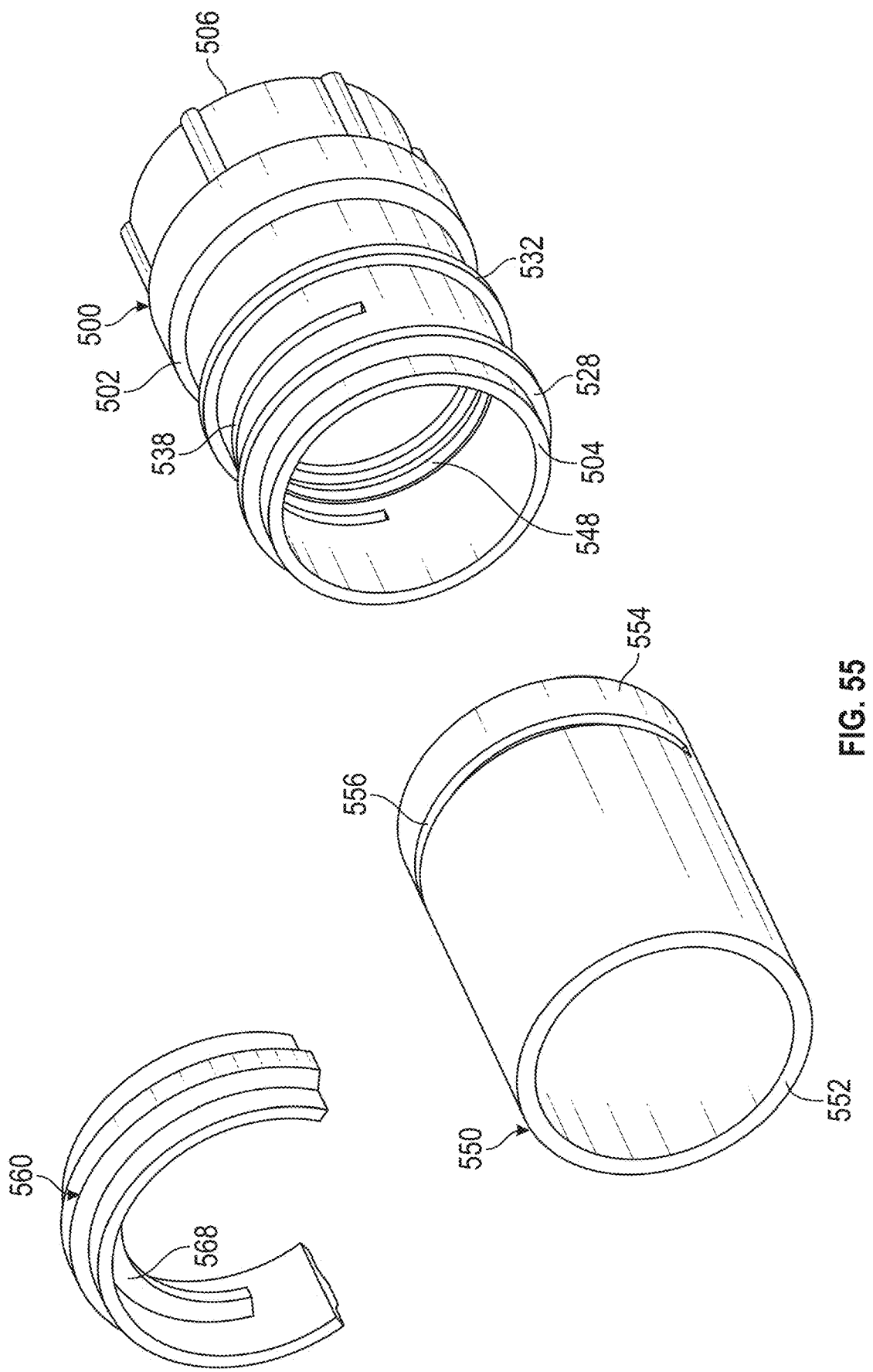
FIG. 55 is a perspective view of the alternative coupler assembly of FIG. 46 disassembled.

Referring now to FIGS. 54-59, conduit 550 is operable to sit within first interior portion 524 of coupler 500 and ring 560 is operable to clamp or couple conduit 550 with coupler 500. Referring to FIGS. 54-55, coupler 500, conduit 550, and ring 560 may be positioned proximate each other. Conduit 550 may be positioned longitudinally offset from coupler 500 and dimensioned such that conduit 550 may be received within first interior portion 524.

Figure 56:
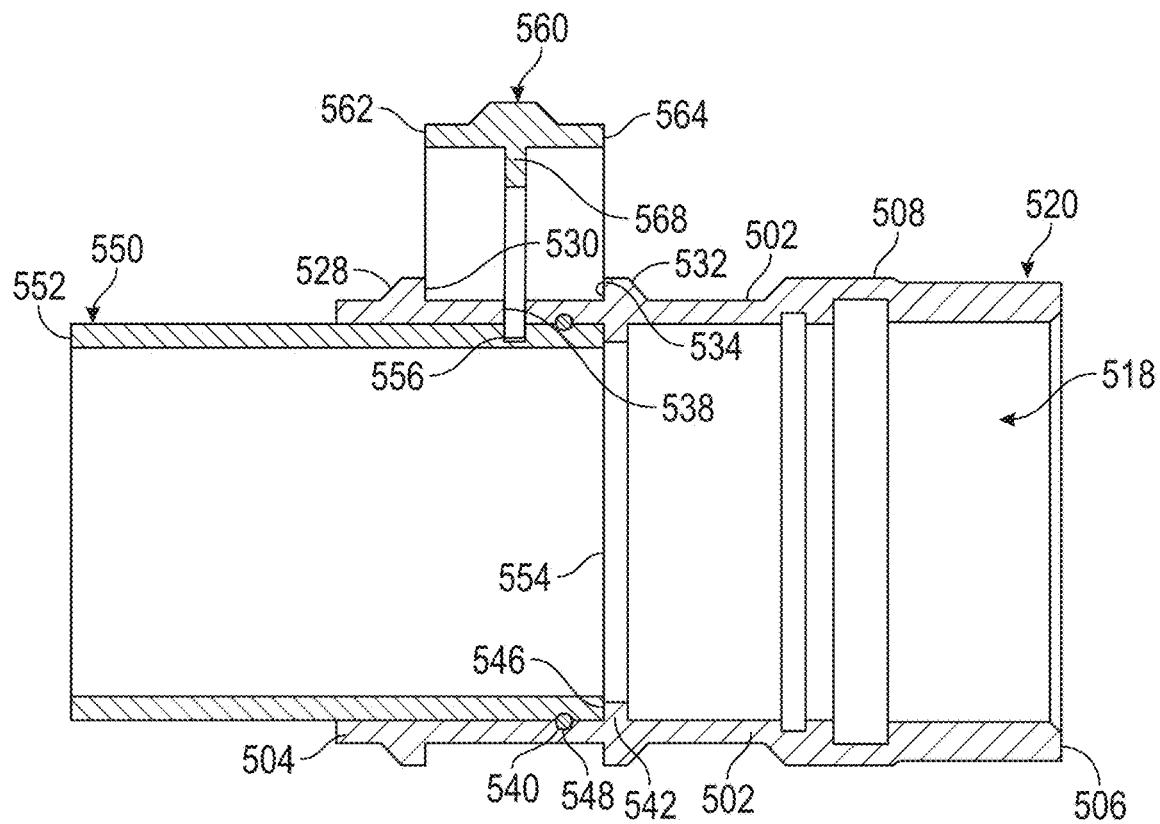
FIG. 56 is a section side view of the alternative coupler assembly of FIG. 46 with the conduit assembled in the coupler.
Figure 57:
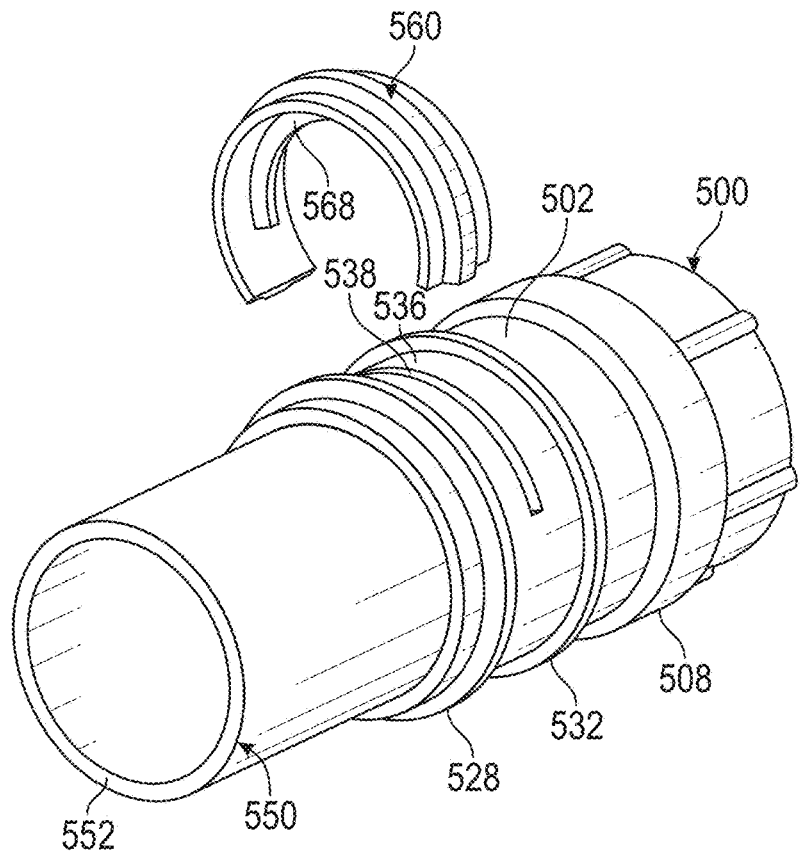
FIG. 57 is a perspective view of the alternative coupler assembly of FIG. 46 with the conduit assembled in the coupler.

Referring now to FIGS. 56-57, conduit 550 may be positioned within first interior portion 524 of coupler 500 such that the slot 556 of conduit 550 longitudinally aligns with slot 538 of coupler 500. In embodiments, conduit 550 may be inserted into first interior portion 524 of coupler 500 until second end 554 of conduit 550 contacts face 546 of shoulder 542. In embodiments, distance 539 is approximately the same as distance 557.

Figure 58:
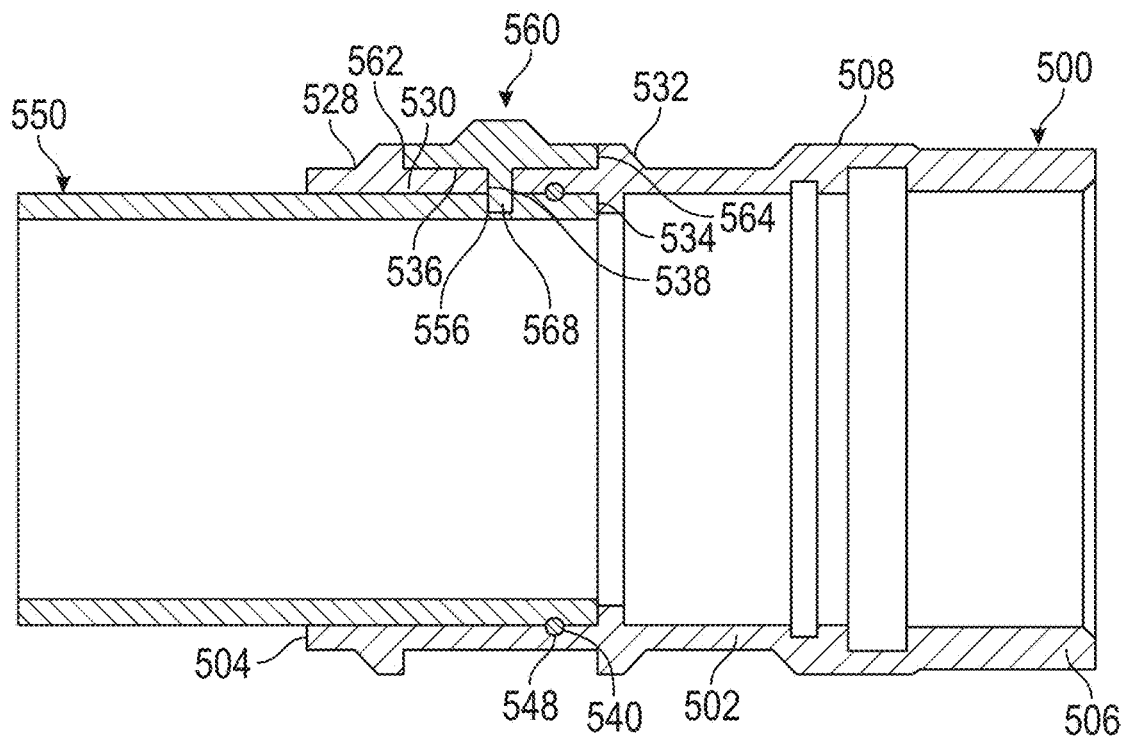
FIG. 58 is a section side view of the alternative coupler assembly of FIG. 46 assembled.
Figure 59:
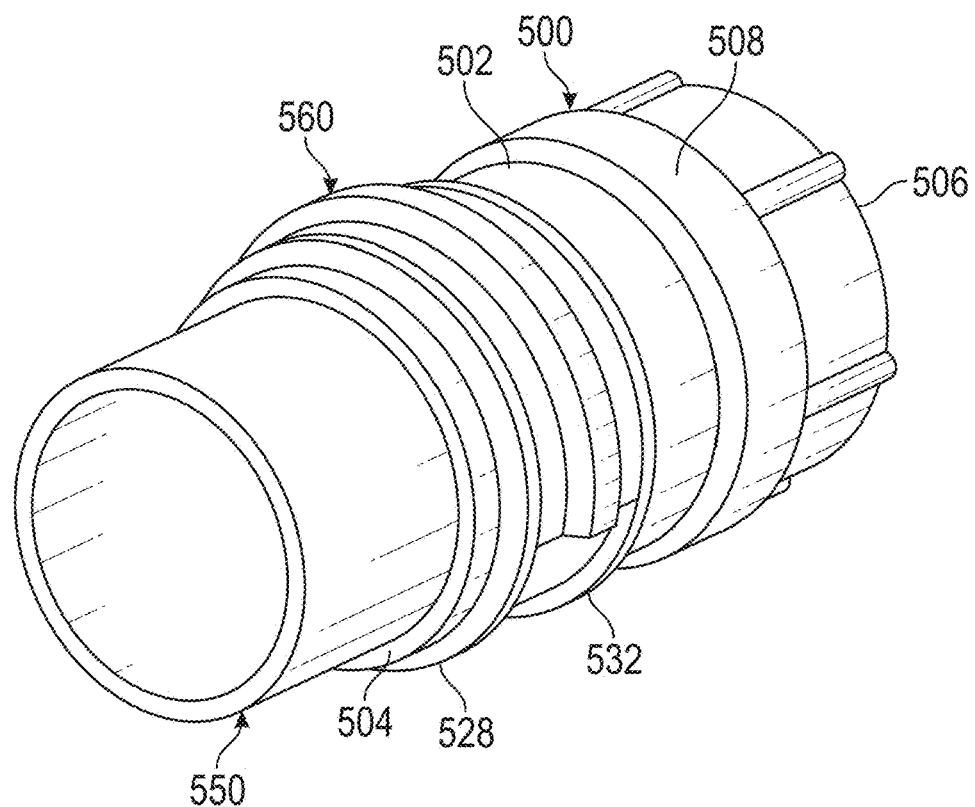
FIG. 59 is a perspective view of the alternative coupler assembly of FIG. 46 assembled.

Referring now to FIGS. 58-59, ring 560 may be placed around coupler 500 such that ring 560 sits on face 536 between face 530 and face 534. Ring 560 may be placed on coupler 500 such that extension 568 of ring 560 extends through slot 538 of coupler 500 and slot 556 of conduit 550. Further, when extension 568 sits within each of slot 538 and slot 556, first radial end 567 is operable to sit on, or adjacent to, each of first slot end 538a of coupler 500 and first slot end 556a of conduit 500 and second radial end 571 is operable to sit on, or adjacent to, each of second slot end 538b of coupler 500 and second slot end 556b of conduit 500. That is, extension 568 sit within each of slot 538 and slot 556 and be bounded by each of slot ends 538a, 538b, 556a, 556b. Further, first leg 563 and second leg 565 are spaced such that they sit on, or snap onto, the face 536 of coupler 500 such that ring 560 is secured to coupler 500. Ring 560 may then couple together each of coupler 500 and conduit 550 such that conduit 550 may not be removed from coupler 500 without removing ring 560.

Figure 60:
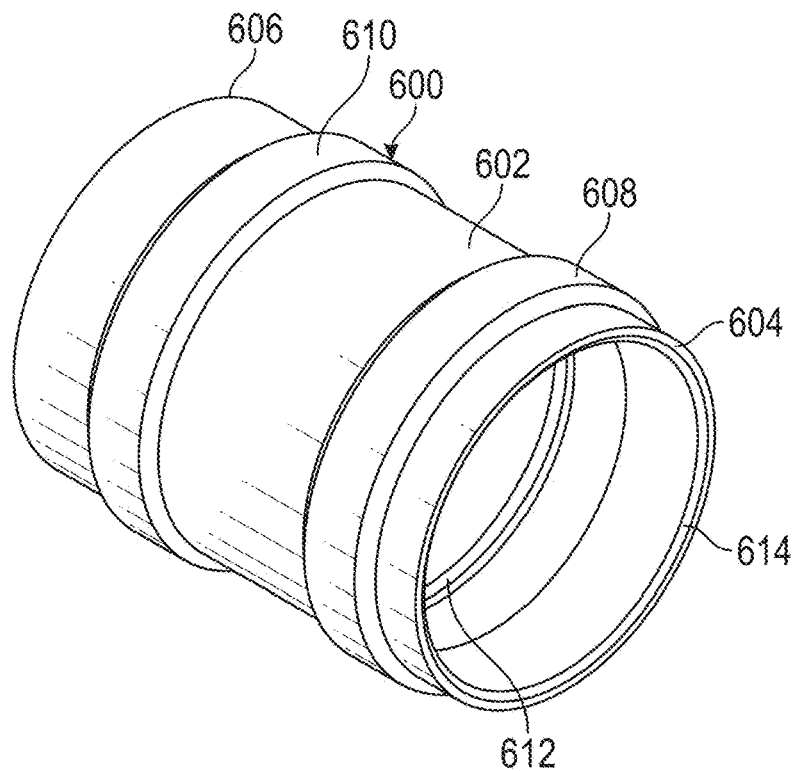
FIG. 60 is a perspective view of an alternative coupler assembly of the present disclosure.
Figure 61:
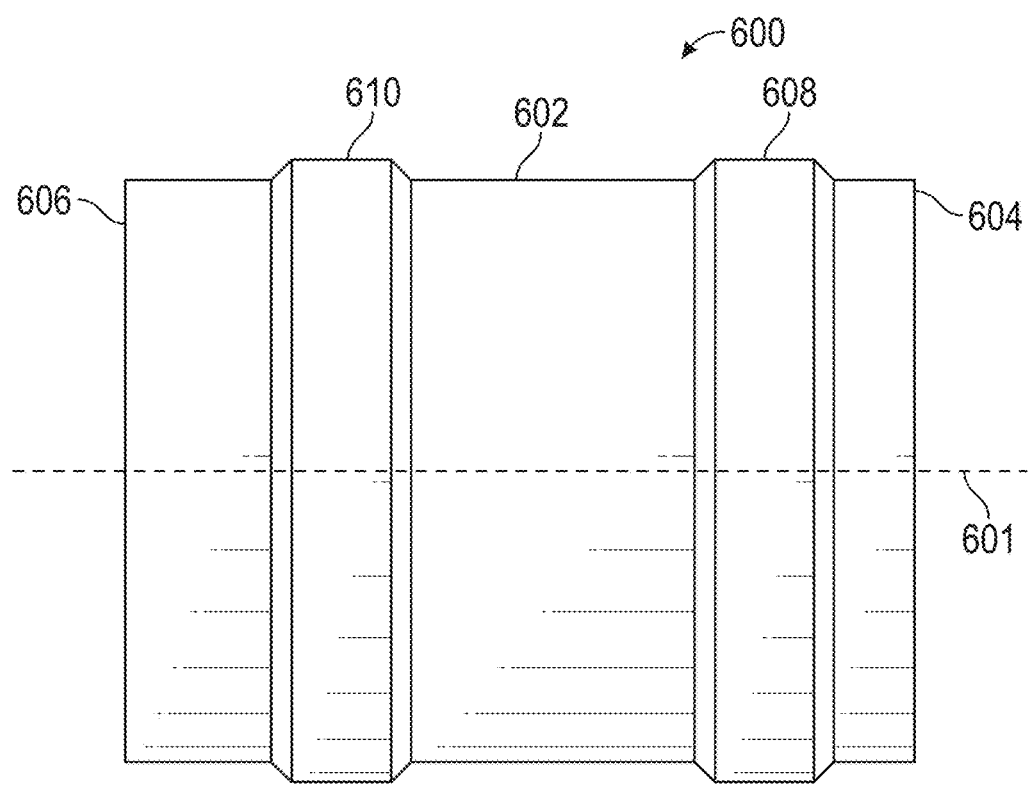
FIG. 61 is a side view of the alternative coupler assembly of FIG. 60.
Figure 62:
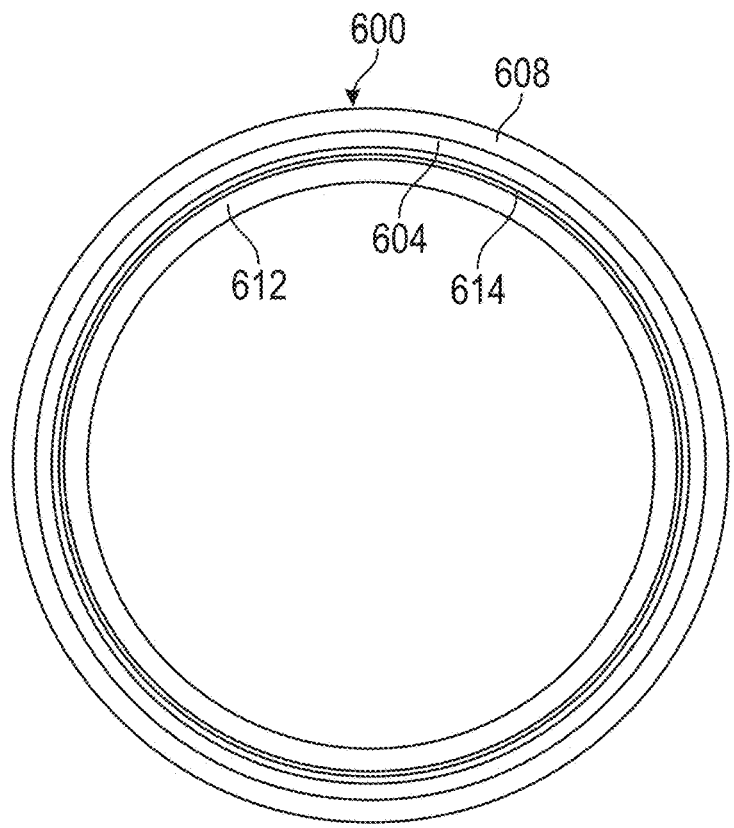
FIG. 62 is a front view of the alternative coupler assembly of FIG. 60.

Referring now to FIGS. 60-62, a coupler 600 includes a body 602 extending along a longitudinal axis 601 and extending between a first end 604 and a second end 606. In embodiments, body 602 defines a first shoulder 608 and a second shoulder 610.

Figure 63:
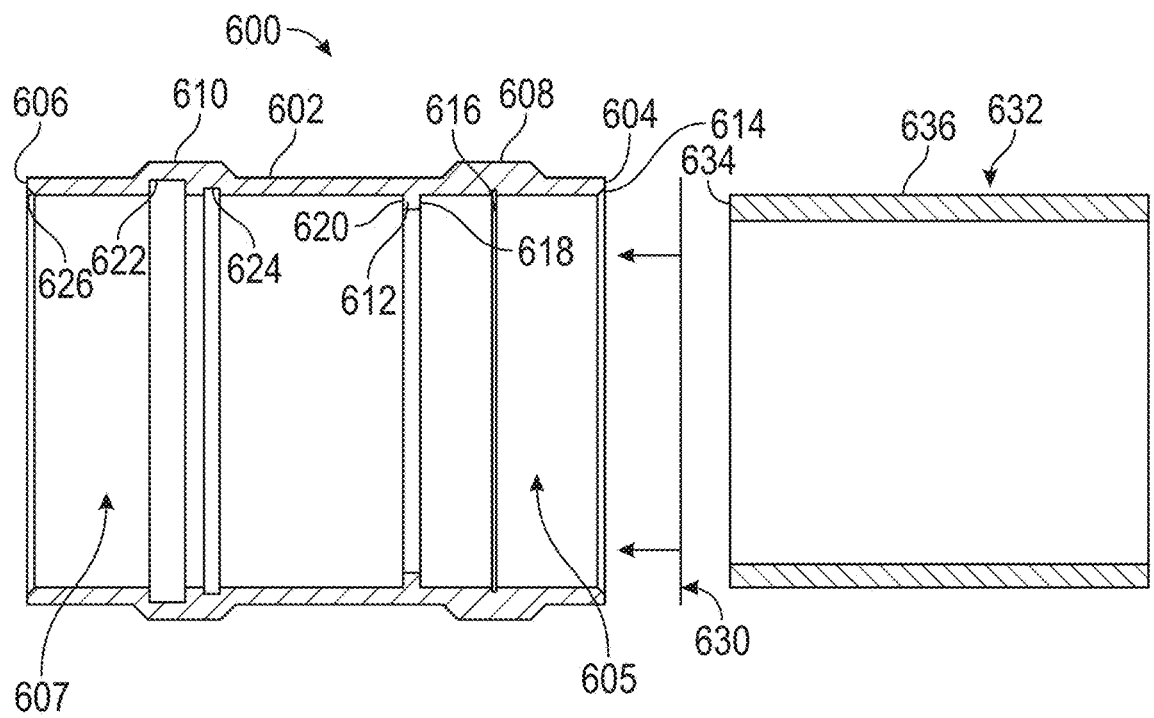
FIG. 63 is a section side view of the alternative coupler assembly of FIG. 60 disassembled.
Figure 64:
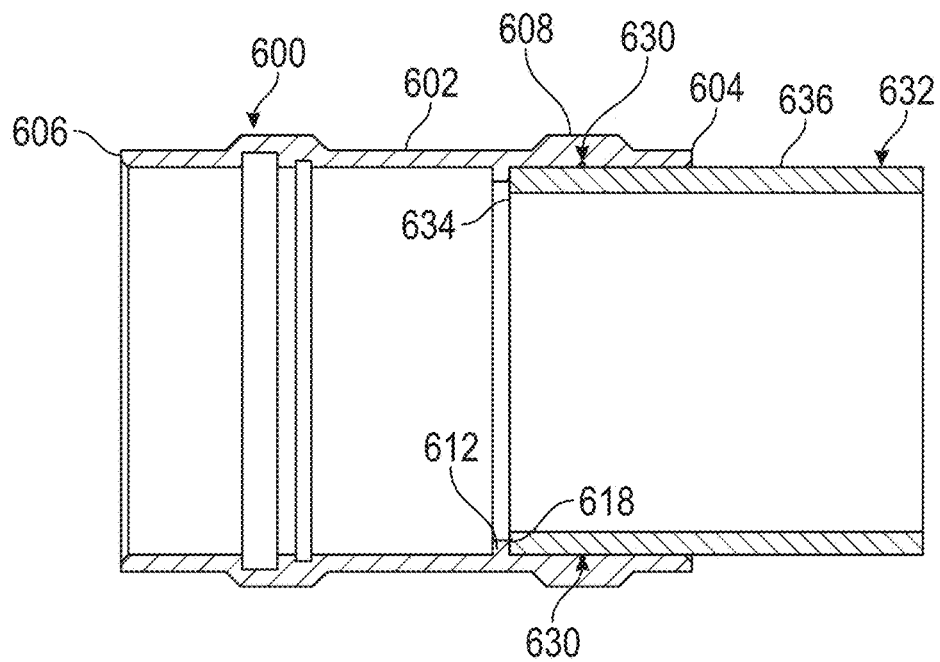
FIG. 64 is a section side view of the alternative coupler assembly of FIG. 60 with a conduit coupled with the coupler of FIG. 60.
Figure 65:
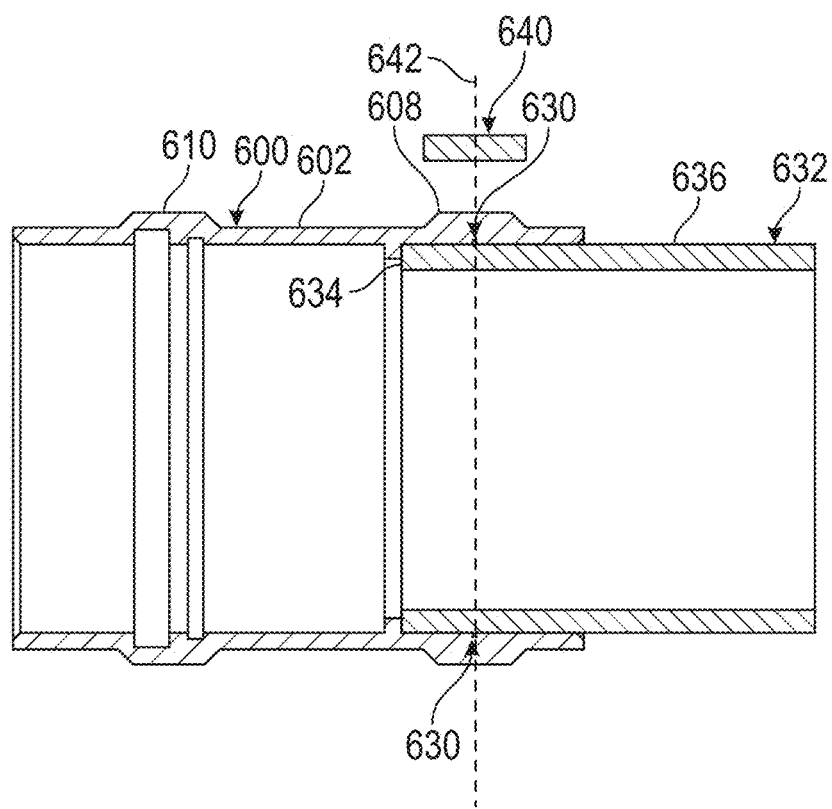
FIG. 65 is a section side view of the alternative coupler assembly of FIG. 60 adjacent an electromagnet.
Figure 66:
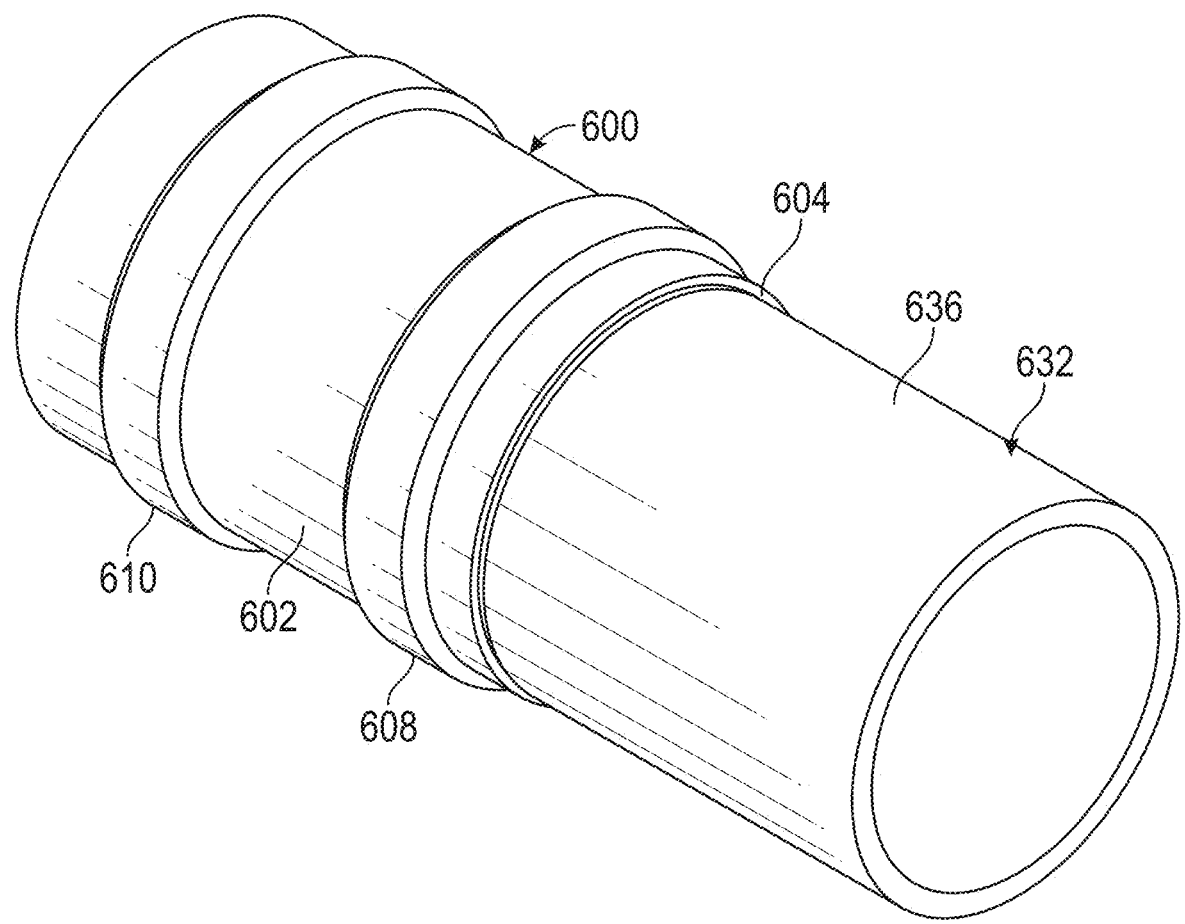
FIG. 66 is a perspective view of the alternative coupler assembly of FIG. 60 coupled with a conduit.

Referring now to FIGS. 63-65, coupler 600 defines a first interior portion 605 positioned adjacent first end 604 and a second interior portion 607 positioned adjacent second end 606. In embodiments, a shoulder 612 is positioned within an interior of body 602 and longitudinally intermediate first interior portion 605 and second interior portion 607. In embodiments, shoulder 612 defines a first face 618 facing first interior portion 605 and a second face 620 facing second interior portion 607. In embodiments, first end 604 defines a first chamfer 614 and second end 606 defines a second chamfer 626. In embodiments, each of first chamfer 614 and second chamfer 626 assist in locating or centering a conduit (e.g., a conduit 632) operable to sit or fit within first interior portion 605 and second interior portion 607, respectively.

Referring still to FIGS. 63-65, first interior portion 605 defines a first recess 616 positioned longitudinally adjacent to shoulder 608. Second interior portion 607 defines a second recess 622 and a third recess 624 longitudinally offset from the second recess 622.

Referring to FIGS. 63-65, a gasket 630 is dimensioned to sit within first recess 616. In embodiments, gasket 630 is formed of a composite material including one or more of a thermoplastic, a carbon fiber material, a metallic material, or another material. In embodiments, gasket 630 includes a composite material including an inductive material.

Still referring to FIGS. 63-65, conduit 632 includes a first end 634 operable to sit within first interior portion 605 of coupler 600 and conduit 632 defines an outer surface 636. In embodiments, conduit 632 is operable to sit within first interior portion 605 such that first end 634 is contact with or adjacent to first face 618 of shoulder 612.

Referring to FIGS. 64-65, conduit 632 is operable to sit within first interior portion 605 such that outer surface 636 of conduit 632 is in contact with, or adjacent to, gasket 630.

In embodiments, conduit 632 is formed of an HDPE material. In embodiments, coupler 600 is formed of an HDPE material. In embodiments, the gasket 630 is a composite formed of an HDPE material and an inductive material (e.g., a carbon fiber or metallic material). In embodiments, conduit 632, coupler 600, and a portion of gasket 630 is formed of another type of thermoplastic.

Referring now to FIG. 65, an electromagnet 640 may be placed adjacent coupler 500 and may be at least partially aligned with shoulder 608 and gasket 630. Gasket 630 may be placed within recess 616 and conduit 632 may be placed within first interior portion 605, and electromagnet 640 may inductively heat gasket 630 to melt, or flow, at least a portion of gasket 630 to melt together coupler 600, gasket 630, and conduit 632 and thereby coupling coupler 600, gasket 630, and conduit 632. In embodiments, the electromagnet 640 heats the inductive material (e.g., carbon fiber material or metallic material) which melts the thermoplastic material of the gasket 630 between the coupler 600 and conduit 632.

In embodiments, electromagnet 640 is rotatable about the coupler 600 (e.g., rotatable on a frame (not shown) about axis 601). In embodiments, the coupler 600 is rotatable relative to the electromagnet 640 (e.g., rotatable about axis 601).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A coupler, comprising:
a first annular portion extending along a longitudinal axis to a first extent;
a second annular portion extending along the longitudinal axis to a second extent, the second annular portion longitudinally offset from the first annular portion;
a first annular recess and a second annular recess positioned within the second annular portion;
an opening extending along the longitudinal axis through the first extent and the second extent;
a channel recessed within the first extent;
a first shoulder positioned along an outer surface of the second annular portion, the first shoulder extending over the first annular recess and the second annular recess, the first shoulder comprising a first tapered portion and a second tapered portion, the first shoulder having a constant outer diameter between the first tapered portion and the second tapered portion; and
a tool engagement feature positioned along the outer surface of the second annular portion, the tool engagement feature comprising a plurality of extensions that extend between the first shoulder and the second extent.

2. The coupler of claim 1, further comprising a first resilient member configured to sit within the first annular recess and a second resilient member configured to sit within the second annular recess, wherein the first resilient member comprises a seal and the second resilient member comprises a biasing member.

3. The coupler of claim 1, wherein the channel comprises a V-shaped cross sectional profile.

4. The coupler of claim 3, wherein the channel extends around the opening formed in the first extent.

5. The coupler of claim 4, wherein the opening comprises a first diameter portion within the first annular portion and a second diameter portion within the second annular portion, wherein the first diameter portion has a diameter that is less than a diameter of the second diameter portion.

6. The coupler of claim 5, wherein a wall thickness of the first annular portion measured at the first diameter portion is greater than a wall thickness of the second annular portion measured at the second diameter portion.

7. A method of welding a coupler to a conduit, the method comprising:
inserting a chamfered end of the conduit into a channel of the coupler, the coupler comprising:
a first annular portion extending along a longitudinal axis to a first extent;
a second annular portion extending along the longitudinal axis to a second extent, the second annular portion longitudinally offset from the first annular portion;
a first annular recess and a second annular recess positioned within the second annular portion;
an opening extending along the longitudinal axis through the first extent and the second extent, the channel being recessed within the first extent;
a first shoulder positioned along an outer surface of the second annular portion, the first shoulder extending over the first annular recess and the second annular recess, the first shoulder comprising a first tapered portion and a second tapered portion, the first shoulder having a constant outer diameter between the first tapered portion and the second tapered portion; and
a tool engagement feature positioned along an outer surface of the second annular portion, the tool engagement feature comprising a plurality of extensions that extend between the first shoulder and the second extent;
inserting the second annular portion of the coupler into a tool such that the tool engagement feature of the coupler mates with a coupler engaging feature of the tool; and
using the tool, rotating the coupler with respect to the conduit to form a weld between the coupler and the conduit.

8. The method of claim 7, wherein the rotating the coupler with respect to the conduit comprises rotating the coupler at a rotational speed of greater than 1,000 rotations per minute.

9. The method of claim 8, further comprising:
removing the second annular portion of the coupler from the tool; and inserting a second conduit into the opening through the second extent.

10. A coupler, comprising:
a first annular portion extending along a longitudinal axis to a first extent;
a second annular portion extending along the longitudinal axis to a second extent, the second annular portion longitudinally offset from the first annular portion;
a first annular recess and a second annular recess positioned within the second annular portion;
an opening extending along the longitudinal axis through the first extent and the second extent;
a channel recessed within the first extent;
a first shoulder positioned along an outer surface of the second annular portion, the first shoulder extending over the first annular recess and the second annular recess, the first shoulder comprising a first tapered portion and a second tapered portion; and
a tool engagement feature positioned along the outer surface of the second annular portion, the tool engagement feature comprising a plurality of extensions that extend between the first shoulder and the second extent.

11. The coupler of claim 10, further comprising a first resilient member configured to sit within the first annular recess and a second resilient member configured to sit within the second annular recess, wherein the first resilient member comprises a seal and the second resilient member comprises a biasing member.

12. The coupler of claim 10, wherein the channel comprises a V-shaped cross sectional profile.

13. The coupler of claim 12, wherein the channel extends around the opening formed in the first extent.

14. The coupler of claim 13, wherein the opening comprises a first diameter portion within the first annular portion and a second diameter portion within the second annular portion, wherein the first diameter portion has a diameter that is less than a diameter of the second diameter portion.

15. The coupler of claim 14, wherein a wall thickness of the first annular portion measured at the first diameter portion is greater than a wall thickness of the second annular portion measured at the second diameter portion.

16. The coupler of claim 10, wherein the first extent comprises a first wall and the second extent comprises a second wall that is parallel with respect to the first wall, and wherein the channel is formed within the first wall.

17. The coupler of claim 10, wherein a diameter of the opening gradually increases along a length between the first annular recess and the second extent.

18. A method of welding a coupler to a conduit, the method comprising:
inserting a chamfered end of the conduit into a channel of the coupler, the coupler comprising:
a first annular portion extending along a longitudinal axis to a first extent;
a second annular portion extending along the longitudinal axis to a second extent, the second annular portion longitudinally offset from the first annular portion;
a first annular recess and a second annular recess positioned within the second annular portion;
an opening extending along the longitudinal axis through the first extent and the second extent, the channel being recessed within the first extent;
a first shoulder positioned along an outer surface of the second annular portion, the first shoulder extending over the first annular recess and the second annular recess, the first shoulder comprising a first tapered portion and a second tapered portion; and
a tool engagement feature positioned along an outer surface of the second annular portion, the tool engagement feature comprising a plurality of extensions that extend between the first shoulder and the second extent;
inserting the second annular portion of the coupler into a tool such that the tool engagement feature of the coupler mates with a coupler engaging feature of the tool; and
using the tool, rotating the coupler with respect to the conduit to form a weld between the coupler and the conduit.

19. The method of claim 18, wherein the rotating the coupler with respect to the conduit comprises rotating the coupler at a rotational speed of greater than 1,000 rotations per minute.

20. The method of claim 18, further comprising:
removing the second annular portion of the coupler from the tool; and
inserting a second conduit into the opening through the second extent.

* * * * *